US008369775B2

(12) United States Patent
Karabinis et al.

(10) Patent No.: US 8,369,775 B2
(45) Date of Patent: *Feb. 5, 2013

(54) INTEGRATED OR AUTONOMOUS SYSTEM AND METHOD OF SATELLITE-TERRESTRIAL FREQUENCY REUSE USING SIGNAL ATTENUATION AND/OR BLOCKAGE, DYNAMIC ASSIGNMENT OF FREQUENCIES AND/OR HYSTERESIS

(75) Inventors: Peter D. Karabinis, Cary, NC (US); Rajendra Singh, Alexandria, VA (US)

(73) Assignee: ATC Technologies, LLC, Reston, VA (US)

( * ) Notice: Subject to any disclaimer, the term of this patent is extended or adjusted under 35 U.S.C. 154(b) by 664 days.

This patent is subject to a terminal disclaimer.

(21) Appl. No.: 12/549,548

(22) Filed: Aug. 28, 2009

(65) Prior Publication Data

US 2010/0009677 A1    Jan. 14, 2010

Related U.S. Application Data

(63) Continuation of application No. 11/536,481, filed on Sep. 28, 2006, now Pat. No. 7,907,893, which is a continuation of application No. 10/965,303, filed on Oct. 14, 2004, now Pat. No. 7,577,400, which is a continuation of application No. 10/000,799, filed on (Continued)

(51) Int. Cl.
*H04B 7/185* (2006.01)
(52) U.S. Cl. .................................................. 455/12.1
(58) Field of Classification Search .................. 455/12.1
See application file for complete search history.

(56) References Cited

U.S. PATENT DOCUMENTS

| 3,963,990 A | 6/1976 | DiFonzo |
| 4,119,964 A | 10/1978 | Fletcher et al. |
| 4,144,496 A | 3/1979 | Cunningham et al. |
| 4,168,496 A | 9/1979 | Lichtblau |
| 4,292,685 A | 9/1981 | Lee |
| 4,396,948 A | 8/1983 | Fernsler et al. |
| 4,425,639 A | 1/1984 | Acampora et al. |
| 4,506,383 A | 3/1985 | McGann |
| 4,672,655 A | 6/1987 | Koch |
| 4,819,227 A | 4/1989 | Rosen |

(Continued)

FOREIGN PATENT DOCUMENTS

| AU | 616363 | 10/1991 |
| CA | 2120908 | 3/1994 |

(Continued)

OTHER PUBLICATIONS

Canadian Office Action Corresponding to Canadian Application No. 2,534,269; Dated: Dec. 21, 2011; 8 pages.

(Continued)

*Primary Examiner* — Bobbak Safaipour
(74) *Attorney, Agent, or Firm* — Myers Bigel Sigbley & Sajovec, P.A.

(57) ABSTRACT

A signal strength that is associated with a first wireless communications channel is detected. Electromagnetic energy is transmitted over the first wireless communications channel in response to the signal strength being sufficiently weak. A determination is made whether a handoff should be made to a second wireless communications channel having a signal that is weaker than a signal of the first wireless communications channel. Related systems and methods are described.

62 Claims, 27 Drawing Sheets

Related U.S. Application Data

Dec. 4, 2001, now Pat. No. 6,859,652, and a continuation-in-part of application No. 09/918,709, filed on Aug. 1, 2001, now Pat. No. 6,892,068.

(60) Provisional application No. 60/222,605, filed on Aug. 2, 2000, provisional application No. 60/245,194, filed on Nov. 3, 2000, provisional application No. 60/250,461, filed on Dec. 4, 2000.

(56) References Cited

U.S. PATENT DOCUMENTS

| | | |
|---|---|---|
| 4,823,341 A | 4/1989 | Rosen |
| 4,870,408 A | 9/1989 | Zdunek et al. |
| 4,879,711 A | 11/1989 | Rosen |
| 4,901,307 A | 2/1990 | Gilhousen et al. |
| 4,956,875 A | 9/1990 | Bernard et al. |
| 4,979,170 A | 12/1990 | Gilhousen et al. |
| 4,985,706 A | 1/1991 | Schukat |
| 5,010,317 A | 4/1991 | Schwendeman et al. |
| 5,044,006 A | 8/1991 | Cyrulnik |
| 5,073,900 A | 12/1991 | Mallinckrodt |
| 5,073,971 A | 12/1991 | Schaeffer |
| 5,081,703 A | 1/1992 | Lee |
| 5,093,925 A | 3/1992 | Chanroo |
| 5,111,534 A | 5/1992 | Benner |
| 5,142,691 A | 8/1992 | Freeburg et al. |
| 5,193,101 A | 3/1993 | McDonald et al. |
| 5,193,102 A | 3/1993 | Meidan et al. |
| 5,208,829 A | 5/1993 | Soleimani et al. |
| 5,216,427 A | 6/1993 | Yan et al. |
| 5,247,699 A | 9/1993 | Hartman |
| 5,257,398 A | 10/1993 | Schaeffer |
| 5,268,694 A | 12/1993 | Jan et al. |
| 5,276,908 A | 1/1994 | Koohgoil et al. |
| 5,301,188 A | 4/1994 | Kotzin et al. |
| 5,303,286 A | 4/1994 | Wiedeman |
| 5,303,287 A | 4/1994 | Laborde |
| 5,317,593 A | 5/1994 | Fulghum et al. |
| 5,327,572 A | 7/1994 | Freeburg |
| 5,339,330 A | 8/1994 | Mallinckrodt |
| 5,355,520 A | 10/1994 | Freeburg et al. |
| 5,367,304 A | 11/1994 | Jan et al. |
| 5,394,561 A | 2/1995 | Freeburg |
| 5,408,496 A | 4/1995 | Ritz et al. |
| 5,410,728 A | 4/1995 | Bertiger et al. |
| 5,423,084 A | 6/1995 | Vatt |
| 5,428,818 A | 6/1995 | Meidan et al. |
| 5,444,449 A | 8/1995 | Poskett et al. |
| 5,446,756 A | 8/1995 | Mallinckrodt |
| 5,448,623 A | 9/1995 | Wiedeman et al. |
| 5,452,471 A | 9/1995 | Leopold et al. |
| 5,455,961 A | 10/1995 | Nakagawa |
| 5,469,468 A | 11/1995 | Schilling |
| 5,473,601 A | 12/1995 | Rosen et al. |
| 5,475,734 A | 12/1995 | McDonald et al. |
| 5,483,666 A | 1/1996 | Yamada et al. |
| 5,490,284 A | 2/1996 | Itoh et al. |
| 5,509,004 A * | 4/1996 | Bishop et al. ................ 370/325 |
| 5,511,233 A | 4/1996 | Otten |
| 5,524,280 A | 6/1996 | Douthitt et al. |
| 5,526,404 A | 6/1996 | Wiedeman et al. |
| 5,535,430 A | 7/1996 | Aoki et al. |
| 5,535,432 A | 7/1996 | Dent |
| 5,535,438 A | 7/1996 | Sevic |
| 5,548,800 A | 8/1996 | Olds et al. |
| 5,552,920 A | 9/1996 | Glynn |
| 5,555,257 A | 9/1996 | Dent |
| 5,559,866 A | 9/1996 | O'Neill |
| 5,564,076 A | 10/1996 | Auvray |
| 5,574,969 A | 11/1996 | Olds et al. |
| 5,584,046 A | 12/1996 | Martinez et al. |
| 5,586,165 A | 12/1996 | Wiedeman |
| 5,594,718 A | 1/1997 | Weaver, Jr. et al. |
| 5,594,720 A | 1/1997 | Papadopoulos et al. |
| 5,612,703 A | 3/1997 | Mallinckrodt |
| 5,619,503 A | 4/1997 | Dent |
| 5,619,525 A | 4/1997 | Wiedeman et al. |
| 5,625,624 A | 4/1997 | Rosen et al. |
| 5,625,672 A | 4/1997 | Yamada |
| 5,625,878 A | 4/1997 | Löppönen et al. |
| 5,630,757 A | 5/1997 | Gagin et al. |
| 5,631,898 A | 5/1997 | Dent |
| 5,641,134 A | 6/1997 | Vatt |
| 5,649,292 A | 7/1997 | Doner |
| 5,666,648 A | 9/1997 | Stuart |
| 5,668,837 A | 9/1997 | Dent |
| 5,669,062 A | 9/1997 | Olds et al. |
| 5,675,629 A | 10/1997 | Raffel et al. |
| 5,694,416 A | 12/1997 | Johnson |
| 5,701,584 A | 12/1997 | Dupuy |
| 5,703,874 A | 12/1997 | Schilling |
| 5,710,973 A | 1/1998 | Yamada |
| 5,717,830 A | 2/1998 | Sigler |
| 5,721,500 A | 2/1998 | Karanicolas |
| 5,729,538 A | 3/1998 | Dent |
| 5,732,359 A | 3/1998 | Baranowsky, II et al. |
| 5,739,874 A | 4/1998 | Badger et al. |
| 5,745,084 A | 4/1998 | Lusignan |
| 5,752,164 A | 5/1998 | Jones |
| 5,757,767 A | 5/1998 | Zehavi |
| 5,757,789 A | 5/1998 | Dent |
| 5,758,090 A | 5/1998 | Doner |
| 5,758,261 A | 5/1998 | Wiedman |
| 5,761,605 A | 6/1998 | Tawil et al. |
| 5,765,098 A | 6/1998 | Bella |
| 5,774,787 A | 6/1998 | Leopold et al. |
| 5,774,805 A | 6/1998 | Zicker |
| 5,790,070 A | 8/1998 | Natarajan et al. |
| 5,794,138 A | 8/1998 | Briskman |
| 5,802,474 A | 9/1998 | Faruque |
| 5,812,539 A | 9/1998 | Dent |
| 5,812,947 A * | 9/1998 | Dent ............................ 455/427 |
| 5,812,968 A | 9/1998 | Hassan et al. |
| 5,815,809 A | 9/1998 | Ward et al. |
| 5,822,680 A | 10/1998 | Stuart et al. |
| 5,825,325 A | 10/1998 | O'Donovan et al. |
| 5,826,190 A | 10/1998 | Krutz et al. |
| 5,828,963 A | 10/1998 | Grandhi et al. |
| 5,832,379 A | 11/1998 | Mallinckrodt |
| 5,832,380 A | 11/1998 | Ray et al. |
| 5,835,857 A | 11/1998 | Otten |
| 5,838,669 A | 11/1998 | Gerakoulis |
| 5,841,766 A | 11/1998 | Dent et al. |
| 5,844,894 A | 12/1998 | Dent |
| 5,848,060 A | 12/1998 | Dent |
| 5,848,359 A | 12/1998 | Furtaw |
| 5,852,721 A | 12/1998 | Dillon et al. |
| 5,854,985 A | 12/1998 | Sainton et al. |
| 5,859,838 A | 1/1999 | Soliman |
| 5,859,841 A | 1/1999 | Gitlits |
| 5,864,316 A | 1/1999 | Bradley et al. |
| 5,864,579 A | 1/1999 | Briskman |
| 5,867,527 A | 2/1999 | Ziv et al. |
| 5,867,765 A | 2/1999 | Nilsson |
| 5,867,789 A | 2/1999 | Olds et al. |
| 5,878,329 A | 3/1999 | Mallinckrodt |
| 5,878,346 A | 3/1999 | Ray et al. |
| 5,884,142 A | 3/1999 | Wiedeman et al. |
| 5,884,181 A | 3/1999 | Arnold et al. |
| 5,887,261 A | 3/1999 | Csapo et al. |
| 5,894,590 A | 4/1999 | Vatt et al. |
| 5,901,357 A | 5/1999 | D'Avello et al. |
| 5,907,541 A | 5/1999 | Fairholm et al. |
| 5,907,809 A | 5/1999 | Molnar et al. |
| 5,911,120 A | 6/1999 | Jarett et al. |
| 5,912,641 A | 6/1999 | Dietrich |
| 5,915,207 A | 6/1999 | Dao et al. |
| 5,920,804 A | 7/1999 | Armbruster et al. |
| 5,920,819 A | 7/1999 | Asanuma |
| 5,924,037 A | 7/1999 | Mao |
| 5,926,745 A | 7/1999 | Threadgill et al. |
| 5,926,758 A | 7/1999 | Grybos et al. |
| 5,926,762 A | 7/1999 | Arpee et al. |

| Patent | Date | Inventor |
|---|---|---|
| 5,929,804 A | 7/1999 | Jones et al. |
| 5,936,570 A | 8/1999 | Ghazvinian et al. |
| 5,937,332 A | 8/1999 | Karabinis |
| 5,937,352 A | 8/1999 | Courtney et al. |
| 5,940,033 A | 8/1999 | Locher et al. |
| 5,940,753 A | 8/1999 | Mallinckrodt |
| 5,940,765 A | 8/1999 | Haartsen |
| 5,949,766 A | 9/1999 | Ibanez-Meier et al. |
| 5,956,619 A | 9/1999 | Gallagher et al. |
| 5,959,984 A | 9/1999 | Dent |
| 5,960,351 A | 9/1999 | Przelomiec |
| 5,960,352 A | 9/1999 | Cherpantier |
| 5,960,364 A | 9/1999 | Dent |
| 5,963,561 A | 10/1999 | Lu |
| 5,963,862 A | 10/1999 | Adiwoso et al. |
| 5,970,410 A | 10/1999 | Carney et al. |
| 5,974,323 A | 10/1999 | Doner |
| 5,974,324 A | 10/1999 | Henson |
| 5,991,345 A | 11/1999 | Ramasastry |
| 5,995,832 A | 11/1999 | Mallinckrodt |
| 5,995,840 A | 11/1999 | Dorenbosch et al. |
| 5,995,841 A | 11/1999 | King et al. |
| 5,999,818 A | 12/1999 | Gilbert et al. |
| 6,002,935 A | 12/1999 | Wang |
| 6,008,760 A | 12/1999 | Shattil |
| 6,009,087 A | 12/1999 | Uchida et al. |
| 6,009,332 A | 12/1999 | Haartsen |
| 6,011,951 A | 1/2000 | King et al. |
| 6,018,658 A | 1/2000 | Blachier |
| 6,018,663 A | 1/2000 | Karlsson et al. |
| 6,019,318 A | 2/2000 | Cellier et al. |
| 6,021,309 A | 2/2000 | Sherman et al. |
| 6,023,463 A | 2/2000 | Wiedeman et al. |
| 6,023,605 A | 2/2000 | Sasaki et al. |
| 6,032,041 A | 2/2000 | Wainfan et al. |
| 6,035,178 A | 3/2000 | Chennakeshu et al. |
| 6,038,455 A | 3/2000 | Gardner et al. |
| 6,049,548 A | 4/2000 | Bruno et al. |
| 6,052,558 A | 4/2000 | Cook et al. |
| 6,052,560 A | 4/2000 | Karabinis |
| 6,052,586 A | 4/2000 | Karabinis |
| 6,061,562 A | 5/2000 | Martin et al. |
| 6,067,442 A | 5/2000 | Wiedeman et al. |
| 6,067,452 A | 5/2000 | Alexander |
| 6,067,453 A | 5/2000 | Adiwoso et al. |
| 6,072,430 A | 6/2000 | Wyrwas et al. |
| 6,072,768 A | 6/2000 | Wiedeman et al. |
| 6,075,777 A | 6/2000 | Agrawal et al. |
| 6,078,814 A | 6/2000 | Jeffries et al. |
| 6,084,865 A | 7/2000 | Dent |
| 6,085,093 A | 7/2000 | Vasudevan et al. |
| 6,085,094 A | 7/2000 | Vasudevan et al. |
| 6,088,341 A | 7/2000 | Hinedi et al. |
| 6,088,416 A | 7/2000 | Perahia et al. |
| 6,088,572 A | 7/2000 | Vatt et al. |
| 6,088,592 A | 7/2000 | Doner et al. |
| 6,091,933 A | 7/2000 | Sherman et al. |
| 6,091,936 A | 7/2000 | Chennakeshu et al. |
| 6,091,955 A | 7/2000 | Aalto et al. |
| 6,094,178 A | 7/2000 | Sanford |
| 6,094,628 A * | 7/2000 | Haber et al. .................. 704/201 |
| 6,097,708 A | 8/2000 | Mao |
| 6,097,752 A | 8/2000 | Wiedeman et al. |
| 6,101,385 A | 8/2000 | Monte et al. |
| 6,108,561 A | 8/2000 | Mallinckrodt |
| 6,112,083 A | 8/2000 | Sweet et al. |
| 6,112,085 A | 8/2000 | Garner et al. |
| 6,119,011 A | 9/2000 | Borst et al. |
| 6,122,291 A | 9/2000 | Robinson et al. |
| 6,122,499 A | 9/2000 | Magnusson |
| 6,125,260 A | 9/2000 | Wiedeman et al. |
| 6,126,116 A | 10/2000 | Cellier |
| 6,128,490 A | 10/2000 | Shaheen et al. |
| 6,128,497 A | 10/2000 | Faruque |
| 6,134,437 A | 10/2000 | Karabinis et al. |
| 6,134,442 A | 10/2000 | Borst et al. |
| 6,138,010 A | 10/2000 | Rabe et al. |
| 6,141,566 A | 10/2000 | Gerdisch et al. |
| 6,154,654 A | 11/2000 | Mao |
| 6,154,655 A | 11/2000 | Borst et al. |
| 6,157,621 A | 12/2000 | Brown et al. |
| 6,157,811 A | 12/2000 | Dent |
| 6,157,834 A | 12/2000 | Helm et al. |
| 6,160,994 A | 12/2000 | Wiedeman |
| 6,169,878 B1 | 1/2001 | Tawil et al. |
| 6,198,730 B1 | 3/2001 | Hogberg et al. |
| 6,198,921 B1 | 3/2001 | Youssefzadeh et al. |
| 6,201,967 B1 | 3/2001 | Goerke |
| 6,219,546 B1 | 4/2001 | Valentine et al. |
| 6,223,041 B1 | 4/2001 | Egner et al. |
| 6,233,463 B1 | 5/2001 | Wiedeman et al. |
| 6,240,124 B1 | 5/2001 | Wiedeman et al. |
| 6,253,080 B1 | 6/2001 | Wiedeman et al. |
| 6,256,497 B1 | 7/2001 | Chambers |
| 6,324,405 B1 | 11/2001 | Young et al. |
| 6,339,707 B1 | 1/2002 | Wainfan et al. |
| 6,356,539 B1 | 3/2002 | Zuliani et al. |
| 6,377,802 B1 | 4/2002 | McKenna et al. |
| 6,418,147 B1 | 7/2002 | Wiedeman |
| 6,449,461 B1 | 9/2002 | Otten |
| 6,519,060 B1 * | 2/2003 | Liu ................................ 398/49 |
| 6,522,865 B1 | 2/2003 | Otten |
| 6,535,717 B1 | 3/2003 | Matsushima et al. |
| 6,545,779 B1 * | 4/2003 | Liu et al. ........................ 398/14 |
| 6,580,921 B1 | 6/2003 | Inoue et al. |
| 6,628,919 B1 | 9/2003 | Curello et al. |
| 6,684,057 B2 | 1/2004 | Karabinis |
| 6,735,437 B2 | 5/2004 | Mayfield et al. |
| 6,775,251 B1 * | 8/2004 | Wiedeman et al. ........... 370/316 |
| 6,785,543 B2 | 8/2004 | Karabinis |
| 6,856,787 B2 | 2/2005 | Karabinis |
| 6,859,652 B2 * | 2/2005 | Karabinis et al. ............. 455/427 |
| 6,879,829 B2 | 4/2005 | Dutta et al. |
| 6,892,068 B2 | 5/2005 | Karabinis et al. |
| 6,937,857 B2 | 8/2005 | Karabinis |
| 6,975,837 B1 | 12/2005 | Santoru |
| 6,999,720 B2 | 2/2006 | Karabinis |
| 7,006,789 B2 | 2/2006 | Karabinis et al. |
| 7,031,702 B2 | 4/2006 | Karabinis et al. |
| 7,039,400 B2 | 5/2006 | Karabinis et al. |
| 7,062,267 B2 | 6/2006 | Karabinis |
| 7,092,708 B2 | 8/2006 | Karabinis |
| 7,095,980 B2 | 8/2006 | Toya |
| 7,113,743 B2 | 9/2006 | Karabinis |
| 7,113,778 B2 | 9/2006 | Karabinis |
| 7,155,340 B2 | 12/2006 | Churan |
| 7,174,127 B2 | 2/2007 | Otten et al. |
| 7,181,161 B2 | 2/2007 | Karabinis |
| 7,203,490 B2 | 4/2007 | Karabinis |
| 7,218,931 B2 | 5/2007 | Karabinis |
| 7,260,391 B2 | 8/2007 | Hutchinson |
| 7,295,807 B2 | 11/2007 | Karabinis |
| 7,340,213 B2 | 3/2008 | Karabinis et al. |
| 7,418,236 B2 | 8/2008 | Levin et al. |
| 7,418,263 B2 | 8/2008 | Dutta et al. |
| 7,421,342 B2 | 9/2008 | Churan |
| 7,437,123 B2 | 10/2008 | Karabinis et al. |
| 7,444,170 B2 | 10/2008 | Karabinis |
| 7,447,501 B2 | 11/2008 | Karabinis |
| 7,453,396 B2 | 11/2008 | Levin et al. |
| 7,453,920 B2 | 11/2008 | Churan |
| 7,454,175 B2 | 11/2008 | Karabinis |
| 7,457,269 B1 | 11/2008 | Grayson |
| 7,558,568 B2 | 7/2009 | Karabinis |
| 7,574,206 B2 | 8/2009 | Karabinis |
| 7,577,400 B2 * | 8/2009 | Karabinis et al. ............. 455/12.1 |
| 7,587,171 B2 | 9/2009 | Evans et al. |
| 7,593,691 B2 | 9/2009 | Karabinis |
| 7,593,724 B2 | 9/2009 | Karabinis |
| 7,593,725 B2 | 9/2009 | Karabinis |
| 7,593,726 B2 | 9/2009 | Karabinis et al. |
| 7,596,111 B2 | 9/2009 | Karabinis |
| 7,599,656 B2 | 10/2009 | Karabinis |
| 7,603,081 B2 | 10/2009 | Karabinis |
| 7,603,117 B2 | 10/2009 | Karabinis |
| 7,606,590 B2 | 10/2009 | Karabinis |
| 7,609,666 B2 | 10/2009 | Karabinis |
| 7,620,394 B2 | 11/2009 | Good et al. |

| Patent/Pub No. | Date | Inventor |
|---|---|---|
| 7,623,859 B2 | 11/2009 | Karabinis |
| 7,623,867 B2 | 11/2009 | Karabinis |
| 7,627,285 B2 | 12/2009 | Karabinis |
| 7,634,229 B2 | 12/2009 | Karabinis |
| 7,634,234 B2 | 12/2009 | Karabinis |
| 7,636,546 B2 | 12/2009 | Karabinis |
| 7,636,566 B2 | 12/2009 | Karabinis |
| 7,636,567 B2 | 12/2009 | Karabinis et al. |
| 7,639,981 B2 | 12/2009 | Karabinis |
| 7,653,348 B2 | 1/2010 | Karabinis |
| 7,664,460 B2 | 2/2010 | Karabinis et al. |
| 7,696,924 B2 | 4/2010 | Levin et al. |
| 7,706,746 B2 | 4/2010 | Karabinis et al. |
| 7,706,748 B2 | 4/2010 | Dutta |
| 7,706,826 B2 | 4/2010 | Karabinis |
| 7,747,229 B2 | 6/2010 | Dutta |
| 7,751,823 B2 | 7/2010 | Karabinis |
| 7,756,490 B2 | 7/2010 | Karabinis |
| 7,783,287 B2 | 8/2010 | Karabinis |
| 7,792,069 B2 | 9/2010 | Karabinis |
| 7,792,488 B2 | 9/2010 | Karabinis et al. |
| 7,796,985 B2 | 9/2010 | Karabinis |
| 7,796,986 B2 | 9/2010 | Karabinis |
| 7,801,520 B2 | 9/2010 | Karabinis |
| 2002/0068590 A1 | 6/2002 | Suzuki et al. |
| 2002/0090942 A1* | 7/2002 | Karabinis et al. ............ 455/427 |
| 2002/0122408 A1 | 9/2002 | Mullins |
| 2002/0146979 A1 | 10/2002 | Regulinski et al. |
| 2002/0177465 A1 | 11/2002 | Robinett |
| 2003/0003815 A1 | 1/2003 | Yamada |
| 2003/0022625 A1 | 1/2003 | Otten et al. |
| 2003/0054762 A1 | 3/2003 | Karabinis |
| 2003/0054814 A1 | 3/2003 | Karabinis et al. |
| 2003/0054815 A1 | 3/2003 | Karabinis |
| 2003/0068978 A1 | 4/2003 | Karabinis et al. |
| 2003/0073436 A1 | 4/2003 | Karabinis et al. |
| 2003/0149986 A1 | 8/2003 | Mayfield et al. |
| 2003/0153308 A1 | 8/2003 | Karabinis |
| 2003/0203717 A1* | 10/2003 | Chuprun et al. ............ 455/12.1 |
| 2004/0072539 A1 | 4/2004 | Monte et al. |
| 2004/0102156 A1 | 5/2004 | Loner |
| 2004/0121727 A1 | 6/2004 | Karabinis |
| 2004/0131125 A1 | 7/2004 | Sanderford, Jr. et al. |
| 2004/0142660 A1 | 7/2004 | Churan |
| 2004/0192200 A1 | 9/2004 | Karabinis |
| 2004/0192293 A1 | 9/2004 | Karabinis |
| 2004/0192395 A1 | 9/2004 | Karabinis |
| 2004/0203393 A1 | 10/2004 | Chen |
| 2004/0203742 A1 | 10/2004 | Karabinis |
| 2004/0240525 A1 | 12/2004 | Karabinis et al. |
| 2005/0026606 A1 | 2/2005 | Karabinis |
| 2005/0037749 A1 | 2/2005 | Karabinis et al. |
| 2005/0041619 A1 | 2/2005 | Karabinis et al. |
| 2005/0064813 A1 | 3/2005 | Karabinis |
| 2005/0079816 A1 | 4/2005 | Singh et al. |
| 2005/0090256 A1 | 4/2005 | Dutta |
| 2005/0118948 A1 | 6/2005 | Karabinis et al. |
| 2005/0136836 A1 | 6/2005 | Karabinis et al. |
| 2005/0164700 A1 | 7/2005 | Karabinis |
| 2005/0164701 A1 | 7/2005 | Karabinis et al. |
| 2005/0170834 A1 | 8/2005 | Dutta et al. |
| 2005/0181786 A1 | 8/2005 | Karabinis et al. |
| 2005/0201449 A1 | 9/2005 | Churan |
| 2005/0208890 A1 | 9/2005 | Karabinis |
| 2005/0221757 A1 | 10/2005 | Karabinis |
| 2005/0227618 A1 | 10/2005 | Karabinis et al. |
| 2005/0239399 A1 | 10/2005 | Karabinis |
| 2005/0239403 A1 | 10/2005 | Karabinis |
| 2005/0239404 A1 | 10/2005 | Karabinis |
| 2005/0239457 A1 | 10/2005 | Levin et al. |
| 2005/0245192 A1 | 11/2005 | Karabinis |
| 2005/0260947 A1 | 11/2005 | Karabinis et al. |
| 2005/0260984 A1 | 11/2005 | Karabinis |
| 2005/0265273 A1* | 12/2005 | Karabinis et al. ............ 370/316 |
| 2005/0272369 A1 | 12/2005 | Karabinis et al. |
| 2005/0282542 A1 | 12/2005 | Karabinis |
| 2005/0288011 A1 | 12/2005 | Dutta |
| 2006/0040613 A1 | 2/2006 | Karabinis et al. |
| 2006/0094420 A1 | 5/2006 | Karabinis |
| 2006/0135058 A1 | 6/2006 | Karabinis |
| 2006/0135070 A1 | 6/2006 | Karabinis |
| 2006/0165120 A1 | 7/2006 | Karabinis |
| 2006/0189275 A1 | 8/2006 | Karabinis |
| 2006/0194576 A1 | 8/2006 | Karabinis et al. |
| 2006/0205347 A1 | 9/2006 | Karabinis |
| 2006/0205367 A1 | 9/2006 | Karabinis |
| 2006/0211452 A1 | 9/2006 | Karabinis |
| 2006/0246838 A1 | 11/2006 | Karabinis |
| 2006/0246909 A1* | 11/2006 | Petermann .................... 455/444 |
| 2006/0252368 A1 | 11/2006 | Karabinis |
| 2006/0292990 A1 | 12/2006 | Karabinis et al. |
| 2007/0010246 A1 | 1/2007 | Churan |
| 2007/0015460 A1 | 1/2007 | Karabinis et al. |
| 2007/0021059 A1 | 1/2007 | Karabinis et al. |
| 2007/0021060 A1* | 1/2007 | Karabinis et al. ............ 455/12.1 |
| 2007/0037514 A1 | 2/2007 | Karabinis |
| 2007/0072545 A1 | 3/2007 | Karabinis et al. |
| 2007/0099562 A1 | 5/2007 | Karabinis et al. |
| 2007/0123252 A1 | 5/2007 | Tronc et al. |
| 2007/0129019 A1 | 6/2007 | Otten et al. |
| 2007/0135051 A1 | 6/2007 | Zheng et al. |
| 2007/0184849 A1 | 8/2007 | Zheng |
| 2007/0192805 A1 | 8/2007 | Dutta et al. |
| 2007/0202816 A1 | 8/2007 | Zheng |
| 2007/0243866 A1 | 10/2007 | Karabinis |
| 2007/0281612 A1 | 12/2007 | Benjamin et al. |
| 2007/0293214 A1 | 12/2007 | Ansari et al. |
| 2008/0008264 A1 | 1/2008 | Zheng |
| 2008/0032671 A1 | 2/2008 | Karabinis |
| 2008/0113666 A1 | 5/2008 | Monte et al. |
| 2008/0119190 A1 | 5/2008 | Karabinis |
| 2008/0160993 A1 | 7/2008 | Levin et al. |
| 2008/0182572 A1 | 7/2008 | Tseytlin et al. |
| 2008/0214207 A1 | 9/2008 | Karabinis |
| 2008/0268836 A1 | 10/2008 | Karabinis et al. |
| 2009/0011704 A1 | 1/2009 | Karabinis |
| 2009/0029696 A1 | 1/2009 | Karabinis |
| 2009/0042509 A1 | 2/2009 | Karabinis et al. |
| 2009/0042516 A1 | 2/2009 | Karabinis |
| 2009/0075645 A1 | 3/2009 | Karabinis |
| 2009/0088151 A1 | 4/2009 | Karabinis |
| 2009/0137203 A1 | 5/2009 | Karabinis et al. |
| 2009/0156154 A1 | 6/2009 | Karabinis et al. |
| 2009/0170427 A1 | 7/2009 | Karabinis |
| 2009/0170428 A1 | 7/2009 | Karabinis |
| 2009/0170429 A1 | 7/2009 | Karabinis |
| 2009/0186622 A1 | 7/2009 | Karabinis |
| 2009/0231187 A1 | 9/2009 | Churan |
| 2009/0296628 A1 | 12/2009 | Karabinis |
| 2009/0305697 A1 | 12/2009 | Karabinis et al. |
| 2009/0312013 A1 | 12/2009 | Karabinis |
| 2010/0009677 A1 | 1/2010 | Karabinis et al. |
| 2010/0015971 A1 | 1/2010 | Good et al. |
| 2010/0029269 A1 | 2/2010 | Karabinis |
| 2010/0035604 A1 | 2/2010 | Dutta et al. |
| 2010/0035605 A1 | 2/2010 | Karabinis |
| 2010/0035606 A1 | 2/2010 | Karabinis |
| 2010/0039967 A1 | 2/2010 | Karabinis et al. |
| 2010/0041394 A1 | 2/2010 | Karabinis |
| 2010/0041395 A1 | 2/2010 | Karabinis |
| 2010/0041396 A1 | 2/2010 | Karabinis |
| 2010/0048201 A1 | 2/2010 | Karabinis |
| 2010/0054160 A1 | 3/2010 | Karabinis |
| 2010/0120419 A1 | 5/2010 | Zheng et al. |
| 2010/0141509 A1 | 6/2010 | Levin et al. |
| 2010/0184370 A1 | 7/2010 | Zheng et al. |
| 2010/0184381 A1 | 7/2010 | Zheng et al. |
| 2010/0184427 A1 | 7/2010 | Zheng et al. |
| 2010/0190507 A1 | 7/2010 | Karabinis et al. |
| 2010/0203828 A1 | 8/2010 | Zheng |
| 2010/0203884 A1 | 8/2010 | Zheng et al. |
| 2010/0210209 A1 | 8/2010 | Karabinis et al. |
| 2010/0210262 A1 | 8/2010 | Karabinis et al. |
| 2010/0240362 A1 | 9/2010 | Karabinis |

FOREIGN PATENT DOCUMENTS

| | | |
|---|---|---|
| CA | 2157182 | 7/1995 |
| CA | 2043127 | 5/1996 |

| | | | | | | |
|---|---|---|---|---|---|---|
| CA | 2175897 | 2/1997 | | EP | 1 059 826 A1 | 12/2000 |
| CA | 2226883 | 8/1998 | | EP | 1059826 | 12/2000 |
| CA | 2199598 | 9/1998 | | EP | 1 193 989 A1 | 4/2002 |
| CA | 2106568 | 7/2001 | | EP | 1 944 885 A2 | 7/2008 |
| DE | 4424412 | 1/1996 | | EP | 1 569 363 B1 | 11/2008 |
| DE | 19648178 | 6/1998 | | FR | 2627035 | 8/1989 |
| DE | 19751869 | 7/1998 | | FR | 2687873 | 3/1994 |
| DE | 19819422 | 11/1998 | | GB | 1411991 | 10/1975 |
| DE | 19735527 | 3/1999 | | GB | 2304495 | 3/1997 |
| DE | 69129938 | 3/1999 | | GB | 2 322 521 A | 8/1998 |
| DE | 29900867 | 9/1999 | | GB | 2341515 | 3/2000 |
| DE | 69230393 | 7/2000 | | JP | 49-71810 | 7/1974 |
| EP | 1411991 | 10/1975 | | JP | 50-122110 | 9/1975 |
| EP | 00104577 | 9/1983 | | JP | 54-47512 | 4/1979 |
| EP | 0304890 | 3/1989 | | JP | 60-85634 | 5/1985 |
| EP | 484662 | 5/1992 | | JP | 60-212040 | 10/1985 |
| EP | 277205 | 8/1992 | | JP | 64-500478 | 2/1989 |
| EP | 0 506 255 A2 | 9/1992 | | JP | 1-500710 | 3/1989 |
| EP | 0569693 | 3/1993 | | JP | 1-128632 | 5/1989 |
| EP | 0578075 | 6/1993 | | JP | 1-170199 | 7/1989 |
| EP | 0616437 | 2/1994 | | JP | 2-1629 | 1/1990 |
| EP | 0 597 225 A1 | 5/1994 | | JP | 2-500317 | 2/1990 |
| EP | 597225 | 5/1994 | | JP | 4-207529 | 7/1992 |
| EP | 311919 | 6/1994 | | JP | 4-347947 | 12/1992 |
| EP | 0637895 | 7/1994 | | JP | 5-37449 | 2/1993 |
| EP | 0662758 | 1/1995 | | JP | 5-122092 | 5/1993 |
| EP | 0687117 | 5/1995 | | JP | 5-503624 | 6/1993 |
| EP | 483545 | 6/1995 | | JP | 5-505082 | 7/1993 |
| EP | 707389 | 4/1996 | | JP | 5-505292 | 8/1993 |
| EP | 712215 | 5/1996 | | JP | 6-6856 | 1/1994 |
| EP | 732814 | 9/1996 | | JP | 6-120870 | 4/1994 |
| EP | 0 506 255 B1 | 11/1996 | | JP | 6-169275 | 6/1994 |
| EP | 0506255 | 11/1996 | | JP | 6-177815 | 6/1994 |
| EP | 0 748 065 A2 | 12/1996 | | JP | 6-177823 | 6/1994 |
| EP | 0750406 | 12/1996 | | JP | 6-237209 | 8/1994 |
| EP | 0 755 163 A2 | 1/1997 | | JP | 6-276141 | 9/1994 |
| EP | 0752766 | 1/1997 | | JP | 6-311089 | 11/1994 |
| EP | 0 762 669 | 3/1997 | | JP | 6-326650 | 11/1994 |
| EP | 0762669 | 3/1997 | | JP | 7-22990 | 1/1995 |
| EP | 0767547 | 4/1997 | | JP | 7-115408 | 5/1995 |
| EP | 782360 | 7/1997 | | JP | 7-505512 | 6/1995 |
| EP | 0 797 319 A2 | 9/1997 | | JP | 07-222237 | 8/1995 |
| EP | 0 831 599 A2 | 3/1998 | | JP | 07-231287 | 8/1995 |
| EP | 0831599 | 3/1998 | | JP | 8-65739 | 3/1996 |
| EP | 937340 | 5/1998 | | JP | 8-214360 | 8/1996 |
| EP | 0858177 | 8/1998 | | JP | 8-214362 | 8/1996 |
| EP | 0866569 | 9/1998 | | JP | 8-214364 | 8/1996 |
| EP | 0 869 628 A1 | 10/1998 | | JP | 8-289360 | 11/1996 |
| EP | 0869625 | 10/1998 | | JP | 8-510609 | 11/1996 |
| EP | 0869628 | 10/1998 | | JP | 9-506228 | 6/1997 |
| EP | 0872966 | 10/1998 | | JP | 9-205678 | 8/1997 |
| EP | 0876005 | 11/1998 | | JP | 10-93326 | 4/1998 |
| EP | 0883252 | 12/1998 | | JP | 10-94042 | 4/1998 |
| EP | 0910178 | 4/1999 | | JP | 10-98447 | 4/1998 |
| EP | 471656 | 5/1999 | | JP | 10-506517 | 6/1998 |
| EP | 0915575 | 5/1999 | | JP | 10-209939 | 8/1998 |
| EP | 926912 | 6/1999 | | JP | 10-210463 | 8/1998 |
| EP | 650270 | 12/1999 | | JP | 10-508732 | 8/1998 |
| EP | 0967740 | 12/1999 | | JP | 10-233792 | 9/1998 |
| EP | 0971488 | 1/2000 | | JP | 10-509851 | 9/1998 |
| EP | 0977376 | 2/2000 | | JP | 10-308972 | 11/1998 |
| EP | 0987913 | 3/2000 | | JP | 10-322756 | 12/1998 |
| EP | 994632 | 4/2000 | | JP | 10-322759 | 12/1998 |
| EP | 0998060 | 5/2000 | | JP | 10-341479 | 12/1998 |
| EP | 0999662 | 5/2000 | | JP | 11-103271 | 4/1999 |
| EP | 1006678 | 6/2000 | | JP | 11-225369 | 8/1999 |
| EP | 1006679 | 6/2000 | | JP | 11-509065 | 8/1999 |
| EP | 1011210 | 6/2000 | | JP | 11-313365 | 11/1999 |
| EP | 650271 | 8/2000 | | JP | 11-331929 | 11/1999 |
| EP | 0701337 | 8/2000 | | JP | 11-331930 | 11/1999 |
| EP | 1030467 | 8/2000 | | JP | 11-355839 | 12/1999 |
| EP | 1032141 | 8/2000 | | JP | 2000-36783 | 2/2000 |
| EP | 1035664 | 9/2000 | | JP | 2000-49753 | 2/2000 |
| EP | 1037399 | 9/2000 | | JP | 2000-68921 | 3/2000 |
| EP | 1037400 | 9/2000 | | JP | 2000-78651 | 3/2000 |
| EP | 1037402 | 9/2000 | | JP | 2000-196564 | 7/2000 |
| EP | 1037403 | 9/2000 | | JP | 2000-295160 | 10/2000 |
| EP | 1047216 | 10/2000 | | MX | 153346 | 9/1986 |
| EP | 1052787 | 11/2000 | | MX | 9102297 | 11/1992 |

| | | |
|---|---|---|
| MX | 175230 | 7/1994 |
| MX | 176552 | 11/1994 |
| MX | 9302661 | 11/1994 |
| MX | 177607 | 4/1995 |
| MX | 9306817 | 4/1996 |
| MX | 9404184 | 8/1996 |
| MX | 9708291 | 6/1998 |
| MX | 192777 | 7/1999 |
| MX | 9401381 | 7/1999 |
| MX | 9905993 | 12/1999 |
| WO | 90/13186 | 11/1990 |
| WO | 91/13502 | 9/1991 |
| WO | 91/13521 | 9/1991 |
| WO | 94/18804 | 8/1994 |
| WO | 95/16332 | 6/1995 |
| WO | 95/19078 | 7/1995 |
| WO | 95/27381 | 10/1995 |
| WO | 96/08878 | 3/1996 |
| WO | 96/12377 | 4/1996 |
| WO | 96/13952 | 5/1996 |
| WO | 96/14692 | 5/1996 |
| WO | 96/16488 | 5/1996 |
| WO | 96/19049 | 6/1996 |
| WO | 96/21332 | 7/1996 |
| WO | 96/34503 | 10/1996 |
| WO | 96/37082 | 11/1996 |
| WO | 97/07601 | 2/1997 |
| WO | 97/12489 | 4/1997 |
| WO | 97/14260 | 4/1997 |
| WO | 97/24884 | 7/1997 |
| WO | 97/26767 | 7/1997 |
| WO | 97/28618 | 8/1997 |
| WO | 97/32360 | 9/1997 |
| WO | 97/32440 | 9/1997 |
| WO | 97/32442 | 9/1997 |
| WO | 98/11748 | 3/1998 |
| WO | 98/14026 | 4/1998 |
| WO | 98/20618 | 5/1998 |
| WO | 98/20619 | 5/1998 |
| WO | 98/20629 | 5/1998 |
| WO | 98/28947 | 7/1998 |
| WO | 98/44644 | 10/1998 |
| WO | 98/44656 | 10/1998 |
| WO | 98/52364 | 11/1998 |
| WO | 99/00916 | 1/1999 |
| WO | 99/04589 | 1/1999 |
| WO | 99/10994 | 3/1999 |
| WO | 99/22543 | 5/1999 |
| WO | 99/23718 | 5/1999 |
| WO | 99/31815 | 6/1999 |
| WO | 99/31832 | 6/1999 |
| WO | 99/34636 | 7/1999 |
| WO | WO 99/34636 A1 | 7/1999 |
| WO | 99/48308 | 9/1999 |
| WO | 99/52230 | 10/1999 |
| WO | 00/04659 | 1/2000 |
| WO | 00/21217 | 4/2000 |
| WO | 00/47010 | 8/2000 |
| WO | 00/51367 | 8/2000 |
| WO | WO 01/54314 A1 | 7/2001 |
| WO | WO 02/080483 A1 | 10/2002 |

OTHER PUBLICATIONS

Communication Including Supplementary Partial European Search Report EP 01995292.8/US0145156, Feb. 3, 2004.
European Search Report, European Application No. 05016754.3, Aug. 3, 2006.
European Search Report, European Application No. 05016809.3, Aug. 21, 2006.
International Search Report, PCT Application No. PCT/US01/45156, Jul. 15, 2002.
Araki, Noriyuki; Minamisono, Kenichi; Oodo, Masayuki; Miura, Ryu. "Frequency Sharing of FSS and HAPS in the Reverse Band Working." *AIAA International Communications Satellite Systems Conference and Exhibit*, Apr. 10-14, 2000. Collection of Technical Papers vol. 2. American Institute of Aeronautics and Astronautics, pp. 1074-1081. (Abstract).
Chang, John W. "Visibility Considerations in Frequency Sharing with Low Earth Orbit Satellites." *Engineering Institute of Canada, Canadian Conference on Electrical and Computer Engineering*. Vols. 1 and 24. (Abstract).
Krishnamarchari, Bhaskar. "Channel Allocation," www.ee.cornelledu/~bhaskar/msthesis/node19.htm, May 11, 1999.
Mete, Jim. "Trucking a Winner in ARDIS Acquisition." Intertec Publishing Corporation. Jan. 15, 1998, www.fleetowner.com/edit/news/980102.htm.
Ayyagari, Deepak and Anthony Ephremides. "A Satellite-Augmented Cellular Network Concept." *Wireless Networks* 4 (1998): 189-198.
Sempere, Javier Gozalvez. "Overview of the GSM System," 1997. www.comms.eee.strath.ac.uk/~gozalvez/gsm/gsm.
Katzela, I. and M. Nagshineh. "Channel Assignment Schemes for Cellular Mobile Telecommunication Systems: A Comprehensive Survey." *IEEE Personal Communications Magazine*, Jun. 1996, pp. 10-31.
Rickerson, Don and Mark Rhoads. "Symphony or Calliope—Frequency Management with Mobile Satellite Services." *IEEE* (1996); 943-947.
Vermeer, M. "Some Simulated Noise Inversion Studies of Satellite Geopotential Missions Involving "Criterion Functions" in the Frequency Domain." *Journal of Geology*, vol. 70, No. 7, Apr. 1996. Germany: Springer-Verlag, pp. 397-409. (Abstract).
James, M. C. "Interference Considerations in Frequency Sharing Between Low Earth Orbit Satellites and the Geostationary Fixed Satellite and Terrestrial Service." *International Journal of Satellite Communications*, vol. 13, No. 3, May-Jun. 1995, United Kingdom: IEE, pp. 171-176. (Abstract).
Cosmas, J. B. Evans, C. Evci, W. Herzig, H. Persson, J. Pettifor, P. Polese, R. Rheinschmitt and A. Samukic. "Overview of the Mobile Communications Programme of RACE II," *Electronics & Communication Engineering Journal*, No. 4, Aug. 1995, pp. 155-167.
Re, Enrico Del and Piero Iannucci. "The GSM Procedures in an Integrated Cellular/Satellite System," *IEEE Journal on Selected Areas in Communications*, vol. 13, pNo.2, Feb. 1995, pp. 421-430.
Yu-Dong Yao. "Interference Analysis of Mobile Satellite Systems with Frequency Reuse." *VTC 1994. 'Creating Tomorrow's Mobile Systems.'* vol. 3. IEEE 44$^{th}$ Vehicular Technology Conference. New York: IEEE pp. 1621-1624. (Abstract).
Hu, Lo-Rong and Stephen S. Rappaport. "Personal Communications Systems Using Multiple Hierarchical Cellular Overlays," *Third International Conference on Universal Personal Communications*, Sep. 27-Oct. 1, 1994, pp. 397-401.
Priscoli, Francesco Delli, "Architecture of an Integrated GSM-Satellite System," *European Transactions on Telecommunications and Related Technologies*, vol., No. 5, Sep.-Oct. 1994, pp. 91/625-99/633.
Charbonnier, A., J. Hubert, J. Attal, M. Cohen and C. Evci. "Perspectives for Mobile Communication," *Commutation & Transmission Special Issue*, 1993, pp. 109-121.
Priscoli, Francesco Delli. "Network Aspects Relevant to the Integration Between the GSM Network and a Satellite System," *ICUPC*, 1993, pp. 339-343.
Baranówsky II, Patrick W. "MSAT and Cellular Hybrid Networking," *Proceedings of the Third International Mobile Satellite Conference*, Jun. 16-18, 1993, pp. 149-154.
Hendrix, C. E.; Kulon, G.; Anderson, C.S.; Heinze, M. A. "Multigigabit Transmission Through Rain in a Dual Polarization Frequency Reuse System: An Experimental Study." *IEEE Transactions on Communications*, vol. 41, No. 12. Dec. 1993. pp. 1830-1807. (Abstract).
Cohen, M.; Michel, C.; Rouffet, D.; Tanguy, Y. "Frequency Sharing Between LEO Systems." *Fourth IEE Conference on Telecommunications*, Conference Publication No. 371, 1993, London: IEE, pp. 312-317, (Abstract).
Kondo, H.; Nakajima, S.; Komagata, H. "Frequency Shared Access Control for Multi-Beam Mobile Satellite Communications Systems," *SUPERCOMM/ICC '92. Discovering a New World of Communications*. vol. 2, 1992, New York: IEEE, pp. 755-759. (Abstract).

Baker, A. N. "Frequency Reuse in Land Mobile-Satellite Systems." *IEE Colloquium on 'Land Mobile Satellite Systems,'* Digest No. 154, 1992, London: IEE, pp. 5/1-5. (Abstract).

Sato, S.; Iso, A.; Orikasa, T.; Sugimoto, T. "Frequency Reuse and Mesh Reflector Mass of Multi-Beam Antenna Having Different Elliptical Beams on Transmitting and Receiving for Mobile Communication Satellites." *Transactions of the Institute of Electronics, Information and Communication Engineers B-II*, vol. J75BII, No. 2, Feb. 1992, pp. 150-152. (Abstract).

Bernhardt, Richard C. "Call Performance of a TDMA Portable Radio System with Frequency Reuse." *GLOBECOM '91. IEEE Global Telecommunications Conference*, Phoenix, Arizona, Dec. 2-5, 1991. Conference Record vol. 2, New York: Institute of Electrical and Electronics Engineers, Inc. pp. 987-991. (Abstract).

Bernhardt, Richard C. "Call Performance in a Frequency Reuse Digital Portable Radio System." *IEEE Transactions Vehicular Technology*, vol. 40, No. 4, Nov. 1991, pp. 777-785, (Abstract).

Rappaport, T. S.; Milstein, L. B. "Effects of Path Loss and Fringe User Distribution on CDMA Cellular Frequency Reuse Efficiency." *GLOBECOM '90: IEEE Global Telecommunications Conference and Exhibition: 'Communications: Connecting the Future'*. vol. 3, 1990, New York: IEEE, pp. 500-506 vol. 1, (Abstract).

Boutin, L.; Lecours, M.; Pelletier, M.; Delisle, G. Y. "Effects of Fade Distribution on a Mobile Satellite Down-Link and Up-Link Performance in a Frequency Reuse Cellular Configuration." *International Journal of Satellite Communications*, vol. 9, No. 3, May-Jun. 1991, pp. 167-170. (Abstract).

Bernhardt, Richard C. "Time-Slot Management in Frequency Reuse Digital Portable Radio Systems." *40th IEEE Vehicular Technology Conference. On the Move in the 90's*, 1990, New York; IEEE, pp. 282-286. (Abstract).

Sultan, Nizar. "Four Ocean Satellites—Solution to Significant Increase in Frequency Reuse for Multibeam Global Coverage," *IAF International Astronautical Congress*, 41st Dresden, Federal Republic of Germany, Oct. 6-12, 1990. (Abstract).

Sultan, N.; Wood, P. J. "Erlang Reuse Concept: Figure of Merit for Frequency Reuse Applied to Mobile Satellite Systems." *Space Technology*, vol. 9, No. 4, 1989, pp. 375-381. (Abstract).

Jayasuriya, D.A.R.; Lynch, S. B. "Comparison of Frequency Sharing Aspects of Satellites in Elliptical Orbits and the Geostationary Orbit." *International Conference on Satellite Systems for Mobile Communications and Navigation*, 4th, London, England, Oct. 17-19, 1988. pp. 154-157. (Abstract).

Takasugi, Toshio. "Review of CCIR Volumes., IX—Fixed Service Using Radio-Relay Systems. IV/IX—Frequency Sharing and Coordination Between Systems in the Fixed-Satellite Service and Radio-Relay Systems." *Radio Research Laboratory Journal*. vol. 34, Nov. 1987, pp. 141-171. (No Abstract).

Colombo, Gianni; Settimo, Franco; Vernucci, Antonio. "Rearrangement Procedures in Regenerative Multibeammobile Communications Satellites with Frequency Reuse," *Jet Propulsion Lab., Proceedings of the Mobile Satellite Conference*, pp. 381-386. (Abstract).

Borgne, Michel, "Cross Polarization Interference Cancellers for a Frequency Reuse Radio Channel," *Annales des Telecommunications*, vol. 42, Jan.-Feb. 1987, pp. 39-52, (Abstract)

Durkin, John; Withers, David J. "Frequency Band Sharing and WARC-ORB-85." *ICC '86 Proceedings of the International Conference on Communications*, Toronto, Canada, Jun. 22-25, 1986. Conference Record. vol. 1, pp. 42-46. (Abstract).

Oliveri, P.G.; Ayers, D. R. "Analysis of DSCS (Defense Satellite Communications System) 3 SHF (Super High Frequency) Upgrades. vol. 1, Part A: Analysis of Frequency Reuse Via Polarization Diversity," (Abstract).

Bornemann, W.; English, W. J.; Balling, P. "Synthesis of Spacecraft Array Antennas for Intelsat Frequency Reuse Multiple Contoured Beams." *IEEE Transactions on Antennas and Propagation*. vol. AP-33, Nov. 1985, pp. 1186-1193. (Abstract).

Rotholz, E; White, B.E. "A Frequency-Routed Satellite Concept Using Multiple Orthogonally-Polarized Beams for Frequency Reuse." *Milcom 83' Proceedings of the Military Communications Conference*, Washington, DC. Oct. 31-Nov. 2, 1983, vol. 1, pp. 140-154. (Abstract).

Gould, Richard G.; Kelleher, John J. "Frequency Sharing Between the Broadcasting-Satellite Service and other Radiocommunication Services." *IEEE Journal on Selected Areas in Communication*, vol. SAC-3, Jan. 1985, pp. 25-35.

Kinpara, A. "Analysis of Frequency Sharing Between the Broadcasting Satellite Service and the Inter-Satellite Service Newly Allocated in the Vicinity of 23 GHz." *International Symposium on Space Technology and Science*, 13th, Tokyo, Japan, Jun. 28-Jul. 3, 1982. Tokyo, AGNE Publishing Inc., pp. 829-836. (No Abstract).

Barclay, L. W. "Radio Regulatory Aspects of Frequency Sharing." *AGARD Propagation Aspects of Frequency Sharing, Interference and System Diversity* 6 p. (Abstract).

Visher, P. S. "Satellite Clusters and Frequency Reuse," *NTC '81; National Telecommunications Conference*, New Orleans, LA, Nov. 29-Dec. 3, 1981, Record. vol. 1. New York, Institute of Electrical and Electronics Engineers, Inc. pp. B5.4.1-B5.4.3. (Abstract).

Whitworth, J. E. "A Direct Broadcast Satellite System for Unites States—DBS/FS Frequency Sharing." *COSMAT Technical Review*, vol. 11, Fall 1981, pp. 255-264. (Abstract).

Marsh, A. L.; Parthasarathy, R.; Casey, J. P. "The Adaptation of Earth Stations in the Intelsat System for Frequency Reuse Through Dual Polarization," *International Conference on Radio Spectrum Conservation Techniques*, London, England, Jul. 7-9, 1980. London, Institute of Electrical Engineers, pp. 132-136. (Abstract).

Hines, O. T. "14.5-14.8 GHz Frequency Sharing by Data Relay Satellite Uplinks and Broadcasting-Satellite Uplinks." *IEEE Transactions on Aerospace and Electronic Systems*, vol. AES-17, May 1981, pp. 401-409. (Abstract).

Butts, C. J. "A Frequency Reuse K-Band 60-Foot Antenna System for the TDRSS Ground Segment." *ICC '80 Conference on Communications*, Seattle, Washington, Jun. 8-12, 1980. Conference Record, vol. 2, New York, Institute of Electrical and Electronics Engineers, Inc., pp. 25.2.1-25.2.5. (Abstract).

Sullivan, T. M. "Frequency Sharing Between Land Transportable Earth Stations and Terrestrial Stations." *ICC '80; International Conference on Communications*, Seattle, Washington, Jun. 8-12, 1980, Conference Reocrd. vol. 1. New York, Electrical and Electronics Engineers, Inc., pp. 7.2.1-7.2.3. (Abstract).

Barnes, S. P. "Carrier-Interference Ratios for Frequency Sharing Between Satellite Systems Transmitting Frequency Modulated and Digital Television Signals." *NTC '79 National Telecommunication Conference*, Washington, DC, Nov. 27-29, 1979, Conference Record. vol. 3. Piscataway, New Jersey, Institute of Electrical and Electronics Engineers, Inc., pp. 57.5.1-57.5.6. (Abstract).

Kreutel, R. W., Jr.; Difonzo, D. F.; English, W. J.; Gruner, R. W. "Antenna Technology for Frequency Reuse Satellite Communications." *IEEE, Proceedings*, vol. 65, Mar. 1977, pp. 370-378. (Abstract).

Makino, H.; Orino, Y.; Orui, S.; Fuketa, H.; Inoue, T, "A New Adaptive Control System for Compensating Cross-Polarization-Couplings on the Up and/or Down Path in Frequency Reuse Satellite Communications System." *Communications Satellite Systems Conference*, 8th, Orlando, Florida, Apr. 20-24, 1980. New York, American Institute of Aeronautics and Astronautics, Inc., pp. 280-289. (Abstract).

Roger, J.; Aubry, C.; Poitevin, J. "Beam-Waveguide Feed for Satellite Communication Earth Station with Frequency Reuse," *European Microwave Conference*, 6th, Rome, Italy, Sep. 14-17, 1976. Sevenoaks, Kent, England, Microwave Exhibitions and Publishers, Ltd., pp. 69-173.

Afifi, M. S. "Idealized Radiators for Frequency Reuse Applications." *International Conference on Communications*, 12th, Philadelphia, PA, Jun. 14-16, 1976, Conference Record. vol. 1. New York, Institute of Electrical and Electronics Engineers, Inc., pp. 4-15 to 4-20. (Abstract).

Taormina, F.; Mccarty, D. K.; Crail, T.; Nakatani, D. "Intelsat IVA Communications Antenna-Frequency Reuse Through Spatial Isolation." *International Conference on Communications*, 12th, Philadelphia, PA, Jun. 14-16, 1976, vol. 1, New York, Institute of Electrical and Electronics Engineers, Inc. pp. 4-10 to 4-14. (Abstract).

Foldes, P. "Modifications of Feed Systems for Frequency Reuse," *Microwave Journal*, vol. 19, Jul. 1976, pp. 35-38, (Abstract).

Duncan, J. W.; Hamada, S. J.; Ingerson, P. G. "Dual Polarization Multiple Beam Antenna for Frequency Reuse Satellites." *American Institute of Aeronautics and Canadian Aeronautics and Space Institute. Communications Satellite Systems Conference, 6th*, Montreal, Canada, Apr. 5-8, 1976. (Abstract).

Martinon, R. "Evaluation of Propagation from a System Viewpoint for Communication Satellites Operating above 10 GHz, with Frequency Reuse by Dual-Orthogonal Polarizations." *ESA Frequency Re-use Transmission Expt, at 180 Mbps over the Jungfrau Link*, pp. 155-204. (Abstract).

Sites, M. J. "Frequency Sharing Between Small Terminal SCPC Systems and Broadcast and Fixed Satellite Services." *National Telecommunications Conference*, New Orleans, LA, Dec. 1-3, 1975, Conference Record. vol. 2. New York Institute of Electrical and Electronics Engineers, Inc. pp. 43-16, 43-17. (No Abstract).

Lu, H. S. "The Effect of Tolerances on the Isolation of Frequency Reuse Antennas." *IEEE Transactions on Antennas and Propagation*, vol. AP-23, Jan. 1975, pp. 115-118. (Abstract).

Foldes, P.; Raab, A. "Study of Multiple Beam Frequency Reuse Antennas," *EASCON '74; Electronics and Aerospace Systems Convention*, Washington, DC, Oct. 7-9, 1974, Record. New York, Institute of Electrical and Electronics Engineers, Inc., pp. 527-533. (Abstract).

Kreutel, R. W.; English, W. J. "Design and Measurements of Satellite Antenna Systems for Frequency Reuse," *EASCON '74; Electronics and Aerospace Systems Convention*, Washington, DC, Oct. 7-9, 1974, Record, New York, Institute of Electrical and Electronics Engineers, Inc., pp. 513-518. (Abstract).

Laborde, E.; Vilar, E.; Vazquez, A. "Choice of Polarization in Orthogonal Polarization Frequency Reuse Satellite Links." *Electrical Communication*, vol. 49, No. 3, 1974, pp. 289-299. (Abstract).

Kreutel, R. W. "Antenna Design for Frequency Reuse SATCOM Systems," *National Telecommunications Conference*, Atlanta, Georgia, Nov. 26-28, 1973, Conference Record, vol. 2, New York, Institute of Electrical and Electronics Engineers, Inc., pp. 24C-1 to 24C-5. (Abstract).

Dodel, H.; Pontano, B. "Frequency Reuse in Collacated Earth and Terrestrial Stations." *COMSAT Technical Review*, vol. 3, Fall 1973, pp. 443-448.

Aein, J. M. "Power Balancing in Systems Employing Frequency Reuse," *COMSAT Technical Review*, vol. 3, Fall 1973, pp. 277-299. (Abstract).

Matsushita, Misao; Sawabe, Eiichi. "A Study of Frequency Sharing Between Satellite and Terrestrial Broadcasting Systems." *Electronics and Communication in Japan*, vol. 55, Jun. 1972, pp. 77-85.

Kane, D. A.; Jeruchim, M. C. "Orbital and Frequency Sharing Between the Broadcasting Satellite Service and the Fixed-Satellite Service." *Annual International Conference on Communications, 8th*, Philadelphia, PA, Jun. 19-21, 1972, Conference Record, New York, Institute of Electrical and Electronics Engineers, Inc., pp. 18-9 to 18-14. (No Abstract).

Hufford, G. A.; Longley, A. G.; Montgomery, J. L.; Crombie, D. D. "Frequency Sharing Between Broadcast Satellites and Tropospheric Scatter Systems," *EMC at the Crossroads; International Electromagnetic Compatibility Symposium*, Arlington Heights, ILL, Jul. 18-20, 1972, Conference Record. New York, Institute of Electrical and Electronics Engineers, Inc., pp, 39-41. (No Abstract).

Kaneda, S.; Fujio, T. "Required Carrier-to-Interference Ratios for Frequency Sharing Between Frequency-Modulation Television Signal and Amplitude-Modulation Vestigial Sideband Television Signal." *International Symposium on Space Technology and Science, 9th*, Tokyo, Japan, May 17-22, 1971. Tokyo, AGNE Publishing, Inc., 1971, pp. 795-804, (No Abstract).

Weiss, Hans J. "Frequency Sharing and Coordination." *EASCON '71; Electronics and Aerospace Systems Convention*, Washington, DC, Oct. 6-8, 1971. New York, Institute of Electrical and Electronics Engineers, Inc., pp. 143-148.

International Search Report for PCT/US01/24046.

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Ayyagari at al., "A satellite-augmented cellular network concept", *Wireless Networks*, Vo. 4, 1998, pp. 189-198.

\* cited by examiner

NORMAL MODE OPERATION

REVERSED MODE OPERATION

FIRST ALTERNATE MODE OPERATION

SECOND ALTERNATE MODE OPERATION

INTEGRATED OR AUTONOMOUS SYSTEM AND METHOD OF SATELLITE-TERRESTRIAL FREQUENCY REUSE USING SIGNAL ATTENUATION AND/OR BLOCKAGE, DYNAMIC ASSIGNMENT OF FREQUENCIES AND/OR HYSTERESIS

RELATED APPLICATIONS

This application is a continuation of U.S. application Ser. No. 11/536,481, filed Sep. 28, 2006 now U.S. Pat. No. 7,907,893, entitled Integrated Autonomous System and Method of Satellite-Terrestrial Frequency Reuse Using Signal Attenuation and/or Blockage, Dynamic Assignment of Frequencies and/or Hysteresis, which itself is a continuation of U.S. application Ser. No. 10/965,303, filed Oct. 14, 2004, now U.S. Pat. No. 7,577,400, entitled Integrated or Autonomous System and Method of Satellite-Terrestrial Frequency Reuse Using Signal Attenuation and/or Blockage, Dynamic Assignment of Frequencies and/or Hysteresis, which itself is a continuation of U.S. application Ser. No. 10/000,799, filed Dec. 4, 2001, now U.S. Pat. No. 6,859,652, entitled Integrated or Autonomous System and Method of Satellite-Terrestrial Frequency Reuse Using Signal Attenuation and/or Blockage, Dynamic Assignment of Frequencies and/or Hysteresis, and claims priority from U.S. provisional App. No. 60/250,461, filed Dec. 4, 2000, entitled System and Method of Satellite-Terrestrial Frequency Reuse. U.S. application Ser. No. 10/000,799 is a Continuation-in-Part of U.S. application Ser. No. 09/918,709 filed on Aug. 1, 2001 now U.S. Pat. No. 6,892,068, entitled Coordinated Satellite-Terrestrial Frequency Reuse, which claims priority from U.S. provisional App. No. 60/222,605 filed on Aug. 2, 2000, entitled System and Method of Satellite-Terrestrial Frequency Reuse, U.S. provisional App. No. 60/245,194 filed Nov. 3, 2000, entitled Coordinated Satellite-Terrestrial Frequency Reuse, and U.S. provisional App. No. 60/250,461 filed Dec. 4, 2000, entitled System and Method of Satellite-Terrestrial Frequency Reuse. All of these applications are assigned to the assignee of the present application, the disclosures of which are hereby incorporated herein by reference in their entirety as if set forth fully herein.

FIELD OF THE INVENTION

The present invention generally relates to frequency assignment, reuse and/or sharing among communications systems having both a terrestrial component and a satellite component and, more particularly, to a satellite-terrestrial communication system and method of operation thereof that provides frequency assignment, reuse and/or sharing between autonomously operating or integrated satellite and terrestrial components, that can optionally utilize different communication protocols and/or air interfaces.

DESCRIPTION OF THE RELATED ART

FIG. 1 shows a prior art satellite radiotelephone system, as shown in U.S. Pat. No. 6,052,586, incorporated herein by reference. As shown in FIG. 1, a satellite radiotelephone system includes a fixed satellite radiotelephone system 110 and a mobile satellite radiotelephone system 130. The fixed satellite radiotelephone system 110 uses a first satellite 112 to communicate with a plurality of fixed radiotelephones 114a, 114b and 114c in a first communication area 116.

Fixed satellite radiotelephone communication system 110 communicates with the plurality of fixed radiotelephones 114a-114c using a first air interface 118 (e.g., at C-band). Control of the fixed satellite system 110 is implemented by a feeder link 122 which communicates with a gateway 124 and the public switched (wire) telephone network (PSTN) 126.

The feeder link 122 includes communication channels for voice and data communications, and control channels. The control channels are indicated by dashed lines in FIG. 1. The control channels are used to implement direct communications between fixed radiotelephones, as shown for example between radiotelephones 114a and 114b. The control channels are also used to effect communications between a fixed satellite radiotelephone 114c and a mobile radiotelephone or a wire telephone via gateway 124 and PSTN 126. The feeder link 122 uses the same air interface or a different air interface from the first air interface 118.

Still referring to FIG. 1, mobile satellite radiotelephone system 130 includes a second satellite 132 that communicates with a plurality of mobile radiotelephones 134a-134d which are located in a second communication area 136. Mobile satellite radiotelephone system 130 communicates with mobile radiotelephones 134 using a second air interface 138 (e.g., at L-band or S-band). Alternatively, the second air interface 138 may be the same as the first air interface 118. However, the frequency bands associated with the two air interfaces are different.

A feeder link 142 is used to communicate with other satellite, cellular or wire telephone systems via gateway 144 and PSTN 126. As with fixed satellite system 110, the feeder link 142 includes communication channels shown in solid lines and control channels shown in dashed lines. The control channels are used to establish direct mobile-to-mobile communications, for example, between mobile radiotelephones 134b and 134c. The control channels are also used to establish communications between mobile phones 134a and 134d and other satellite, mobile or wire telephone systems.

As with the fixed satellite radiotelephone system 110, the mobile satellite radiotelephone system 130 will generally communicate with large numbers of mobile radiotelephones 134. The fixed and mobile satellite radiotelephone system use a common satellite.

Still referring to FIG. 1, a congested area may be present in the mobile satellite radiotelephone system 130 where a large number of mobile radiotelephones 134e-134i are present. As is also shown in FIG. 1, this congested area may be in an overlapping area 128 between first communication area 116 and second communication area 136. If this is the case, excess capacity from fixed satellite radiotelephone system 110 is offloaded to mobile satellite radiotelephone system 130.

Capacity offload is provided by at least one fixed retransmitting station 150a, 150b, that retransmits communications between the fixed satellite radiotelephone system 110 and at least one of the mobile radiotelephones. For example, as shown in FIG. 1, first fixed retransmitting station 150a retransmits communications between satellite 112 and mobile radiotelephones 134e and 134f. Second fixed transmitting station 150b retransmits communications between the satellite 112 and mobile radiotelephones 134g, 134h and 134i.

The fixed retransmitting stations communicate with the satellite 112 using first air interface 118. However they communicate with the mobile radiotelephones using the second air interface 138. Accordingly, from the standpoint of the mobile radiotelephones 134e-134i, communication is transparent. In other words, it is not apparent to the mobile radiotelephones 134e-134i, or the users thereof, that communications are occurring with the fixed satellite radiotelephone system 110 rather than with the mobile satellite radiotelephone system 130. However, additional capacity for the mobile satellite radiotelephone system 130 in the congested areas adjacent the fixed retransmitting stations 150 is provided.

As shown in FIG. 1, a mobile radiotelephone can establish a communications link via the facilities of the fixed satellite radiotelephone system, even though the mobile radiotelephone is designed, manufactured and sold as a terminal intended for use with the mobile satellite radiotelephone system. One or more operators may offer both mobile and fixed telecommunications services over an overlapping geographic area using two separate transponders in separate satellites or within the same "hybrid" satellite, with one transponder supporting mobile satellite radiotelephones and the other supporting fixed satellite radiotelephones. As capacity "hot spots" or congestion develops within certain spot beams of the mobile radiotelephone system, the fixed system, with its much higher capacity, can deploy fixed retransmitting stations to relieve the capacity load of the mobile system.

FIG. 2A shows a seven-cell frequency reuse pattern used by the mobile satellite radiotelephone system 130. Within each of the relatively large mobile system cells, each typically being on the order of 400-600 kilometers in diameter, frequencies used by adjacent cells are locally retransmitted by the retransmitting station at reduced, non-interfering power levels, and reused as shown in FIGS. 2B and 2C, thus substantially increasing the effective local capacity.

Accordingly, fixed retransmitting stations 150a, 150b, located within the fixed system's footprint or coverage area, receive signals from the fixed satellite and retransmit these signals locally. In the reverse direction, the fixed retransmitting stations receive signals from mobile radiotelephones 134e-i and retransmit signals from the mobile radiotelephones to the fixed satellite system 110. Frequency translation to bring the signals within the fixed system's frequency band is provided.

The mobile radiotelephones 134e-i are ordinarily used with the mobile satellite system 130. Accordingly, the fixed satellite system 110 may need to be configured to support the air interface used by the mobile satellite radiotelephone system. If different air interfaces are used by the fixed and mobile satellite radiotelephone systems, the fixed retransmitting stations 150a, 150b, can perform a translation from one air interface to the other, for example, by demodulation and remodulation. The fixed retransmitting station then becomes a regenerative repeater which reformats communications channels as well as control channels. However, if the mobile and fixed systems both use substantially the same air interface, then the fixed retransmitting station can function as a non-regenerative repeater.

However, in contrast to U.S. Pat. No. 6,052,586, the present invention does not utilize in at least one embodiment frequency translation between fixed and mobile systems. Also in contrast to U.S. Pat. No. 6,052,586, the present invention optionally provides autonomous or substantially autonomous operation between the satellite and terrestrial components.

FIG. 3 is another prior art system as shown in U.S. Pat. No. 5,995,832, incorporated herein by reference. FIG. 3 provides an overview of a communications system 310 showing the functional inter-relationships of the major elements. The system network control center 312 directs the top level allocation of calls to satellite and ground regional resources throughout the system. It also is used to coordinate system-wide operations, to keep track of user locations, to perform optimum allocation of system resources to each call, dispatch facility command codes, and monitor and supervise overall system health. The regional node control centers 314, one of which is shown, are connected to the system network control center 312 and direct the allocation of calls to ground nodes within a major metropolitan region. The regional node control center 314 provides access to and from fixed land communication lines, such as commercial telephone systems known as the public switched telephone network (PSTN). The ground nodes 316, under direction of the respective regional node control center 314, receive calls over the fixed land line network, encode them, spread them according to the unique spreading code assigned to each designated user, combine them into a composite signal, modulate that composite signal onto the transmission carrier, and broadcast them over the cellular region covered.

Satellite node control centers 318 are also connected to the system network control center 312 via status and control land lines and similarly handle calls designated for satellite links such as from PSTN, encode them, spread them according to the unique spreading codes assigned to the designated users, and multiplex them with other similarly directed calls into an uplink trunk, which is beamed up to the designated satellite 320. Satellite nodes 320 receive the uplink trunks, frequency demultiplex the calls intended for different satellite cells, frequency translate and direct each to its appropriate cell transmitter and cell beam, and broadcast the composite of all such similarly directed calls down to the intended satellite cellular area. As used herein, "backhaul" means the link between a satellite 320 and a satellite node control center 318.

User units 322 respond to signals of either satellite or ground node origin, receive the outbound composite signal, separate out the signal intended for that user by despreading using the user's assigned unique spreading code, de-modulate, and decode the information and deliver the call to the user. Such user units 322 may be mobile or may be fixed in position. Gateways 324 provide direct trunks (i.e., groups of channels) between satellite and the ground public switched telephone system or private trunk users. For example, a gateway may comprise a dedicated satellite terminal for use by a large company or other entity. In the embodiment of FIG. 3, the gateway 324 is also connected to that system network controller 312.

All of the above-discussed centers, nodes, units and gateways are full duplex transmit/receive performing the corresponding inbound (user to system) link functions as well in the inverse manner to the outbound (system to user) link functions just described.

FIG. 4 is a block diagram of U.S. Pat. No. 5,995,832 which does not include a system network control center 312. In this system, the satellite node control centers 442 are connected directly into the land line network as are also the regional node control centers 444. Gateway systems 446 are also available as in the system of FIG. 3, and connect the satellite communications to the appropriate land line or other communications systems. The user unit 322 designates satellite node 442 communication or ground node 450 communication by sending a predetermined code. Alternatively, the user unit could first search for one type of link (either ground or satellite) and, if that link is present, use it. If that link is not present, use the alternate type of link.

U.S. Pat. No. 5,995,832 uses code division multiple access (CDMA) technology to provide spectral utilization and spatial frequency reuse. The system of U.S. Pat. No. 5,995,832 has a cluster size of one. That is, each cell uses the same, full allocated frequency band. This is possible because of the strong interference rejection properties of spread spectrum code division multiple access technology (SS/CDMA).

The specification of U.S. Pat. No. 5,995,832 also states that in a spread spectrum system, the data modulated carrier signal is modulated by a relatively wide-band, pseudo-random "spreading" signal so that the transmitted bandwidth is much greater than the bandwidth or rate of the information to be transmitted, and that the "spreading" signal is generated by a pseudo-random deterministic digital logic algorithm which is duplicated at the receiver. In this regard, FIG. 7 of U.S. Pat. No. 5,995,832 discloses PRN generators 136, 166 in conjunction with wide band multipliers 122, 148 that are associated with CDMA technology.

The system also determines the position of user units 322 through two-dimensional multi-lateration. Each CDMA mobile user unit's transmitted spreading code is synchronized to the epoch of reception of the pilot signal from its current control site, whether ground or satellite node.

However, it has been determined that it is desirable to have communication protocols other than CDMA be used in a satellite-terrestrial system. It is also desirable to have a satellite-terrestrial system that does not require frequency translation between fixed and mobile systems. In addition, it is also desirable to provide a satellite-terrestrial terrestrial system that does not require CDM-technology, and which utilizes a robust satellite-terrestrial frequency assignment and/or reuse scheme in which the satellite and terrestrial components can optionally utilize different air interfaces, and optionally operate independently of each other while either sharing a common or different frequency band.

Further, it is also desirable to provide a satellite-terrestrial system that utilizes a first frequency as a downlink frequency between a satellite and a first fixed and/or mobile user terminal and as an uplink frequency between a second fixed and/or mobile user terminal and a terrestrial base transceiver station (BTS), and a second frequency as an uplink between the first fixed and/or mobile user terminal and the satellite and as a downlink between the BTS and the second fixed and/or mobile user terminal. Other advantages and features of the invention are described below, that may be provided independently and/or in one or more combinations.

It is also desirable to provide a satellite-terrestrial system in which the space based and ground based components function autonomously or substantially autonomously in which the space based component can use a time division multiple access (TDMA) air interface, and the ground based system can use either a TDMA air interface or a CDMA air interface. In such a system, it is further desirable to provide user units having a first plurality of vocoders, each having a different data rate, and a second plurality of vocoders, each having a different data rate, wherein a vocoder in the first plurality is used when the subscriber terminal is communicating with the space based system, and wherein a vocoder in the second plurality is used when the subscriber terminal is communicating with the ground based system.

SUMMARY OF THE INVENTION

It is one feature and advantage of the present invention to provide a satellite-terrestrial communication system in which the satellite and terrestrial components utilize different air interfaces while facilitating efficient spectrum assignment, usage, sharing, and/or reuse.

It is another optional feature and advantage of at least some embodiments of the present invention to provide a satellite-terrestrial communication system in which the satellite and terrestrial components operate independently of each other while sharing at least a portion, and optionally all, of a common frequency band.

It is another optional feature and advantage of at least some embodiments of the present invention to provide a satellite-terrestrial communication system in which the satellite and terrestrial components operate independently of each other while utilizing discrete frequency bands.

It is another optional feature and advantage of at least some embodiments of the present invention to provide a satellite-terrestrial communications system and method of operation thereof that minimizes interference between the satellite and terrestrial components.

It is another optional feature and advantage of at least some embodiments of the present invention to provide a communication system utilizing at least two air interfaces having a common area of coverage, wherein at least a portion of the frequencies associated with a first air interface are assigned, reused and/or shared by the second air interface.

It is still another optional feature and advantage of at least some embodiments of the present invention to provide a satellite-terrestrial communication system in which frequencies are assigned, used and/or reused when signal strength is, for example, attenuated and/or blocked by terrain and/or structures.

It is still another optional feature and advantage of at least some embodiments of the present invention to provide a satellite-terrestrial communication system that dynamically assigns frequencies.

It is yet another feature and advantage of at least some embodiments of the present invention to provide a satellite-terrestrial communication system that utilizes hysteresis and/or negative hysteresis in assigning, re-assigning and/or reusing frequencies.

It is another optional feature and advantage of at least some embodiments of the present invention to, for example, invert the frequencies between the satellite system and an underlay terrestrial system, whereby a first frequency is used, for example, as a downlink frequency between a satellite and a first fixed and/or mobile user terminal, and as an uplink frequency between a second fixed and/or mobile user terminal and a BTS. In addition, a second frequency is used, for example, as an uplink between the first fixed and/or mobile user terminal, and the satellite and as a downlink between the BTS and the second fixed and/or mobile user terminal.

The present invention provides a system and method for assigning, re-assigning, using and/or reusing channels for terrestrial and/or satellite use. In one embodiment, a satellite-terrestrial communication system and method is provided for reusing one or more channels in a manner that minimizes interference between the respective satellite and terrestrial systems. The present invention can also be applied to multiple satellite systems as well as, in addition to, or instead of, terrestrial systems. The present invention optionally provides both a terrestrial frequency assignment and/or reuse plan, and a satellite frequency assignment and/or reuse plan.

Advantageously, the present invention provides a satellite-terrestrial system and method that optionally uses a reduction in signal strength caused by, for example, signal attenuation, terrain blocking and/or blocking by man-made structures to assign, use or reuse one or more channels. In one embodiment, the channels having the weakest signal are reused terrestrially in order to minimize interference.

Another embodiment determines that one or more of the satellite channels detected by, for example, a subscriber terminal or BTS are not being used. In this embodiment, any idle channels are preferably used terrestrially first before any used (i.e., established) satellite channels are considered for terrestrial reuse.

The satellite and terrestrial components can operate in an integrated manner, or autonomously. For example, in an integrated embodiment, the satellite and terrestrial components can share a common network operations controller (NOC), mobile switching center (MSC), and/or Radio Resource Manager (RRM). In an autonomous embodiment, a separate NOC, MSC and/or RRM is provided for each of the satellite and terrestrial components. For example, a RRM associated with the terrestrial component can comprise or utilize, for example, a suitable antenna operatively connected to a spectrum analyzer and/or other signal detection means to search a band of radio frequencies for the presence of radio signals, to determine what frequencies are currently being utilized within a range or ranges of frequencies of interest. The terrestrial RRM can therefore determine, independently and without communication with a RRM associated with the satellite component, or any other satellite component equipment, what frequencies are not being used by the system. Since the terrestrial RRM knows the frequencies used across a range of frequencies of interest, as well as the frequencies used by the terrestrial component, the terrestrial RRM can also determine or deduce the frequencies that are currently being used by the satellite component. Similarly, the satellite component functions in substantially the same manner to, inter alia, determine the frequencies currently being used by the terrestrial component.

In the case of, for example, a single geosynchronous satellite having multiple spot beams, the channels that are reassigned terrestrially can be predetermined and/or computed dynamically. In the case of multiple satellites, a predetermined preference may optionally be provided where the subscriber terminals communicate by using either the satellite system or the terrestrial system.

In another embodiment, the present invention minimizes the frequency reuse between the satellite and terrestrial networks by utilizing channels for each system in an ordered manner. Channels can be dynamically reassigned to maximize frequency separation and thereby minimize any potential interference therebetween.

In another embodiment, the invention optionally uses hysteresis so that there is a predetermined difference in signal strength before allowing a subscriber terminal to transition back and forth between channels associated with, for example, two adjacent spot beams or BTSs. Similarly, the present invention optionally uses negative hysteresis to keep channels assigned to, for example, a BTS having a weaker signal strength rather than, handing off to another channel having a stronger signal strength. Negative hysteresis can also be used, for example, to facilitate a desired loading of the respective satellite and/or terrestrial networks, either individually or in combination with each other.

In yet another embodiment, the present invention uses a MSC to coordinate frequency assignment and/or use between the satellite and terrestrial components. The MSC determines which of the channels are currently being used, and where. In this embodiment, the MSC is operatively communicable with, for example, a base station controller (BSC) which, in turn, informs one or more BTSs which channels are currently in use by the satellite component. When a channel goes in use on a satellite while the channel is being used terrestrially, a determination is made whether a handoff should be made to a channel having a weaker signal.

More particularly, at least one embodiment of the present invention comprises a space based system comprising at least one satellite. Each satellite, in turn, comprises at least one antenna and establishes a first set of cells and transmits and receives GSM based waveforms using at least a first portion of at least one predetermined frequency band used by the first set of cells. In addition, a ground based system comprises at least one base transceiver station (BTS), each which can establish a second set of cells and transmit and receive GSM based waveforms utilizing at least a second portion of the one predetermined frequency band. The space and ground systems function substantially autonomously and use and/or reuse at least a portion of spectrum from at least one predetermined frequency band to be used as at least one of an uplink and downlink frequency channel from any of the frequencies within the at least one predetermined frequency band. However, the space based system and ground based system can utilize any air interfaces. For example, in other embodiments, the space and ground based systems can optionally utilize, for example, a code division multiple access (CDMA) based air interface or derivatives thereof. Similarly, the space based system can optionally utilize a CDMA based air interface or derivative thereof, whereas the ground based system can optionally utilize a GSM based air interface or derivative thereof. In addition, the ground based system can optionally utilize a CDMA based air interface or derivative thereof, whereas the space based system can optionally utilize a GSM based air interface or derivative thereof.

The system further comprises at least one subscriber terminal that communicates with at least one of the space based system and with the ground based system when located in at least one of the first and second set of cells, as well as at least one RRM that determines available communication links between the at least one subscriber terminal and at least one of the space based system and the ground based systems.

The at least one predetermined frequency band optionally comprises at least one discrete space based system uplink portion and at least one discrete space based system downlink portion, wherein the ground based system uses and/or reuses at least a portion of at least one of the uplink and downlink portions. Each of the discrete portions are optionally associated with at least one of a satellite spot beam and a subsection of a spot beam.

The at least one predetermined frequency band optionally comprises at least one discrete space based system uplink portion, at least one discrete space based system downlink portion, and at least ground based system portion. Further, at least two cells of the first set of cells in the space based system optionally utilize a mutually exclusive portion of the first portion of the at least one predetermined frequency band.

One or more frequencies in the first and second portion of the at least one predetermined frequency band used by the space based system and the ground based system are optionally substantially the same or closely spaced.

Each of the subscriber terminals can optionally utilize at least a first vocoder having a first data rate and at least a second vocoder having a second data rate, wherein the first vocoder is used when a subscriber terminal is communicating with the space based system, and wherein the second vocoder is used when the subscriber terminal is communicating with the ground based system. The RRM optionally assigns and/or activates at least one of the first and second vocoders in response to predetermined criteria such as capacity demand, voice quality, and/or received signal level.

The system can also optionally utilize at least one MSC that is operatively connected to the space based system and the ground based system that at assigns and/or activates a vocoder in response to predetermined criteria such as capacity demand, voice quality, and received signal level. The RRM can also optionally assign or activate a different vocoder to a voice communications circuit in response to the predetermined criteria such as capacity demand, voice quality, signal strength, and received signal level having changed substantially since assignment or activation of the at least first and second vocoder being utilized.

The at least one predetermined frequency band can optionally comprise first and second frequency bands, such that subscriber terminals communicate with the ground based system by transmitting at first frequencies within the first frequency band used as an uplink of the space based system, and receive at second frequencies within the second frequency band used as a downlink of the space based system. In addition, the first and second frequencies used by a cell of the space based system are optionally mutually exclusive to third frequencies used by a cell of the ground based system containing one or more of the subscriber terminals, within the cell of the space based system.

The at least one predetermined frequency band can also optionally comprise first and second frequency bands, such that subscriber terminals communicate with the ground based system by transmitting at first frequencies within a first frequency band used as a downlink of the space based system, and receive at second frequencies within a second frequency band used as an uplink of the space based system. The first and second frequencies used by a cell of the space based system are mutually exclusive to third frequencies used by a cell of the ground based system containing one or more of the subscriber terminals, within the cell of said space based system.

The at least one predetermined frequency band can also optionally comprise first and second frequency bands, such that subscriber terminals communicate with the ground based system(s) by transmitting at first frequencies within the first frequency band used as the uplink of the space based system, and receive at frequencies within the first frequency band used as the uplink of the space based system. The first and second frequencies used by a cell of the space based system are optionally mutually exclusive to third frequencies used by a cell of the ground based system containing one or more of the subscriber terminals, within the cell of said space based system.

The at least one predetermined frequency band can also optionally comprise first and second frequency bands, such that subscriber terminals communicate with the ground based system(s) by transmitting at first frequencies within the first frequency band used as the downlink of the space based system, and receive at frequencies within the first frequency band used as the downlink of the space based system. The first and second frequencies used by a cell of the space based system are optionally mutually exclusive to third frequencies used by a cell of the ground based system containing one or more of the subscriber terminals, within the cell of the space based system.

The RRM(s) can optionally monitor which channels are currently being utilized by the subscriber terminals. A MSC operatively connected to one or more of the RRMs can optionally be utilized, wherein one or more of the RRMs indicate to the MSC which channels are currently being utilized by one or more of the subscriber terminals. Each RRM, can be, for example, a spectrum analyzer. Individual RRMs can optionally be utilized in connection with each of the space based and ground based systems to, for example, monitor inband interference and avoid using and/or reusing channels that would cause levels of interference exceeding a predetermined threshold. The RRMs can also optionally monitor at least one of received signal quality and available link margin from one or more of the subscriber terminals. The RRMs can also optionally execute utilization of a different communications channel when a quality measure of the existing communications channel has fallen below a predetermined level or has fallen below a predetermined link margin.

Each of the subscriber terminals can optionally comprise a variable rate vocoder, or two or more vocoders each having a different data rate. The vocoder data rate can be selected as determined by predetermined criteria such as capacity demand, voice quality, signal strength, and/or received signal level.

RRMs can optionally monitors inband interference and avoid using channels containing levels of interference exceeding a predetermined threshold, as well as monitor received signal quality from subscriber terminals communicating with the space based system and/or ground based system. RRMs can also optionally monitor available link margin from subscriber terminals communicating with the space based and/or ground based systems. The RRMs can also optionally execute utilization of a different communications channel when a quality measure of the existing communications channel has fallen below a predetermined level or has fallen below a predetermined link margin.

The system can optionally comprise a NOC operatively connected to at least a MSC that assigns a channel to subscriber units. The NOC maintains cognizance of the availability of satellite and/or terrestrial resources, and optionally administers at least one of reconfiguration, assignment and reuse of frequencies within the predetermined frequency band to meet changed traffic patterns or other predetermined conditions. The NOC is optionally commonly shared between and operatively connected to the space based and ground based systems. The NOC can also optionally utilize past system traffic patterns in the reconfiguration, assignment and/or reuse of the frequencies, as well as utilize at least one of hysteresis and negative hysteresis in the reconfiguration, assignment and/or reuse of the frequencies.

The space based system satellite can optionally have a geostationary orbit, wherein the NOC dynamically assigns a channel to a subscriber unit communicating with the space based system. The dynamic assignment can optionally be performed on a call-by-call basis, or be based on past and present usage. Dynamic assignment is optionally performed by one or more base station controllers operationally connected to the NOC.

A exemplary method in accordance with the present invention assigns to a requesting subscriber unit a communication channel commonly shared between a space based communication system and a ground based communication system. The method comprises the steps of configuring a first satellite spot beam, associated with the space based system, having a plurality of communication channels associated therewith, and configuring at least one terrestrial cell, associated with the ground based system, that at least partially geographically overlaps the first satellite spot beam. A dual mode subscriber terminal requests a communication channel, and at least one of the ground based system and the space based system substantially autonomously determines channel availability and assigns to the requesting dual mode subscriber unit at least one of an unused channel and, for reuse with the dual mode subscriber terminal, a used channel having a sufficiently weak signal strength.

In accordance with the method, the space based system optionally utilizes a time division multiple access (TDMA) air interface, and the ground based system optionally utilizes a TDMA air interface. In general, however, any first and second air interfaces can be respectively utilized by the space based and ground based systems. For example, the first air interface can optionally be a GSM based air interface or a derivative thereof, and the second air interface can optionally be a GSM based air interface or a derivative thereof. Alternatively, the first air interface can optionally be a GSM based air interface or a derivative thereof, and the second air interface can optionally be a CDMA based air interface or a derivative thereof. Similarly, the first air interface can optionally be a CDMA based air interface or a derivative thereof, and the second air interface can optionally be a GSM based air interface or a derivative thereof. Further, the first air interface can optionally be a CDMA based air interface or a derivative thereof, and the second air interface can optionally be a CDMA based air interface or a derivative thereof.

The method optionally further comprises the step of increasing the output power of a subscriber terminal utilizing the space based system as the composite signal strength of the subscriber terminals utilizing the ground based system reaches a predetermined threshold. The number of subscriber terminals connections with the ground based system can optionally be decreased as at least one of bit error rate, received signal strength, available link margin, and voice quality reach respective predetermined thresholds.

The method optionally further comprises the steps of enabling a subscriber terminal to communicate at a plurality of data rates, and selecting a data rate as determined by at least one of capacity demand, voice quality, and subscriber terminal received signal level. One or more subscriber terminals communicating with the space based or ground based system can optionally utilize a different data rate as determined by at least one of capacity demand, and received signal level having changed substantially since assignment or activation of the current channel.

The channel can optionally comprise first and second frequency bands, such that the subscriber terminals communicate with the ground based system by transmitting at first frequencies within the first frequency band used as an uplink of the space based system, and receive at second frequencies within the second frequency band used as a downlink of the space based system. Subscriber terminals can also communicates with the ground based system by transmitting at first frequencies within a first frequency band used as an uplink of the space based system, and receive at second frequencies within a second frequency band used as a downlink of the space based system. Subscriber terminal can also optionally communicate with the ground based system by transmitting at first frequencies within a first frequency band used as the uplink of the space based system, and receive at first frequencies within the first frequency band used as the uplink of the space based system. In addition, subscriber terminals can also optionally communicate with the ground based system by transmitting at first frequencies within a first frequency band used as the downlink of the space based system, and receive at first frequencies within the first frequency band used as the downlink of the space based system. Further, subscriber terminals can optionally communicate with the ground based system by transmitting at first frequencies within a first frequency band used as the downlink of the space based system, and receive at first frequencies within the first frequency band used as the downlink of the space based system.

In accordance with the method, a first communication channel associated with the space based system optionally comprises a first frequency band used for uplink communication and a second frequency band used for uplink communication, such that the ground based system shares at least a common portion of the first and second frequency bands in a terrestrial cell positioned outside of and non-overlapping with the satellite spot beam.

In accordance with the method, at least one of the ground based system and the space based system optionally autonomously monitors inband interference and avoids using and/or reusing channels that would cause levels of interference exceeding a predetermined threshold. A different communications channel is preferably utilized when a quality measure of the existing communications channel has fallen below a predetermined level.

In accordance with the method, at least one of the space based system and the ground based systems autonomously monitor at least one of received signal quality and available link margin from a subscriber terminal. A different communications channel is preferably utilized when at least one of received signal quality and available link margin has fallen below a predetermined link margin.

The method optionally further comprises the step of arranging for at least one of channel reconfiguration and reuse of frequencies to meet changed traffic patterns. Past system traffic patterns, hysteresis and/or negative hysteresis can optionally be utilized in determining the reconfiguration and reuse of frequencies.

In accordance with the method, the communication channel is optionally assigned to the subscriber unit in accordance with a predetermined channel assignment scheme.

Also in accordance with the present invention, a method of making a telephone call using at least one of a space based system and a ground based system comprises the steps of dialing by a user using a subscriber terminal a telephone number within an area of a first terrestrial cell having at least partial overlapping geographic coverage with at least a satellite spot beam, wherein the terrestrial cell and the spot beam share a common set of frequencies. At least one of the ground based system and the space based system substantially autonomously determines channel availability in response to the dialing, and assign a channel to the requesting subscriber terminal.

In another embodiment, the system in accordance with the present invention comprises a cellular-configured dual mode communications system comprising a space based system comprising a first set of cells, and a ground based system comprising a second set of cells. Embodiments of the present invention contemplate that the space and ground systems can function in an integrated manner or substantially autonomously, each embodiment optionally using spectrum from, for example, the same set of frequencies in at least one predetermined frequency band and/or different sets of frequencies in one or more discrete bands, optionally dedicated to a particular system.

In at least some embodiments, two cells of the space based system use a mutually exclusive portion of the at least one predetermined frequency band. The space based system can optionally utilize a TDMA air interface, and the ground based system can also utilize a TDMA air interface. The TDMA air interfaces can be a standard GSM air interface or a derivative and/or similar system thereof. In general, however, the space based and ground based systems can utilize any first and second air interfaces. For example, the space based system can utilize a GSM based air interface or a derivative thereof, and the ground based system can utilize a CDMA based air interface or a derivative thereof. In addition, the space based system can utilize a CDMA based air interface or a derivative thereof, and the ground based system can utilize a CDMA based air interface or a derivative thereof. Further, the space based system can utilize a GSM based air interface or a derivative thereof, and the ground based system can utilize a CDMA based air interface or a derivative thereof.

The at least one predetermined frequency band can optionally comprise at least one of a discrete space based system uplink portion and a discrete space based system downlink portion. The ground based system can optionally utilize at least a portion of at least one of the uplink and downlink portions, wherein each of the discrete portions are optionally associated with at least one of a satellite spot beam and a subsection of a spot beam.

The at least one predetermined frequency band further optionally comprises a discrete ground based system portion, wherein at least two cells of said space based system optionally utilize a mutually exclusive portion of the at least one predetermined frequency band.

The system further comprises at least one subscriber terminal communicating with the space based system and with the ground based system. The at least one predetermined frequency band used by the space based system and the ground based system are optionally substantially the same.

Subscriber terminals comprise having means for communicating with the space based system and with the ground based system optionally include a first plurality of standard vocoders, each having a different data rate, and a second plurality of standard vocoders, each having a different data rate. A vocoder in the first plurality can be used when a subscriber terminal is communicating with the space based system, and a vocoder in the second plurality can be used when a subscriber terminal is communicating with the ground based system. The subscriber terminals can also utilize a variable rate vocoder.

The system can also include a RRM that assigns a vocoder or other functionally similar device in response to predetermined criteria such as capacity demand, voice quality and/or received signal level. The RRM can optionally assign a different vocoder to a voice communications circuit in response to predetermined criteria such as capacity demand and/or received signal level having changed substantially since assignment of the vocoder utilized.

Subscriber terminals can optionally communicate with the ground based system by transmitting at frequencies within a frequency band used as an uplink of the space based system, and receiving at frequencies within a frequency band used as a downlink of the space based system. In another embodiment of the present invention, the subscriber terminals communicate with the ground based system by transmitting at frequencies within a frequency band used as a downlink of the space based system, and receiving at frequencies within a frequency band used as an uplink of the space based system. The subscriber terminals can also optionally communicate with the ground based system by transmitting at frequencies within a frequency band used as an uplink of the space based system, and receiving at frequencies within a frequency band used as the uplink of the space based system. Further, the subscriber terminals can optionally communicate with the ground based system by transmitting at frequencies within a frequency band used as the downlink of the space based system, and receive at frequencies within a frequency band used as the downlink of the space based system. In each of the above embodiments of the present invention, the frequencies used by a cell of the space based system can optionally be mutually exclusive to those used by a cell of the ground based system, containing one or more of subscriber terminals, within the cell of the space based system.

At least some embodiments of the system in accordance with the present invention can utilize one or more RRMs that monitor which channels are currently being utilized by each or any of one or more subscriber terminals. A first RRM can be utilized in connection with the ground based system, and a second RRM can be utilized in connection with the space based system. In at least some embodiments of the present invention, the one or more RRMs monitor inband interference and avoid using and/or reusing channels that would cause levels of interference exceeding a predetermined threshold. The one or more RRMs can optionally monitor subscriber terminal received signal quality, available link margin and/or utilization of a different communications channel when a quality measure of the existing communications channel has fallen below a predetermined level and/or has fallen below a predetermined link margin. The one or more RRMs also monitor inband interference and avoid using channels containing levels of interference exceeding a predetermined threshold, and/or monitor available link margin from subscriber terminals communicating with at least one of the space based system and the ground based system. In accordance with at least some embodiments of the present invention, the one or more RRMs can also execute utilization of a different communications channel when a quality measure of the existing communications channel has fallen below a predetermined level or has fallen below a predetermined link margin.

The RRM(s) can optionally monitor which channels are currently being utilized by the subscriber terminals. A MSC operatively connected to one or more of the RRMs can optionally be utilized, wherein one or more of the RRMs indicate to the MSC which channels are currently being utilized by one or more of the subscriber terminals. Each RRM, can be, for example, a spectrum analyzer. Individual RRMs can optionally be utilized in connection with each of the space based and ground based systems to, for example, monitor inband interference and avoid using and/or reusing channels that would cause levels of interference exceeding a predetermined threshold. The RRMs can also optionally monitor at least one of received signal quality and available link margin from one or more of the subscriber terminals. The RRMs can also optionally execute utilization of a different communications channel when a quality measure of the existing communications channel has fallen below a predetermined level or has fallen below a predetermined link margin.

The system can optionally comprise a NOC operatively connected to at least a MSC that assigns a channel to subscriber units. The NOC maintains cognizance of the availability of satellite and/or terrestrial resources, and optionally administers reconfiguration, assignment and/or reuse of frequencies within the predetermined frequency band to meet changed traffic patterns or other predetermined conditions. The NOC is optionally commonly shared between and operatively connected to the space based and ground based systems. The NOC can also optionally utilize past system traffic patterns in the reconfiguration, assignment and/or reuse of the frequencies, as well as utilize at least one of hysteresis and negative hysteresis in the reconfiguration, assignment and/or reuse of the frequencies.

The space based system satellite can optionally have a geostationary orbit, wherein the NOC dynamically assigns a channel to a subscriber unit communicating with the space based system. The dynamic assignment can optionally be performed on a call-by-call basis, or be based on past and present usage. Dynamic assignment is optionally performed by one or more base station controllers operationally connected to the NOC.

In another embodiment, the system in accordance with the present invention comprises a space based system comprising a first set of cells, and a ground based system comprising a second set of cells, wherein at least a portion of the second set of cells share at least a portion of a common geographic area and have overlapping coverage with the first set of cells, the space and ground systems function substantially autonomously and each use at least a portion of commonly shared spectrum from at least one predetermined frequency band.

The at least one predetermined frequency band optionally comprises at least one discrete space based system uplink portion, and at least one discrete space based system downlink portion. The ground based system optionally utilizes at least a portion of at least one of the uplink and downlink portions. Each of the at least one discrete uplink and downlink portions are optionally associated with at least one of a satellite spot beam and a subsection of a spot beam. Further, at least two cells of the space based system use a mutually exclusive portion of the at least one predetermined frequency band.

The first and second air interfaces can optionally be, for example, TDMA air interfaces, such as GSM or a derivative thereof. However, in general, the space based system can utilize a first air interface (e.g., GSM or CDMA, or derivatives thereof), and the ground based system can utilize a second air interface (e.g., GSM or CDMA, or derivatives thereof).

The system further optionally comprises at least one subscriber terminal communicating with the space based system and with said ground based system. The subscriber terminals can optionally utilize a first vocoder having a first data rate and a second vocoder having a second data rate, wherein first vocoder is used when a subscriber terminal is communicating with the space based system, and wherein a second vocoder is used when a subscriber terminal is communicating with the ground based system.

The system further optionally comprises a RRM operatively connected to the space based system and the ground based system, wherein the RRM optionally assigns and/or activates at least one of the first and second vocoders in response to, for example, capacity demand, voice quality, and/or received signal level.

The system further optionally comprises at least one MSC operatively connected to the space based system and the ground based system that selectively assigns a vocoder in response to predetermined criteria such as capacity demand, voice quality, and/or received signal level. The RRM also optionally assigns and/or activates a different vocoder to a voice communications circuit in response to the predetermined criteria such as capacity demand, voice quality, signal strength, and/or received signal level having changed substantially since assignment or activation of the at least first and second vocoder being utilized.

The at least one predetermined frequency band optionally comprises first and second frequency bands, and the subscriber terminals optionally communicate with the ground based system by transmitting at first frequencies within the first frequency band used as an uplink of the space based system, and receive at second frequencies within the second frequency band used as a downlink of said space based system.

The subscriber terminals can also optionally communicate with the ground based system by transmitting at first frequencies within a first frequency band used as a downlink of the space based system, and receive at second frequencies within a second frequency band used as an uplink of the space based system. The subscriber terminals can also optionally communicate with the ground based system by transmitting at first frequencies within the first frequency band used as the uplink of the space based system, and receive at second frequencies within the second frequency band used as the uplink of the space based system. Further, the subscriber terminals can also optionally communicate with the ground based system by transmitting at first frequencies within the first frequency band used as the downlink of the space based system, and receive at second frequencies within the second frequency band used as the downlink of the space based system.

The system further optionally comprises at least one RRM that monitors which channels are currently being utilized by each of one or more subscriber terminals. The system further optionally comprises a MSC operatively connected to one or more of the RRMs, wherein one or more of the RRMs indicates to the MSC which channels are currently being utilized by the subscriber terminals. The RRM independently and autonomously identifies which channels are being used by the ground based system as being the difference between all of the frequencies being used by the system and the frequencies being used by said space based system. The RRM also independently and autonomously identifies which channels are being used by the space based system as being the difference between all of the frequencies being used by the system and the frequencies being used by said ground based system.

The system also optionally comprises a MSC operatively connected to one or more of the RRM(s), wherein one or more of the RRM(s) indicate to the MSC which channels are currently being utilized by each of one or more subscriber terminals. The RRM(S) can be, for example, a spectrum analyzer.

First and second RRMs can also be utilized, wherein a first RRM is utilized in connection with the ground based system, and wherein a second RRM is utilized in connection with the space based system. The first and second RRMs monitor inband interference and avoid using and/or reusing channels that would cause levels of interference exceeding a predetermined threshold. The RRMs also monitor at least one of subscriber terminal received signal quality and available link margin, and also optionally execute utilization of a different communications channel when a quality measure of the existing communications channel has fallen below a predetermined level and/or has fallen below a predetermined link margin. The RRMs further optionally monitor available link margin from subscriber terminals communicating with at least one of the space based system and the ground based system.

The system optionally further comprises a NOC operatively connected to at least a MSC that assigns a channel to subscriber units. The NOC maintains cognizance of the availability of at least one of satellite and terrestrial resources and administers reconfiguration, assignment and/or reuse of frequencies within said predetermined frequency band to meet changed traffic patterns or other predetermined conditions. The NOC is optionally commonly shared between and operatively connected to the space based system and the ground based system. The NOC optionally utilizes past system traffic patterns in the reconfiguration, assignment and/or reuse of the frequencies, and also optionally utilizes hysteresis and/or negative hysteresis in the reconfiguration, assignment and/or reuse of the frequencies.

The system can optionally utilize a satellite having a geostationary orbit, wherein the NOC dynamically assigns a channel to a subscriber unit communicating with the space based system and the satellite. The dynamic assignment is optionally performed on a call-by-call basis, or based on past and present usage. Further, the dynamic assignment is optionally performed by one or more base station controllers operationally connected to the NOC, such that the dynamic assignment optionally maximizes bandwidth separation of frequencies used by the space based system and the ground based system.

Further, in an embodiment wherein the space based and ground based systems function substantially autonomously and each use one or more mutually exclusive predetermined frequency bands, a method in accordance with the present invention is provided for initiating a call between a subscriber terminal and at least one of the space based system and the ground based system. The method comprises the steps of a subscriber terminal transmitting to the system a signal indicating whether it is a single or dual mode terminal. The system determines, based on at least the transmitted signal, whether the subscriber terminal is a single mode or a dual mode terminal. For a dual mode subscriber terminal, the system at least one of assigns to the ground based system for use with the dual mode subscriber terminal an unused space based system channel, using in the ground based system an unused ground based system channel, reusing in the ground based system a channel used by the space based system having a substantially weak signal relative to the dual mode subscriber terminal, and using in the space based system a channel assigned to the space based system. For a single mode subscriber terminal, an available channel is used in the space based system having an acceptable signal strength.

Further, in a cellular communications system in which the space based system and the ground based system share and commonly use at least a portion of a predetermined frequency band, and in which the space based and ground based systems function substantially autonomously, a method is provided for initiating a call between a subscriber terminal and at least one of the space based system and the ground based system. The method comprises the steps of a subscriber terminal transmitting to the system a signal indicating whether it is a single or dual mode terminal. The system determines whether the subscriber terminal is a single mode or a dual mode terminal. For a dual mode subscriber terminal, the system at least one of uses an unused channel to establish communication between the ground based system and the dual mode subscriber terminal, reuses in the ground based system a channel used by the space based system having a substantially weak signal relative to the subscriber terminal to establish communication between the ground based system and the dual mode subscriber terminal, and reuses in the ground based system a channel used by the ground based system having a substantially weak signal relative to the subscriber terminal to establish communication between the ground based system and the dual mode subscriber terminal. For a single mode terminal, the space based system uses an available channel having an acceptable signal strength.

Further, in a cellular communications system comprising a space based system comprising a first set of cells, and a ground based system comprising a second set of cells, in which at least a portion of the second set of cells share a common geographic area and have at least a portion of overlapping geographic coverage with the first set of cells, and in which the space based and ground based systems function substantially autonomously and each use one or more mutually exclusive predetermined frequency bands, a method is provided for executing a handoff from a first base station associated with the ground system to at least one of a second base station associated with the ground based system and a satellite. The method comprises the steps of determining whether a received signal strength indication (RSSI) between the subscriber terminal and the second base station is satisfied. A subscriber terminal transmits to the system a signal indicating whether it is a single or dual mode terminal. The system determines, based on at least the transmitted signal, whether the subscriber terminal is a single mode or a dual mode terminal. For a dual mode subscriber terminal, when the second base station has an acceptable RSSI, the system at least one of reassigns to the second base station for communication with the dual mode subscriber terminal at least one of an unused space based system channel and an unused ground based system channel, and reuses by the second base station for communication with the dual mode subscriber terminal a channel used by the space based system having a substantially weak signal relative to the subscriber terminal. For a single mode subscriber terminal, the subscriber terminal uses a channel associated with the space based system having an acceptable signal strength.

Further, in a cellular communications system comprising a space based system comprising a first set of cells, and a ground based system comprising a second set of cells, in which the space based system and the ground based system share and commonly use at least a portion of a predetermined frequency band, the space based and ground based systems functioning substantially autonomously, a method is provided for executing a handoff from a first base station associated with the ground system to at least one of a second base station associated with the ground based system and a satellite. The method comprises the steps of determining whether a received signal strength indication (RSSI) between the subscriber terminal and the second base station is satisfied. A subscriber terminal transmits to the system a signal indicating whether it is a single or dual mode terminal. The system determines, based at least one the transmitted signal, whether the subscriber terminal is a single mode or a dual mode terminal. For a dual mode subscriber terminal, when the second base station has an acceptable RSSI, the system at least one of reassigns to the second base station for communication with the dual mode subscriber terminal an unused system channel, and reuses by the second base station for communication with the dual mode subscriber terminal a channel used by the space based system having a substantially weak signal relative to the subscriber terminal. For a single mode subscriber terminal, the subscriber terminal uses at least one of an unused channel and a used channel having a sufficiently weak signal strength relative to the subscriber terminal.

Further, in a cellular communications system comprising a space based system comprising a first set of cells, and a ground based system comprising a second set of cells, in which at least a portion of the second set of cells share a common geographic area and have at least a portion of overlapping geographic coverage with the first set of cells, the space based and ground based systems functioning substantially autonomously and each using one or more mutually exclusive predetermined frequency bands, a method is provided for executing a handoff from a first satellite spot beam associated with the space based system to at least one of a second satellite spot beam associated with the space based system and a base station associated with the ground based system. The method comprises the steps of determining whether a received signal strength indication (RSSI) between the subscriber terminal and the second is satellite spot beam is satisfied. A subscriber terminal transmits to the system a signal indicating whether the subscriber terminal is a single mode or a dual mode terminal. The system, based on at least the transmitted signal, determines whether the subscriber terminal is a single mode or a dual mode terminal. For a dual mode subscriber terminal, when the base station has an acceptable RSSI, the system at least one of assigns to the base station for communication with the dual mode subscriber terminal an unused space based system channel associated with the second spot beam, reuses by the base station for communication with the dual mode subscriber terminal a channel used by the second spot beam having a substantially weak signal strength relative to the dual mode subscriber terminal, and reuses by the base station for communication with the dual mode subscriber terminal a channel used by the ground based system having a substantially weak signal strength relative to the dual mode subscriber terminal, and uses by the base station for communication with the dual mode subscriber terminal an unused ground based system channel having sufficient signal strength. For a single mode subscriber terminal, a channel associated with a second spot beam of the space based system having a acceptable signal strength is utilized.

Further, in a cellular communications system comprising a space based system comprising a first set of cells, and a ground based system comprising a second set of cells, in which the space based system and the ground based system share and commonly use at least a portion of a predetermined frequency band, the space based and ground based systems functioning substantially autonomously and each using at least a portion of spectrum from at least a portion of one predetermined frequency band, a method is provided for executing a handoff from a first satellite spot beam associated with the space based system to at least one of a second satellite spot beam associated with the space based system and a base station associated with the ground based system comprises the steps of determining whether a received signal strength indication (RSSI) between the subscriber terminal and the second base station is satisfied. The subscriber terminal transmits to the system a signal indicating whether the subscriber terminal is a single or a dual mode terminal. The system determines based on at least the transmitted signal whether the subscriber terminal is a single mode or a dual mode terminal. For a dual mode subscriber terminal, when the base station has an acceptable RSSI, the system at least one of reassigns to the base station for communication with the dual mode subscriber terminal an unused system channel, and reuses by the base station for communication with the dual mode subscriber terminal a channel used by the space based system having a substantially weak signal relative to the dual mode subscriber terminal, reuses by the base station for communication with the dual mode subscriber terminal a channel used by the ground based system having a substantially weak signal relative to the dual mode subscriber terminal. For a single mode subscriber terminal, at least one of an unused channel associated with the second spot beam and a used channel having a sufficiently weak signal strength relative to the subscriber terminal is utilized.

Another embodiment of the system comprises a space based system comprising means for establishing a first set of cells and transmitting and receiving GSM based waveforms using at least a first portion of at least one predetermined frequency band used by the first set of cells. A ground based system comprises means for establishing a second set of cells and transmitting and receiving GSM based waveforms utilizing at least a second portion of the one predetermined frequency band, the space based and ground based systems functioning substantially autonomously and at least one of using and reusing at least a portion of spectrum from at least one predetermined frequency band. At least one subscriber terminal communicates with at least one of the space based system and with the ground based system when located in at least one of the first and second set of cells. Means for determining available communication links between the at least one subscriber terminal and the space based system and the ground based system is also provided.

The at least one predetermined frequency band optionally comprises at least one discrete space based system uplink portion and at least one discrete space based system downlink portion, wherein the ground based system uses and/or reuses at least a portion of at least one of the uplink and downlink portions. Each of the discrete portions are optionally associated with at least one of a satellite spot beam and a subsection of a spot beam.

The at least one predetermined frequency band optionally comprises at least one discrete space based system uplink portion, at least one discrete space based system downlink portion, and at least one ground based system portion.

At least two cells of the first set of cells in the space based system optionally use a mutually exclusive portion of the first portion of the at least one predetermined frequency band. Further, one or more frequencies in the first and second portion of the at least one predetermined frequency band used by the space based system and the ground based system are optionally substantially the same or closely spaced.

The at least one subscriber terminal optionally comprises at least a first vocoder having a first data rate and at least a second vocoder having a second data rate, wherein the first vocoder is used when the subscriber terminal is communicating with the space based system, and wherein the second vocoder is used when the subscriber terminal is communicating with the ground based system.

The means for determining available communication links optionally at least one of assigns and activates at least one of the first and second vocoders in response to predetermined criteria such as capacity demand, voice quality, and/or received signal level. The means for determining available communication links further optionally assigns or activates a different vocoder to a voice communications circuit in response to the predetermined criteria such as such as voice quality, signal strength, and/or received signal level having changed substantially since assignment or activation of the first or second vocoder being utilized.

The at least one predetermined frequency band optionally comprises first and second frequency bands, and the subscriber terminals communicate with the ground based system by transmitting at first frequencies within the first frequency band used as an uplink of the space based system, and receiving at second frequencies within the second frequency band used as a downlink of the space based system.

The first and second frequencies used by a cell of the space based system are optionally mutually exclusive to third frequencies used by a cell of the ground based system containing one or more of the subscriber terminals, within the cell of the space based system.

The at least one predetermined frequency band optionally comprises first and second frequency bands, wherein the subscriber terminals communicate with the ground based system by transmitting at first frequencies within a first frequency band used as a downlink of the space based system, and receiving at second frequencies within a second frequency band used as an uplink of the space based system.

The first and second frequencies used by a cell of the space based system are optionally mutually exclusive to third frequencies used by a cell of the ground based system containing one or more of the subscriber terminals, within the cell of said space based system.

The at least one predetermined frequency band optionally comprises first and second frequency bands, wherein the subscriber terminals communicate with the ground based system by transmitting at first frequencies within the first frequency band used as the uplink of the space based system, and receives at frequencies within the first frequency band used as the uplink of the space based system.

The first and second frequencies used by a cell of the space based system are optionally mutually exclusive to third frequencies used by a cell of the ground based system containing one or more of the subscriber terminals, within the cell of the space based system.

The at least one predetermined frequency band optionally comprises first and second frequency bands, wherein subscriber terminals communicate with the ground based system by transmitting at first frequencies within the first frequency band used as the downlink of the space based system, and receives at frequencies within the first frequency band used as the downlink of the space based system.

The first and second frequencies used by a cell of the space based system are optionally mutually exclusive to third frequencies used by a cell of the ground based system containing one or more of the subscriber terminals, within the cell of said space based system.

The means for determining available communication links comprises first and second means for determining available communication links, wherein a first means for determining available communication links is utilized in connection with the ground based system, and wherein a second means for determining available communication links is utilized in connection with the space based system.

The system further optionally comprises means for maintaining cognizance of the availability of at least one of satellite and terrestrial resources and administering reconfiguration, assignment and/or reuse of frequencies within the predetermined frequency band to meet changed traffic patterns or other predetermined conditions. The means for maintaining cognizance is optionally operatively connected to at least a MSC that assigns a channel to subscriber units.

In another embodiment, a cellular communications system in accordance with the present invention comprises a space based system comprising means for establishing a first set of cells and transmitting and receiving GSM based waveforms using at least a first portion of at least one predetermined frequency band used by the first set of cells. A ground based system comprises means for establishing a second set of cells and transmitting and receiving code division multiple access (CDMA) waveforms utilizing at least a second portion of the one predetermined frequency band to be used as at least one of an uplink and downlink frequency channel from any of the frequencies within the at least one predetermined frequency band. One or more subscriber terminals communicate with at least one of the space based system and with the ground based system when located in at least one of the first and second set of cells. The system also comprise means for determining available communication links between the subscriber terminals and the space based system and/or the ground based system.

The first portion of the at least one predetermined frequency band optionally comprises at least one discrete space based system uplink portion and at least one discrete space based system downlink portion, wherein the first portion is a subset of the second portion. Each of the discrete portions are optionally associated with at least one of a satellite spot beam and a subsection of a spot beam.

The first portion of the at least one predetermined frequency band comprises at least one discrete space based system uplink portion, at least one discrete space based system downlink portion, and a ground based system portion. At least two cells of the first set of cells in the space based system optionally use a mutually exclusive portion of the first portion of the at least one predetermined frequency band. Further, one or more frequencies in the first and second portions of the at least one predetermined frequency band are optionally substantially the same or closely spaced.

The subscriber terminals optionally comprise a first vocoder having a first data rate and a second vocoder having a second data rate, wherein the first vocoder is used when the subscriber terminal is communicating with the space based system, and wherein the second vocoder is used when the subscriber terminal is communicating with the ground based system.

The means for determining available communication links further optionally at least one of assigns and activates at least one of the first and second vocoders in response to predetermined criteria such as capacity demand, voice quality, and/or received signal level.

The system further optionally comprises means for at least one of assigning and activating a vocoder in response to predetermined criteria comprising, for example, capacity demand, voice quality, and/or received signal level.

The means for detecting available communication links optionally further assigns or activates a different vocoder to a voice communications circuit in response to the predetermined criteria such as capacity demand, voice quality, signal strength, and received signal level having changed substantially since assignment or activation of the at least first and second vocoder being utilized.

The system further optionally comprises means for maintaining cognizance of the availability of at least one of satellite and terrestrial resources and administering reconfiguration, assignment and/or reuse of frequencies within the predetermined frequency band to meet changed traffic patterns or other predetermined conditions. The means for maintaining cognizance is optionally operatively connected to at least a mobile switching center that assigns a channel to subscriber units. The means for maintaining cognizance optionally utilizes hysteresis and/or negative hysteresis in the reconfiguration, assignment and/or reuse of the frequencies.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there is illustrated preferred embodiments of the invention.

DETAILED DESCRIPTION OF A PREFERRED EMBODIMENT OF THE INVENTION

Figure 5:
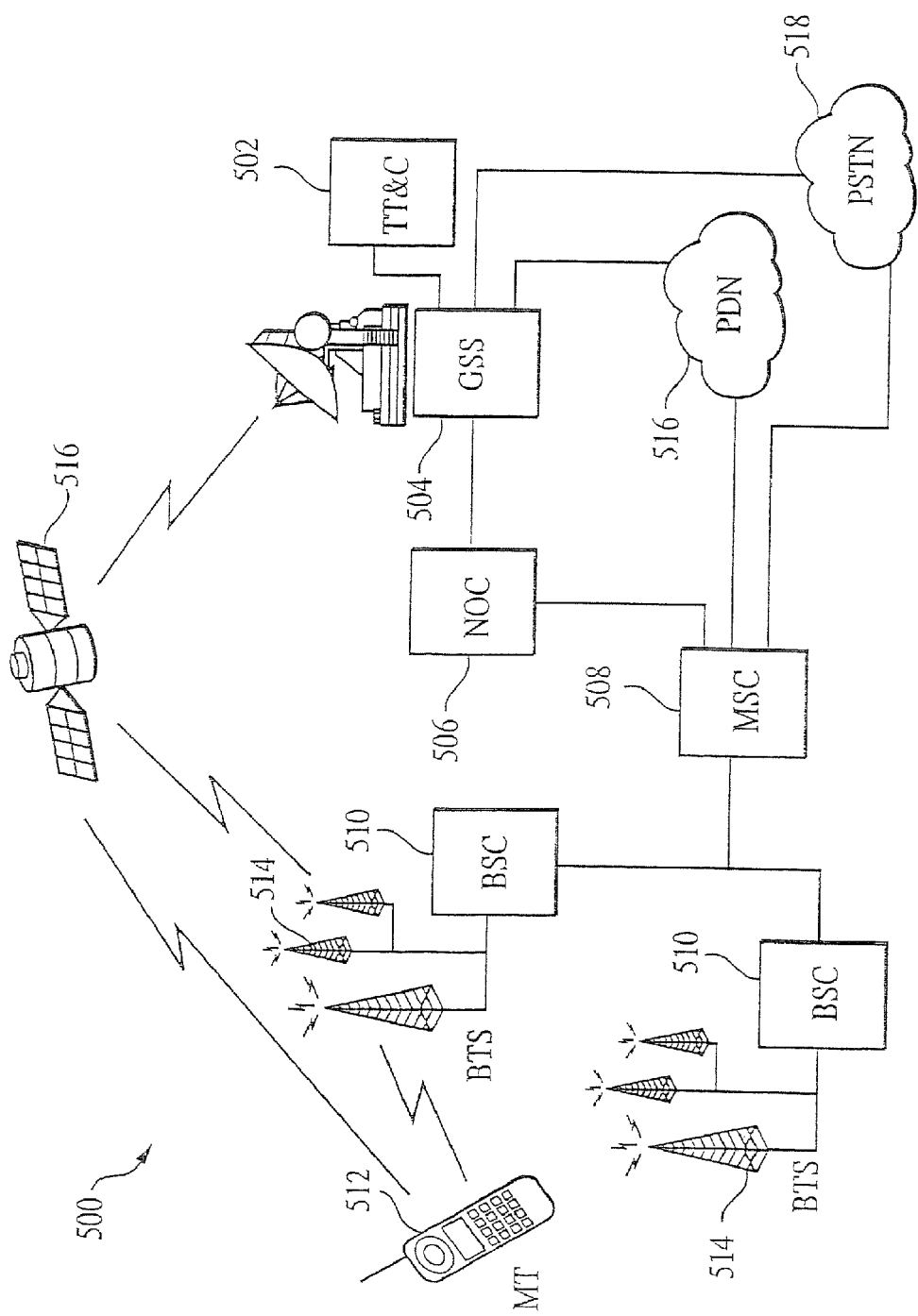
FIG. 5 is an exemplary high level block diagram of a system that can use and/or be used to produce the frequency reuse schemes in accordance with the present invention.

FIG. 5 shows an exemplary high level block diagram of a standard system 500 that can be used to implement the frequency assignment, reuse and/or reassignment, and other features of the present invention. The telemetry, tracking and command (TT&C) facility 502 is used to control and monitor the one or more satellites 516 of the system 500.

The terrestrial segment can use digital cellular technology, consisting of or including one or more Gateway Station Systems (GSS) 504, a Network Operations Center (NOC) 506, one or more Mobile Switching Centers (MSC) 508, one or more Base Transceiver Stations (BTS) 514, and a variety of mobile, portable, Personal Digital Assistant (PDA), computer and/or fixed subscriber terminals 512. The subscriber terminals 512 can be equipped with a Subscriber Identity Module (SIM) (not shown) or similar module that identifies the individual subscriber terminal 512. The subscriber terminals 512 are generally handheld devices that provide voice, video and/or data communication capability. Subscriber terminals 512 may also have additional capabilities and functionality such as, for example, paging. Equipping the subscriber terminals 512 with a SIM module can allow the user to have access to the system 500 by using any subscriber terminals 512 having an authorized SIM.

The MSC 508 preferably performs the switching functions of the system 500, and also optionally provides connection to other networks (e.g., Public Data Network (PDN) 517, and/or Public Switched Telephone Network (PSTN) 518). Since the subscriber terminals 512 do not know what channels are actually being used by the satellite and/or terrestrial system, the MSC 508 in accordance with at least one embodiment of the present invention optionally identifies the channels that are in use and the channels that are not in use. In another embodiment, the MSC 508 can receive updates from each terrestrial and satellite control center and or one or more radio resource managers (ARM) regarding which channels are in use. The MSC 508 is preferably connected to a BSC 510 which, in turn, is preferably connected to a BTS 514. Therefore, in at least one embodiment of the present invention, the MSC 508, via one or more RRMs, determines which channels are in use or not in use.

Subscriber terminals 512 are preferably providing signal strength measurements and/or other measurements such as interference level, of the satellites 516 to, for example, a BTS 514. It is preferred that the BSC 510 assign a channel to the subscriber terminal 512. It is also preferred that the BSC 510 first assign to the subscriber terminal 512 a channel that is not in use by the satellite. If all of the channels are in use, then the BSC 510 selects, for example, the satellite channel having the weakest signal strength relative to the subscriber terminal 512. Alternatively, any standard algorithm can optionally be used to determine a preferred channel to use.

BTSs 514 can be used in those areas where the satellite signal is attenuated by, for example, terrain and/or morphological features, and/or to provide in-building coverage. The BTSs 514 and RSCs 510 generally provide and control the air interface to the subscriber terminals 512. The BTSs 514 can optionally use any standard wireless protocol that is very similar to that of the satellites 516. Alternatively, BTSs 514 can use a first air interface (e.g., CDMA), and the satellite 516 can use a second air interface (e.g., GSM, or Global Mobile Satellite Systems (GMSS), which is a satellite air interface standard which is developed from GSM). The BSC 510 generally controls one or more BTSs 514 and manages their radio resources. BSC 510 is principally in charge of handovers, frequency hopping, exchange functions and control of the radio frequency power levels of the BTSs 514.

NOC 506 can provide functions such as, for example, monitoring of system power levels to ensure that transmission levels remain within tolerances, and line monitoring to ensure the continuity of the transmission lines that interconnect the BSC 510 to the BTS 514, that interconnect the MSC 508 to the PDN 517 and that interconnect the PSTN 518, and the NOC 506 to other network components. The NOC 506 can also monitor the satellite 516 transponders to ensure that they are maintained within frequency assignment and power allocation tolerances. The NOC 506 also ensures that communication resources are available and/or assigned, reused and/or borrowed in a timely manner to, for example, facilitate calls originating and/or transmitted to a subscriber terminal 512. Finally, to effectuate, for example, the dynamic channel assignment of the present invention, the NOC 506 generally maintains cognizance of the availability of satellite and/or terrestrial resources and arranges for any necessary satellite reconfiguration and/or assignment and or reuse of frequencies to meet changed traffic patterns. An exemplary NOC is described in U.S. Pat. No. 5,926,745, incorporated herein by reference.

The system 500 will also have one or more satellites 516 that communicate with the GSS 504 and the subscriber terminals 512. A typical GSS 504 will have an antenna to access the satellite 516. On the uplink transmission path, the GSS 504 will generally have upconverters that can translate the GSS 504 intermediate frequency (IF) to the feeder link frequency. On the downlink transmission path, the received signal is preferably amplified, and feeder link frequencies are translated to the common IF.

The system 500 generally comprises satellite and terrestrial components. Satellite components comprise, for example, TT&C 502, GSS 504, and satellite 516. Terrestrial components comprise, for example, BSC 510 and BTSs 514. In the FIG. 5 embodiment, the NOC 506, MSC 508 are shared by the satellite and terrestrial systems. As will be discussed with regard to FIGS. 7a-7d, alternate embodiments of the present invention provide, for example, separate NOCs 506 and/or MSCs 508 for the satellite and terrestrial components to facilitate autonomous or substantially autonomous operation.

Figure 6A:
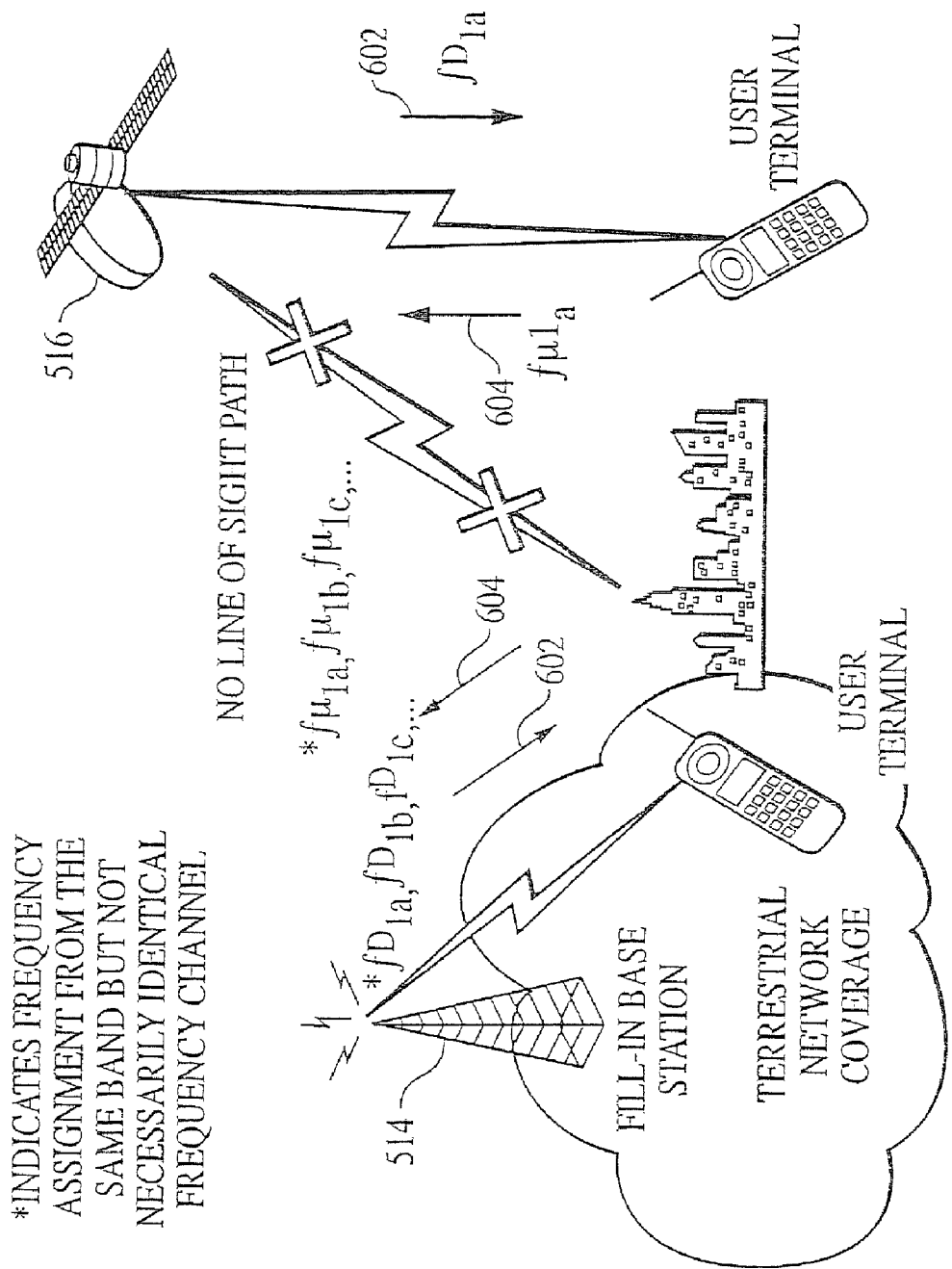
FIG. 6a is an exemplary illustration of how a base transceiver station can enhance network coverage, particularly in an area having no line of sight path (or reduced line of sight path) with a satellite.

FIG. 6a is an exemplary BTS 514 frequency plan. The nomenclature is provided as follows:

$f^{U}_{1a}$ and $f^{D}_{1a}$ superscripts U and D indicate uplink and downlink, respectively;

the numeric subscript (e.g., 1) indicates the frequency band; and the letter subscript (e.g., a) indicates the channel within the frequency band.

Users communicating on uplink 604 and downlink 602 would use, for example, paired uplink and downlink channels $f^{U}_{1a}$ and $f^{D}_{1a}$, $f^{U}_{1b}$ and $f^{D}_{1b}$, $f^{U}_{1c}$ and $f^{D}_{1c}$, etc. Advantageously, in the present invention, different channels within the same frequency band, or different frequency bands, are optionally assigned, reused and/or reassigned in a non-pairwise manner. For example, downlink 602 could be using $f^{D}_{1a}$, whereas uplink 604 could be using $f^{U}_{1b}$. Similarly, downlink 602 could be using $f^{D}_{1c}$ whereas uplink 604 could be using $f^{U}_{1d}$. These pairings are illustrative only, insofar as numerous other non-pairwise uplink 604 and downlink 602 combinations are available that can be used, for example, within different terrestrial cells, within different areas of a spot beam, and/or between different spot beams.

Further, suppose that $f^{U}_{2a}$ and $f^{D}_{2a}$ are the uplink and downlink frequency bands associated with a second domestic or foreign satellite system. Users of system 500 communicating on downlink 602 and uplink 604 could use, for example, uplink and downlink frequencies $f^{U}_{1a}$ and $f^{D}_{2a}$, $f^{U}_{1c}$ and $f^{D}_{2b}$, $f^{U}_{1b}$ and $f^{D}_{2c}$, etc. In general, the present invention optionally uses one or more uplink and downlink channels that are from different frequency bands and/or associated with a different domestic and/or foreign satellite system.

Figure 6B:
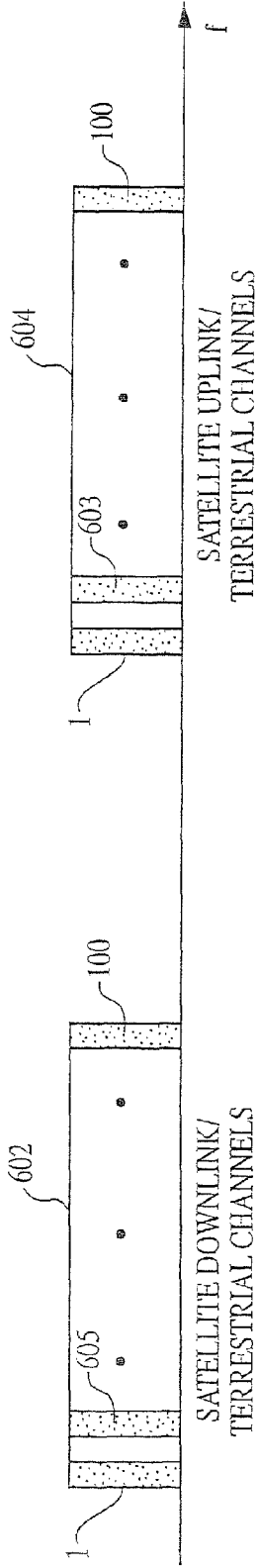
FIG. 6b shows, for an embodiment of the present invention using a single satellite, exemplary satellite uplink and downlink frequency bands commonly used by and shared with the terrestrial system.

FIG. 6b shows, for a single satellite system, illustrative uplink 604 and downlink 602 frequencies/channels that can be used with the satellite component. Each channel generally comprises a control portion and a data or voice portion. As shown, and as will be discussed in more detail with regard to FIGS. 8a-6c, the satellite uplink 604 and downlink 602 frequencies, in accordance with at least one embodiment of the present invention, are commonly used and shared by the terrestrial component, and generally comprise a range of separated frequencies (e.g., 1626.5-1660.5 MHz for uplink, and 1525-1559 MHz for downlink). The present invention is not limited, however, to sharing frequencies within a single frequency band assigned and/or designated by, for example, a government regulatory agency. The present system may also therefore, share and/or reuse frequencies of other domestic, foreign, and/or international satellite and/or terrestrial systems, subject to, for example, national, foreign, and/or international government regulatory approval.

Accordingly, as defined in connection with the present invention, a frequency band comprises any set of frequencies, and is not limited to a consecutive set or series of frequencies. Further, a frequency band in alternative embodiments may comprise a logical set of frequencies that may be assigned to different communication systems, carriers, or in other pre-designated frequency bands. That is, for example, a frequency band in the present invention may include frequencies that are assigned to other frequency bands, for example, for different purposes. With regard to FIG. 6b, individual channels 603, 605 are shown within frequency bands 604, 602, respectively.

Figure 6C:
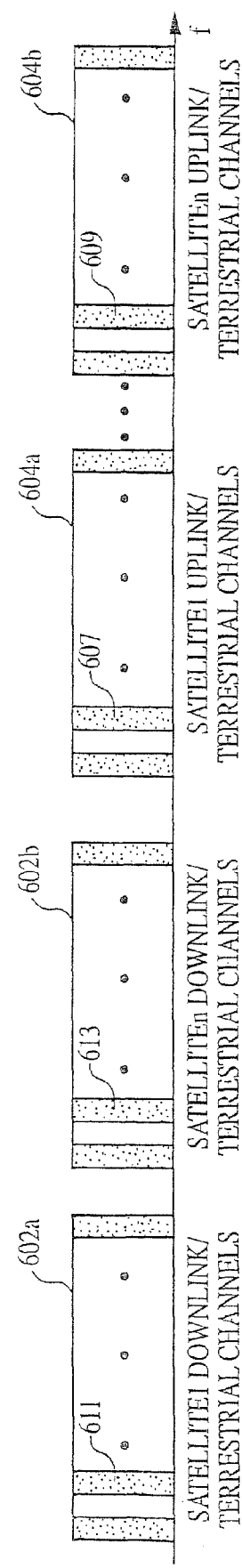
FIG. 6c shows, for an embodiment of the present invention using two or more satellites, exemplary satellite uplink and downlink frequency bands commonly used by and shared with the terrestrial system.

FIG. 6c shows, for a multiple satellite system, illustrative uplinks 604a, 604b and downlinks 602a, 602b within the frequency bands of the satellite system. FIG. 6c can equally be used to provide different frequency bands associated with various spot beams of a single satellite, and/or subparts or subsectors of a single spot beam. As shown, the satellite uplink 604a, 604b and downlink 602a, 602b frequencies, in accordance with at least one embodiment of the present invention, are commonly used and shared by the terrestrial system, and generally comprise a range of separated frequencies (e.g., 1626.5-1643 MHz for satellite 1 uplink 604a, 1644-1660.5 MHz for satellite n uplink 604n, and 1525-1542 MHz for satellite 1 downlink 602a, and 1543-1559 MHz for satellite n downlink 602n). Individual channels 607, 609 are shown within uplink frequency bands 604a, 604b, respectively, and individual channels 611, 613 are shown within downlink frequency bands 602a, 602b, respectively.

Figure 6D:
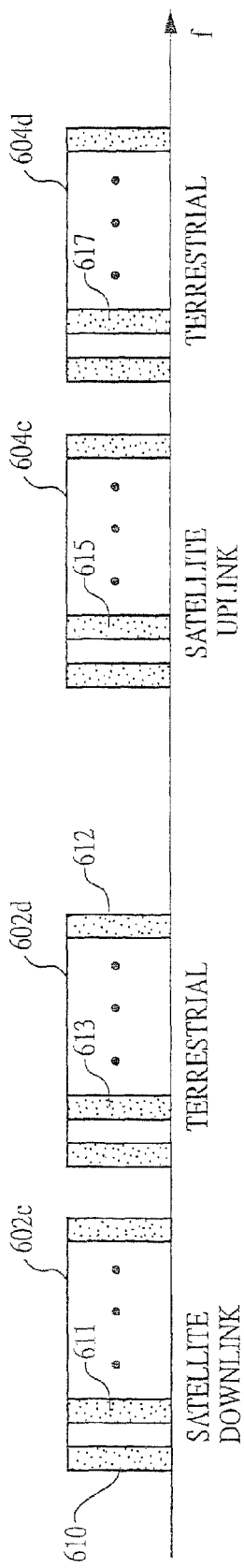
FIG. 6d shows, for an embodiment of the present invention using a single satellite, exemplary satellite uplink and downlink frequency bands.

FIG. 6d shows an alternate embodiment of the frequency bands of FIG. 6b in which the satellite frequencies 602c, 604c and the terrestrial frequencies 602d, 604d are discrete. That is, in contrast to the frequency bands shown in FIG. 6b, where satellite and terrestrial frequencies comprise common frequency bands 602, 604, in FIG. 6d there is no sharing of satellite and terrestrial frequencies within a common frequency band. Individual channels 611, 613, 615, and 617, are shown within frequency bands 602c, 602d, 604c, and 604d, respectively.

Figure 6E:
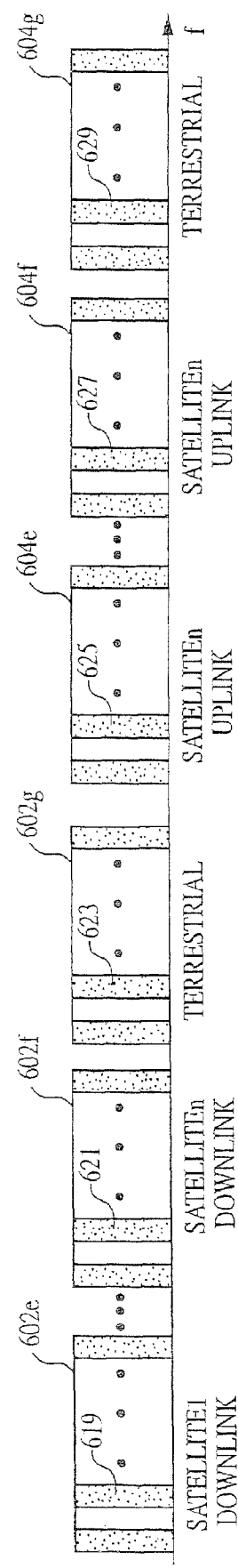
FIG. 6e shows, for an embodiment of the present invention using two or more satellites, exemplary satellite uplink and downlink frequency bands.

FIG. 6e shows an alternate embodiment of the frequency bands of FIG. 6c in which the satellite frequencies 602e, 602f, 604e, 604f and terrestrial frequencies 602g, 604g are discrete. That is, in contrast to the frequency bands shown in FIG. 6c, where satellite and terrestrial frequencies comprise common frequency bands 602a, 602b, 604a, 604b, in FIG. 6e there is no sharing of satellite and terrestrial frequencies within a common frequency band. Individual channels 619, 621, 623, 625, 627, and 629 are shown within frequency bands 602e, 602f, 602g, 604e, 604f and 604g, respectively. FIG. 6e can equally be used to provide different frequency bands associated with various spot beams of a single satellite, and/or subparts or subsectors of a single spot beam.

Figure 6F:
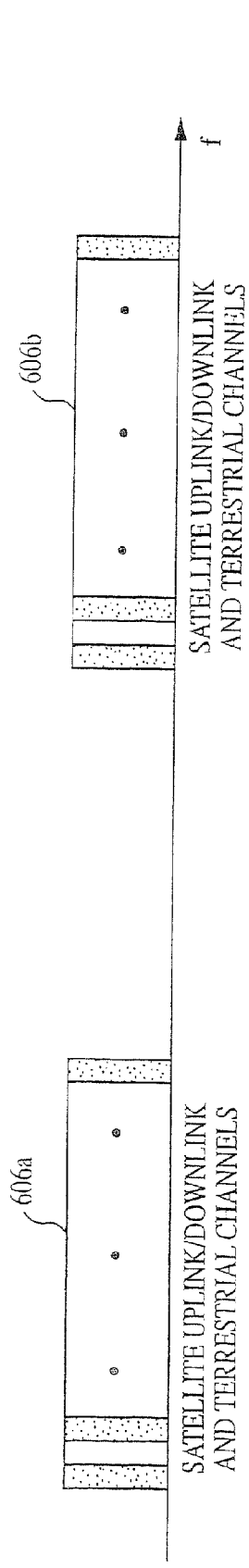
FIG. 6f shows two frequency bands, each having channels that can be utilized by the satellite and/or terrestrial components.
Figure 6G:
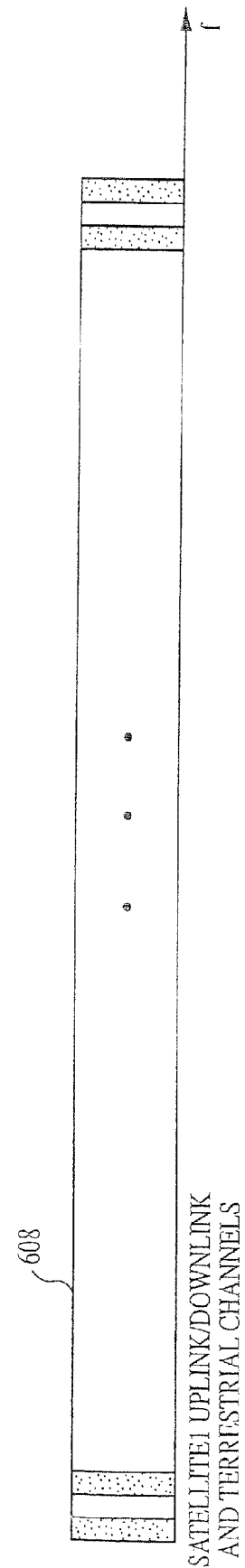
FIG. 6g shows a single frequency band with channels that can be utilized by the satellite and/or terrestrial components.

FIG. 6f shows an alternate embodiment of the frequency bands of FIG. 6b. In FIG. 6f, frequency bands 606a, 606b each contain channels that can be used for satellite uplink, satellite downlink and/or terrestrially. FIG. 6g shows a single frequency band 608 that contains channels that can be used for satellite uplink, satellite downlink and/or terrestrially.

Figure 7A:
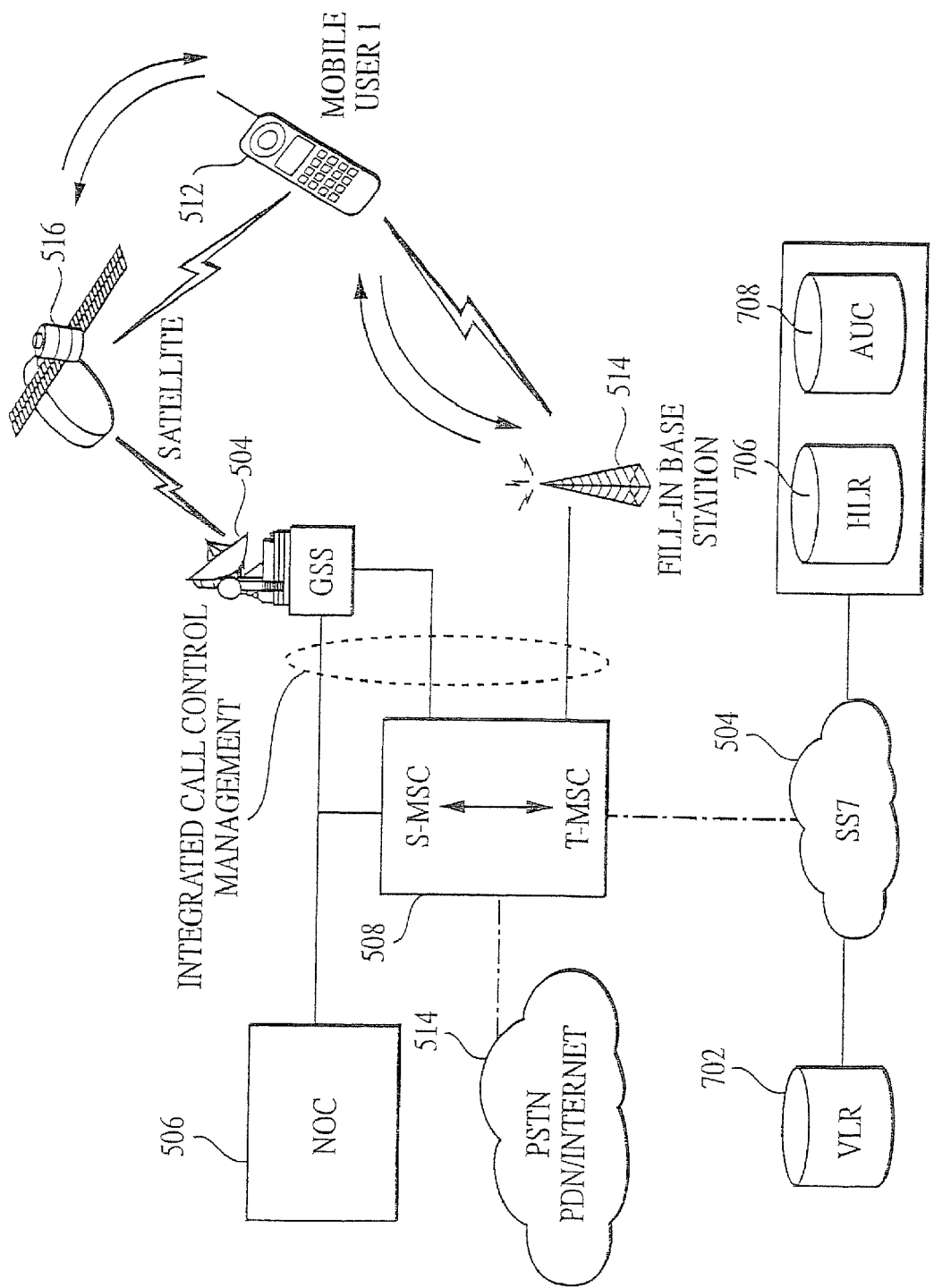
FIG. 7a is an exemplary high level block diagram illustrating an integrated satellite-terrestrial system that can use and/or be used, for example, to produce the frequency reuse schemes in accordance with the present invention.

FIG. 7a is an exemplary high level block diagram of a satellite-terrestrial system that can use, for example, the frequency assignment and/or reuse schemes in accordance with the present invention. The system of FIG. 7a is at least partially integrated in that the satellite component and the terrestrial component each share a common NOC 506 and MSC 508 (wherein S-MSC represents the satellite portion of the MSC 508, and T-MSC represents the terrestrial portion of the MSC).

Although FIG. 7a illustrates a GSM architecture, the satellite and terrestrial components comprising the system 500 of the present invention are not limited to the use of a GSM system, and can be deployed with all satellite (e.g., LEO, MEG, GEO, etc.) and cellular terrestrial technologies (e.g., TDMA, CDMA, GSM, etc., or any combinations thereof).

An exemplary Home Location Register (HLR) 706 comprises a database that stores information pertaining to the subscribers belonging to the system 500. The HLR 706 also stores the current location of these subscribers and the services to which they have access. In an exemplary embodiment, the location of the subscriber corresponds to the SS7 504 address of the Visitor Location Register (VLR) 702 associated with the subscriber terminal 512.

An exemplary VLR 702 contains information from a subscriber's HLR 706 in order to provide the subscribed services to visiting users. When a subscriber enters the covering area of a new MSC 508, the VLR 702 associated with this MSC 508 will request information about the new subscriber to its corresponding HLR 706. The VLR 702 will then have enough information in order to administer the subscribed services without needing to ask the HLR 706 each time a communication is established. The VLR 702 is optionally implemented together with a MSC 508, so the area under control of the MSC 508 is also the area under control of the VLR 702.

The Authentication Center (AUC) 708 register is used for security purposes, and generally provides the parameters needed for authentication and encryption functions. These parameters help to verify the user's identity.

In accordance with the present invention, and as disclosed in U.S. Pat. No. 5,812,968, which in incorporated herein by reference, a subscriber terminal 512 can optionally utilize a standard variable rate vocoder (i.e., a voice encoder that at two or more data rates codes/decodes, for example, human speech into/from digital transmission) or multiple vocoders, each transmitting at a different data rate to, for example, increase effective system 500 bandwidth, voice or data quality, received signal level, and/or link margin. As used herein, link margin is defined as the difference between the signal-to-noise ratio available to the receiver (e.g., subscriber terminal 512, BTS 514 and/or satellite 516) and the signal-to-noise ratio needed at the receiver to achieve a specific performance (e.g., Bit Error Rate (BER)).

For example, one or more of the subscriber terminals 512 can have a variable rate vocoder used for both satellite and terrestrial communication having data rates of, for example, 13.0 kbit/sec, 6.0 kbit/sec, 3.6 kbit/sec, 2.4 kbit/sec, and 2.0 kbit/sec. Alternatively, one or more of the subscriber terminals 512 can have, for example, a variable rate vocoder for terrestrial communications, and a variable rate vocoder for satellite communications. One or more of the subscriber terminals 512 could also have a plurality of vocoders having different data rates and used for terrestrial communication, and a plurality of vocoders having different data rates and used for satellite communication. The MSC 508 and/or the GSS 504 and BSC 510, for example, can also utilize corresponding vocoders to coordinate data rate selection and/or transition.

If the system 500 determines that system 500 channel usage, or channel usage within a portion of the system 500, is reaching a predetermined threshold (e.g., 90%), a control signal can be transmitted to one or more subscriber terminals 512 directing usage of a lower vocoder data rate. Thus if the subscriber terminal 512 was utilizing, for example, a vocoder having a 13.0 kbit/sec data rate, the subscriber terminal 512, could now be directed to utilize, for example, a vocoder having a 2.4 kbit/sec data rate, thereby increasing the effective bandwidth of the system 500 (by permitting additional calls). Use of a higher data rate can optionally resume when channel usage falls below a predetermined threshold (e.g., 60%).

Similarly, if the system 500 determines that the BER exceeds a predetermined threshold (e.g., $10^{-3}$ for voice), the system 500 can transmit a control signal to one or more subscriber terminals 512 directing usage of a lower vocoder data rate. Thus if the subscriber terminal 512 was utilizing a vocoder having a 13.0 kbit/sec data rate, the subscriber terminal 512 could now be directed to utilize a vocoder having, for example, a 2.4 kbit/sec data rate, thereby reducing the bit error rate by effectively increasing the available link margin. Use of a higher vocoder rate can optionally resume when voice quality and/or link margin exceeds a predetermined threshold.

Specifically, the satellite 516 or a BSC 510 could send a control signal to, for example, the subscriber terminal 512, optionally via MSC 508, indicating whether the signals received from the subscriber terminal 512 are of a sufficient quality. For example, a GSM-based Fast Associated Control Channel (FACCH) signal, which is used for time critical signaling such as when performing handovers, can be sent to a subscriber terminal 512 to indicate that the signals received are not of sufficient quality. A receiver unit (not shown), for example, within the subscriber terminal 512 can in turn send a control signal to, for example, a variable rate vocoder within the subscriber terminal 512 to cause the vocoder to reduce the bit rate of the signal being transmitted from the subscriber terminal 512 to the satellite 516.

Finally, the variable rate vocoder can be used to improve the effective received signal level as determined by, for example, received signal strength indication (RSSI), which is the measured power of a received signal. The RSSI is a relative measure of received signal strength for a particular subscriber terminal 512, and can optionally be based on, for example, automatic gain control settings. If the system 500 determines that the RSSI is below a predetermined threshold, the MSC 508, for example, can transmit a control signal to one or more subscriber terminals 512 to utilize a lower vocoder data rate. Thus, if one or more of the subscriber terminals 512 was utilizing a data rate of 13.0 kbit/sec, the subscriber terminal(s) 512 could now utilize a data rate of 2.4 kbit/sec, thereby increasing the effective link margin.

Figure 7B:
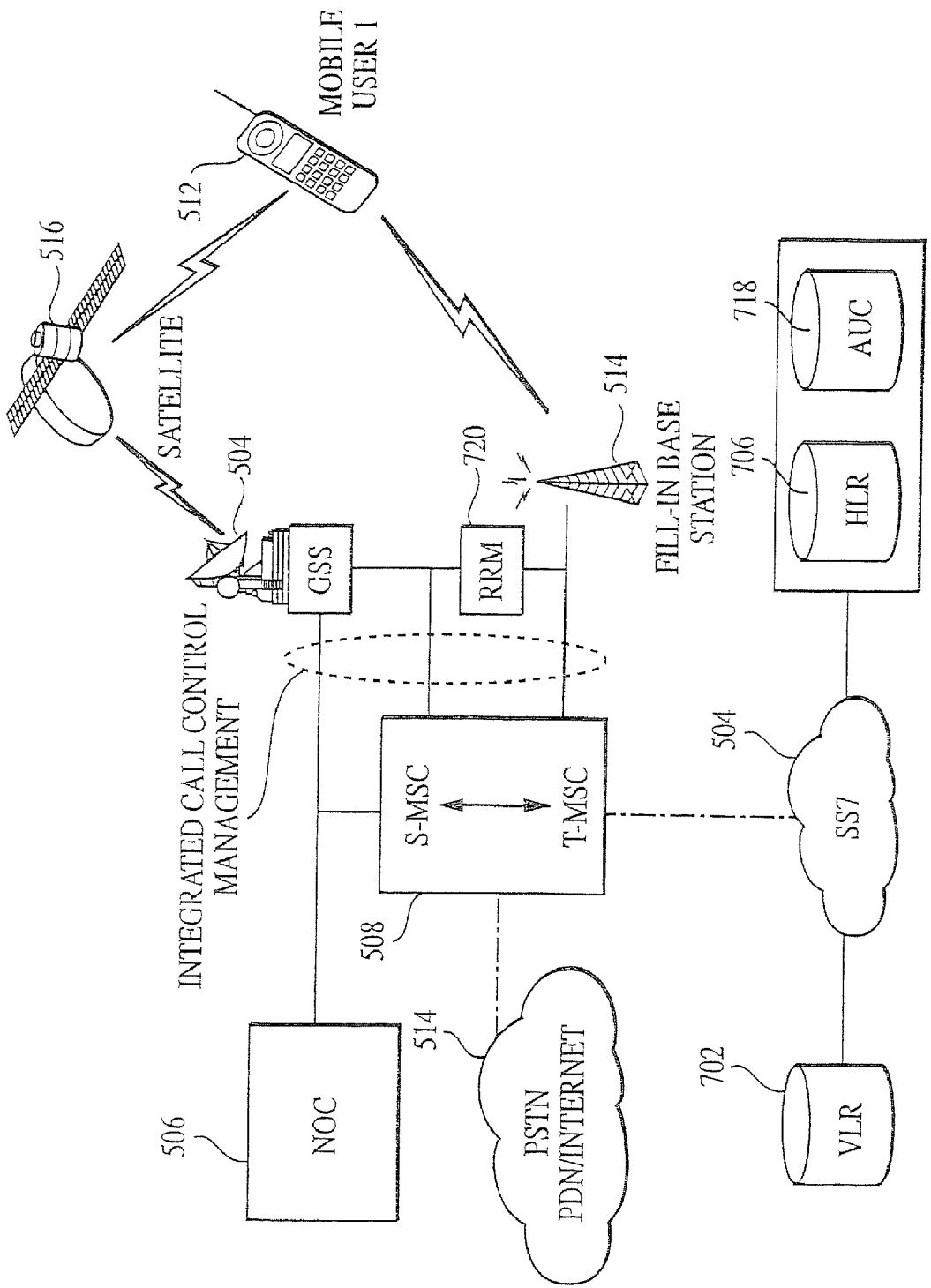
FIG. 7b is an exemplary high level block diagram illustrating an integrated satellite-terrestrial system, utilizing a radio resource manager, that can use and/or be used, for example, to produce the frequency reuse schemes in accordance with the present invention.

FIG. 7b is an exemplary high level block diagram illustrating another embodiment of the satellite-terrestrial system that utilizes a radio resource manager (RRM) 720. The RRM 720 is preferably communicable with GSS 504, with the BSCs 510 (not shown), with the MSC 508, and/or with one or more BTSs 514. The RRM 720 is preferably used to determine channels currently in use, and to optionally monitor inband interference to avoid, for example, using channels expected to cause unacceptable levels of interference (e.g., a level of interference exceeding a predetermined threshold as defined, for example, by BER). The RRM 720 can also optionally be used to monitor received signal quality and available link margin, and execute, for example, an intra-beam and/or intra-band hand-over of the communications channel when a quality measure thereof has fallen below a predetermined level and/or has exhausted a predetermined amount of link margin.

The RRM 720 preferably has means for determining which channels are being used by the system 500. For example, RRM 720 can comprise or utilize, for example, a suitable antenna operatively connected to a spectrum analyzer capable of searching, for example, one or more frequency bands for the presence of radio signals, and to determine what channels are currently being utilized within the frequency band(s). Thus, by being able to monitor usage of one or more of the frequency bands shown, for example, in FIGS. 6b-6e, the RRM 720 can identify all of the channels allocated to the system 500 that are currently being used. Alternatively, the system 500, via direct connection can inform the RRM 720 as to what channels are in use. In this embodiment, the RRM 720 does not need to monitor whether the channels are being used by either the satellite or terrestrial component(s); the RRM 720 simply determines whether a channel is currently in use or not in use.

As discussed with regard to the embodiment of the present invention shown in FIG. 7a, the subscriber terminals 512 of the embodiment shown in FIG. 7b can also utilize a variable rate vocoder or multiple vocoders, each transmitting at a different data rate to, for example, increase effective system 500 bandwidth, voice quality, effective received signal level, and/or link margin. The MSC 508 and/or the GSS 504 and BSC 510 (not shown), for example, can also utilize corresponding vocoders to coordinate data rate selection and/or transition.

If the system 500 determines that system channel usage, or channel usage within a portion of the system 500, is reaching a predetermined threshold (e.g., 90%), a control signal can be transmitted to one or more subscriber terminals 512 directing usage of a lower vocoder rate. Thus if the subscriber terminal 512 was utilizing a vocoder having a 13.0 kbit/sec data rate, the subscriber terminal 512 could now be directed to utilize, for example, a vocoder having a 2.4 kbit/sec data rate, thereby increasing the effective bandwidth of the system 500 (by permitting additional calls utilizing a lower data rate). Use of a higher data rate can optionally resume when channel usage falls below a predetermined threshold (e.g., 60%).

Similarly, if the system 500 determines that voice quality as determined by, for example, bit error rate exceeds a predetermined threshold (e.g., $10^{-3}$ for voice), the system 500 can transmit a control signal to one or more subscriber terminals 512 directing usage of a lower vocoder data rate. Thus, if a subscriber terminal 512 was utilizing a vocoder having a 13.0 kbit/sec data rate, the subscriber terminal 512 could now be directed to utilize a vocoder having a 2.4 kbit/sec data rate, thereby reducing the bit error rate. Use of a higher vocoder rate can optionally resume when voice or data quality exceeds a predetermined threshold.

Specifically, the satellite 516 or a BSC 510 (not shown), for example, can send a signal to a subscriber terminal 512, via MSC 508, indicating whether the signals received from the subscriber terminal 512 are of a sufficient quality. For example, a GSM-based FACCH signal, as previously discussed, can be sent to a subscriber terminal 512 to indicate that the signals received are not of sufficient quality. A receiver unit (not shown), for example, within a subscriber terminal 512 can in turn send a control signal to, for example, a variable rate vocoder within the subscriber terminal 512 to cause the vocoder to reduce the bit rate of the signal being transmitted from the subscriber terminal 512 to the satellite 516.

Finally, the variable rate vocoder can be used to improve effective received signal level as determined by, for example, RSSI. In this case, if the system 500 determines that the RSSI is below a predetermined threshold, the MSC 508, for example, can transmit a control signal to one or more subscriber terminals 512 to utilize a lower vocoder data rate. Thus if the subscriber terminal 512 was utilizing a data rate of 13.0 kbit/sec, the subscriber terminal 512 could now utilize a data rate of 2.4 kbit/sec, thereby increasing effective RSSI and/or link margin.

Figure 7C:
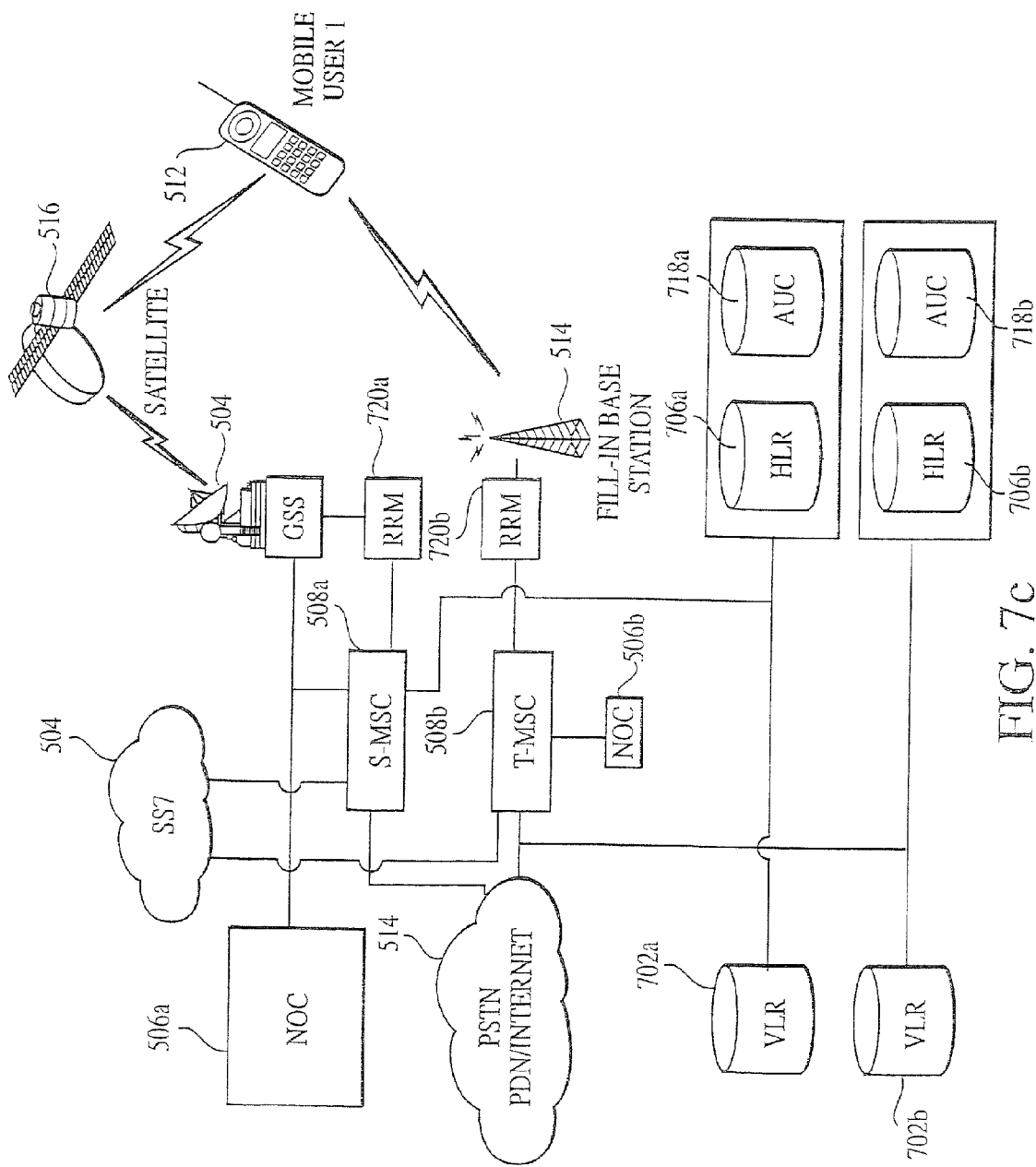
FIG. 7c is an exemplary high level block diagram illustrating a satellite-terrestrial system having autonomous satellite and terrestrial components that can use and/or be used, for example, to produce the frequency reuse schemes in accordance with the present invention.

FIG. 7c is an exemplary high level block diagram illustrating another embodiment of an autonomous satellite-terrestrial system in accordance with the present invention. In this embodiment, the satellite and terrestrial components each have their own RRMs 720a and 720b, MSCs 508a, 508b, and NOCs 506a, 506b, respectively. As shown, the satellite and terrestrial components also have their own respective VLRs 702a, 702b, HLRs 706a, 706b, and AUCs 718a, 718b. In alternate embodiments, the VLRs 702a, 702b, HLRs 706a, 706b, and/or AUCs 718a, 718b can also be connected to, for example, the PSTN 518.

As discussed with regard to FIG. 5, the NOCs 506a, 506b ensure that communication resources are available and/or assigned, reused and/or borrowed in a timely manner. Thus, by advantageously providing separate NOCs 506a, 506b, MSCs 508a, 508b, RRMs 720a, 720b, VLRs 702a, 702b, HLRs 706a, 706b, and AUCs 718a, 718b in this embodiment, the satellite and terrestrial components, while sharing and/or being assigned to at least a portion of a common frequency band can operate independently of each other.

Since, as previously discussed, RRMs 720a, 720b can determine the channels currently being utilized, RRM 720b can therefore determine, independently and without communication with RRM 720a or any other satellite component equipment, what channels are not being used for satellite communication by the system 500. For example, the RRMs 720a, 720b can comprise or utilize, for example, a suitable antenna operatively connected to a spectrum analyzer capable of searching a band of radio frequencies for the presence of radio signals, to determine what frequencies are currently being utilized within a range or ranges of frequencies of interest. RRM 720b can therefore determine, independently and without communication with RRM 720a associated with the satellite component, or any other satellite component equipment, what frequencies are not being used by the system for satellite communication. Since the RRM 720b knows the frequencies used across a range of frequencies of interest, as well as the frequencies used by the terrestrial component, RRM 720b can also determine or deduce the frequencies that are currently being used by the satellite component. Similarly, the satellite component functions in substantially the same manner to, inter alia, determine the frequencies currently being used by the terrestrial component.

Similarly, RRM 720a could also use, for example, an antenna in combination with frequency and/or spectrum analysis techniques to determine, independently and without communication with RRM 720b or any other terrestrial component equipment, what channels are being used by the system 500 for terrestrial communications. Since RRM 720a knows all of the channels used across a range of frequencies of interest, as well as the channels used by the satellite component, RRM 720a can identify the channels that are currently being used by the terrestrial component.

As discussed with regard to the embodiment of the present invention shown in FIGS. 7a and 7b, the subscriber terminals 512 of the embodiment shown in FIG. 7c can also utilize a variable rate vocoder or multiple vocoders, each transmitting at a different data rate to, for example, increase effective system 500 bandwidth, voice quality, received signal level, and/or link margin. The MSC 508a, 508b and/or the GSS 504 and BSC 510 (not shown), for example, can also utilize corresponding vocoders to coordinate data rate selection and/or transition.

If the system 500 determines that system 500 channel usage, or channel usage within a portion of the system 500, is reaching a predetermined threshold (e.g., 90%), a control signal can be transmitted to one or more subscriber terminals 512 directing usage of a lower vocoder data rate. Thus, if a subscriber terminal 512 was utilizing a vocoder having a 13.0 kbit/sec data rate, the subscriber terminal 512 could now utilize, for example, a vocoder having a 2.4 kbit/sec data rate, thereby increasing the effective bandwidth of the system 500 (by permitting additional calls utilizing a lower data rate). Use of a higher data rate can optionally resume when channel usage falls below a predetermined threshold (e.g., 60%).

Similarly, if the system 500 determines that voice or data quality as determined by, for example, bit error rate exceeds a predetermined threshold (e.g., $10^{-3}$ for voice), the system 500 can transmit a control signal to one or more subscriber terminals 512 directing usage of a lower vocoder data rate. Thus, if a subscriber terminal 512 was utilizing a vocoder having a 13.0 kbit/sec data rate, the subscriber terminal 512 could now be directed to utilize a vocoder having a 2.4 kbit/sec data rate, thereby reducing the bit error rate. Use of a higher vocoder rate can optionally resume when voice quality exceeds a predetermined threshold.

Specifically, the satellite 516 or a BSC 510 (not shown) can send a signal to the subscriber terminal 512, via MSC 508a or MSC 508b, respectively, indicating whether the signals received from the subscriber terminal 512 are of a sufficient quality. For example, a GSM-based FACCH signal, as previously discussed, can be sent to a subscriber terminal 512 to indicate that the signals received are not of sufficient quality. A receiver unit (not shown), for example, within the subscriber terminal 512 can in turn send a control signal to, for example, a variable rate vocoder within the subscriber terminal 512 to cause the vocoder to reduce the bit rate of the signal being transmitted from the subscriber terminal 512 to the satellite 516 or to the BTS 514.

Finally, the variable rate vocoder can be used to improve received signal level as determined by, for example, RSSI. In this case, if the system 500 determines that the RSSI is below a predetermined threshold, the respective MSC 508a, 508b, for example, can transmit a control signal to one or more subscriber terminals 512 to utilize a lower vocoder data rate. Thus, if a subscriber terminal 512 was utilizing a data rate of 13.0 kbit/sec, the subscriber terminal 512 could now utilize a data rate of 2.4 kbit/sec, thereby increasing the effective RSSI and/or link margin.

Figure 8A:
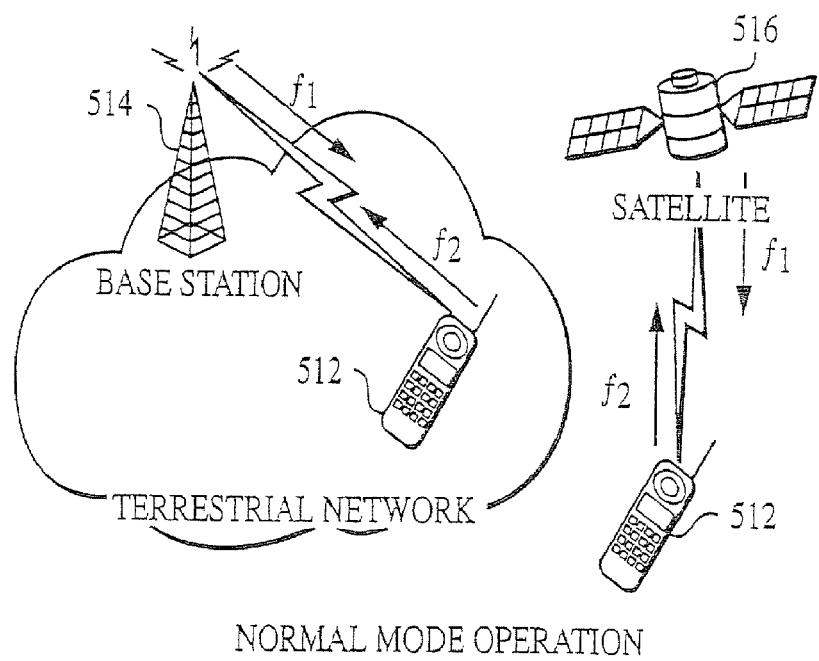
FIGS. 8a, 8b, 8c and 8d show exemplary embodiments of the present invention pertaining to how uplink and downlink frequencies can be utilized in the satellite and terrestrial components.
Figure 8B:
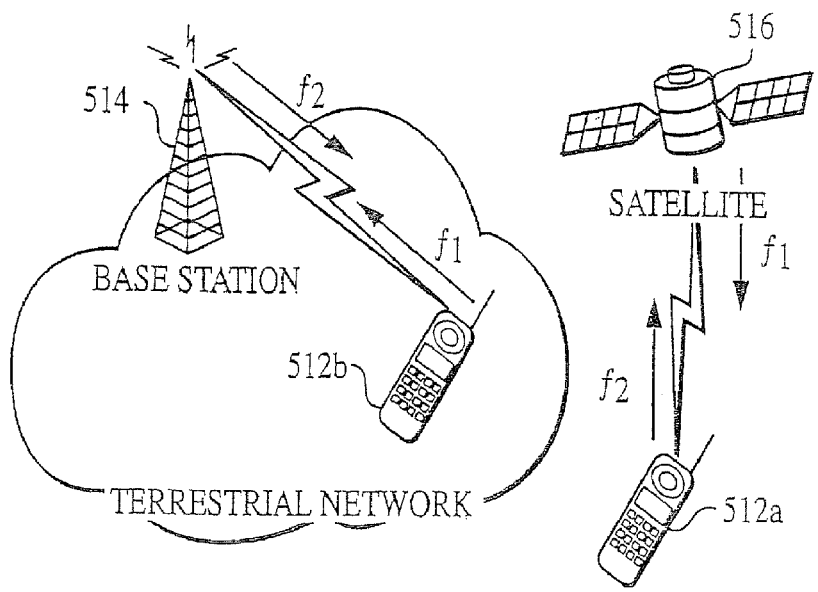
Figure 8C:
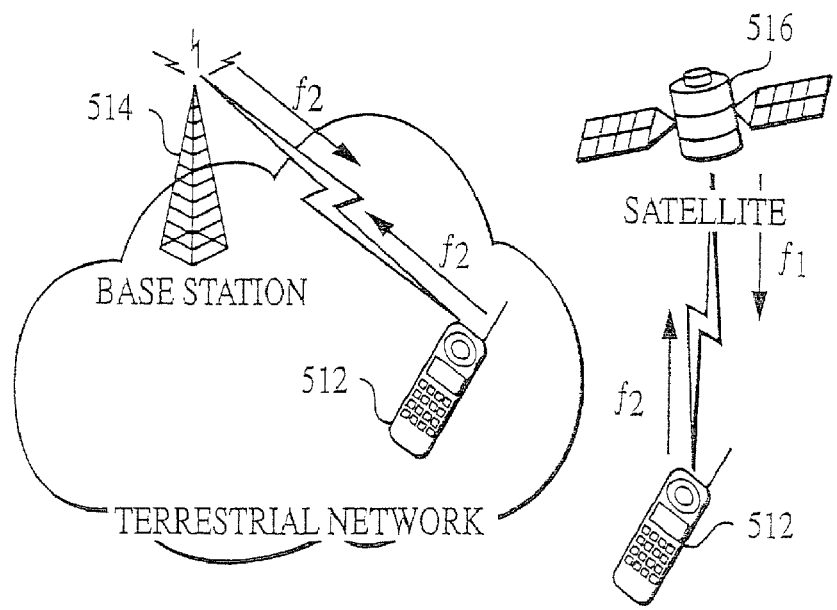

FIGS. 8a, 8b, and 8c show exemplary embodiments of the present invention pertaining to how uplink and downlink frequencies can be utilized in or by the satellite and terrestrial components. FIG. 8a shows a first exemplary embodiment where the satellite 516 downlink $f_1$ is used, assigned and/or reused as the terrestrial downlink $f_1$. Similarly, the satellite uplink $f_2$ is used as the terrestrial uplink link $f_2$. Interference with channels typically may result when, for example, a subscriber terminal 512 has a direct line of sight path to one or more satellites, and also has a communication link with a terrestrial BTS having the same or nearby frequency.

The embodiment shown in FIG. 8b involves reversing the satellite downlink $f_1$ and satellite uplink $f_2$ frequencies to become the terrestrial uplink link $f_1$ and terrestrial downlink link $f_2$ frequencies, respectively. As a result, there will be two possible interference paths: (1) between the satellite 516 and BTS 514, as uplink to downlink interference on $f_1$, and as uplink to downlink interference on $f_2$; and (2) between the satellite subscriber terminals 512a and terrestrial subscriber terminals 512b, as downlink to uplink interference on $f_1$, and as downlink to uplink interference on $f_2$. Measures should be taken to eliminate or substantially reduces both of these possible interferences.

For example, to minimize these interferences, BTSs 514 that have a substantially reduced gain in the geostationary arc (i.e., the elevation angle above the horizon from a base station to the satellite) can be utilized. Within North America, the geostationary arc typically varies from approximately 30° to 70°, depending, for example, on the latitude of the base station. To fully take advantage of this fact, it is preferred that the base station antenna pattern have a null, and therefore significantly reduced gain, in the geostationary arc portion of its vertical pattern.

In addition, it is preferred that the BTSs 514 be optimally or substantially optimally located and oriented to advantageously utilize the horizontal gain pattern of the antenna. The benefits of using this technique, for example, are that frequency reuse will be maximized or substantially maximized, thereby enhancing the overall capacity of the system, and further reducing or eliminating interference.

In addition to the increased isolation provided by the vertical antenna pattern, additional isolation can be obtained from the horizontal antenna pattern. For example, preferably by configuring BTSs 514 such that the azimuth to the satellite is off-bore or between sectors, several additional dB of isolation can typically be achieved. By keeping this configuration standard for, say, a cluster of base stations, frequency reuse for the terrestrial system can generally be increased.

Interference between satellite subscriber terminals 512a and terrestrial subscriber terminals 512b is typically a problem when the units are in relatively close proximity to one another. It is preferred that such interference be substantially reduced or eliminated by, for example, first detecting close proximity before the assignment of a radio channel (i.e., during call initialization), and secondly by providing a hand-off to a non-interfering channel if close proximity occurs after the assignment of a radio channel. For example, a relatively small group of channels, called "transition channels", can be reserved for single-mode terminals. The single mode terminals preferably use transition channels while inside base station coverage. It is also preferred that dual-mode terminals also use the transition channels under certain circumstances. For example, after a dual mode terminal scans channels for signal strength and interference, a transition channel can be utilized if unacceptable levels of interference are detected.

The embodiment shown in FIG. 8c involves using the satellite system uplink $f_2$ as both the terrestrial system downlink $f_2$ and uplink $f_2$ frequencies using time division duplex techniques. In alternate embodiments, the terrestrial downlink and uplink frequencies are optionally discrete bands. For example, downlink frequencies may comprise $f_{2a}$, and uplink frequencies may comprise $f_{2b}$.

Figure 8D:
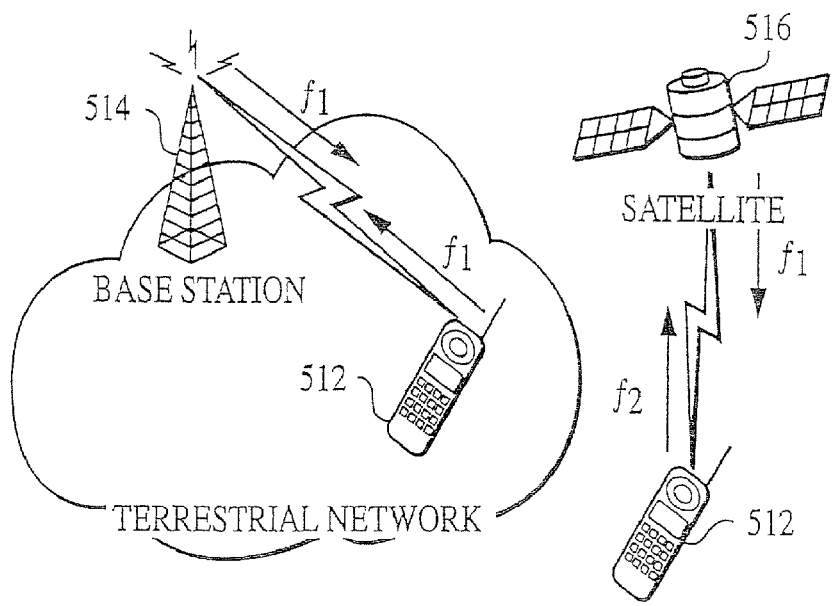

Finally, the embodiment shown in FIG. 8d involves using the satellite system downlink $f_1$ as both the terrestrial system downlink $f_1$ and uplink $f_1$ frequencies using time division duplex techniques. In alternate embodiments, the terrestrial downlink and uplink frequencies are optionally discrete bands. For example, downlink frequencies may comprise $f_{1a}$, and uplink frequencies may comprise $f_{1b}$.

Figure 9:
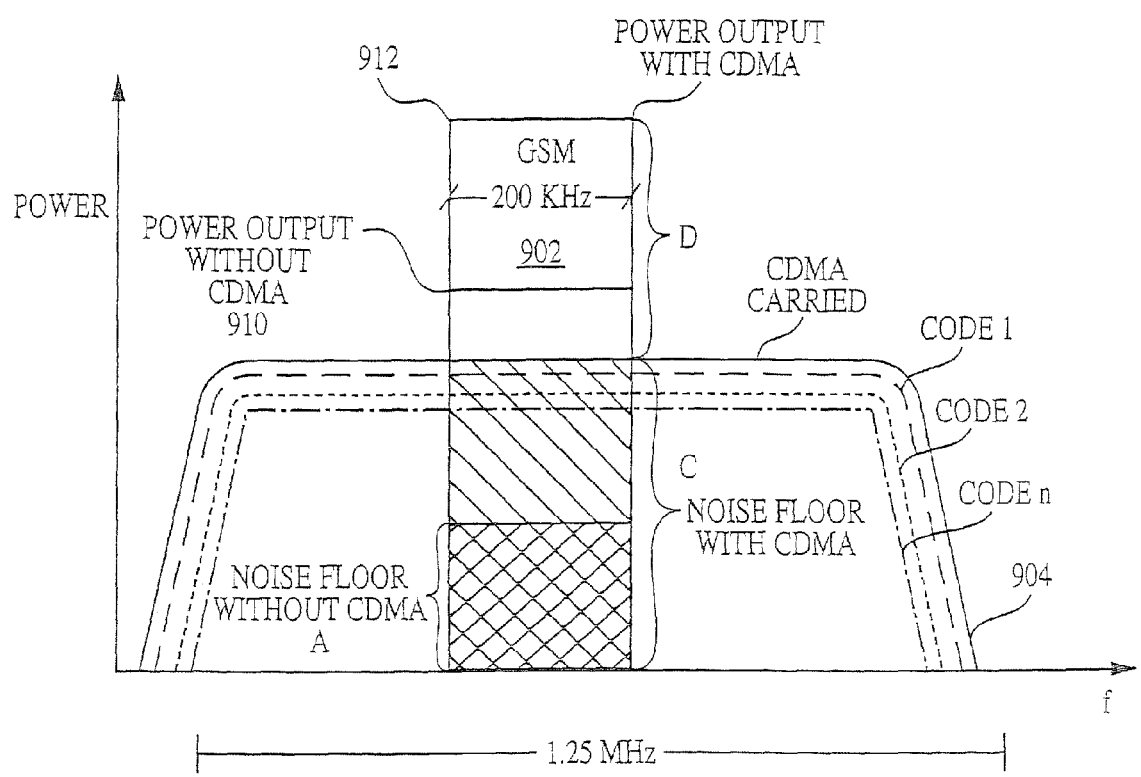
FIG. 9 is an exemplary schematic showing how link margins can be affected when utilizing different air interfaces for the satellite and terrestrial components.

FIG. 9 is an exemplary schematic showing how link margins can be affected when the satellite and terrestrial components use different air interfaces simultaneously in overlapping areas of coverage. FIG. 9 assumes that the satellite component uses GSM 902, and that the terrestrial component uses CDMA 904. However, the principles discussed herein with regard to FIG. 9 are generally applicable to any air interface(s) that may be used with the satellite and terrestrial components.

As shown, the GSM channel 902 can be a 200 kHz channel, and the CDMA channel 904 can be a 1.25 MHz channel. If the satellite component is using the GSM channel 902 and the terrestrial component is not operating (i.e., the 1.25 CDMA channel is not being used), there will be a noise floor A, and the subscriber terminals 512 will provide output at power level 910. The link margin can be increased by, for example, increasing power output level 910, reducing noise floor A, or a combination thereof.

When the terrestrial system goes into use, the noise floor is indicated by C, which generally corresponds to the aggregate power output of the CDMA channel 904. In order to compensate for the increased noise floor C and increase their link margin, subscriber terminals 512 operating in the GSM/satellite mode will provide output at power level 912 to overcome the higher noise floor C. Accordingly, subscriber terminals will provide output at 912 to provide sufficient link margin.

Now, consider the situation in which subscriber terminals 512 are using the CDMA channel 904, but not the GSM channel 902. In such a case, the terrestrial component will generally be able to utilize all n CDMA channels per carrier.

When the satellite component goes into use, subscriber terminals 512 operating in the satellite mode will detect noise floor C, assuming that subscriber terminals 512 are utilizing all n CDMA channels. Accordingly, subscriber terminals 512 operating in the satellite mode will output at level 912, which appears as noise to the subscriber terminals 512 operating in the terrestrial mode. The terrestrial system will then gracefully degrade by, for example, prohibiting, for a period of time, subscriber terminal 512 use of certain user codes n (e.g., channels) once the calls have, for example, been terminated. The RRM 720 (or 720a) can determine when additional calls can be established by considering, for example, anticipated link margin on the call to be established.

Figure 10:
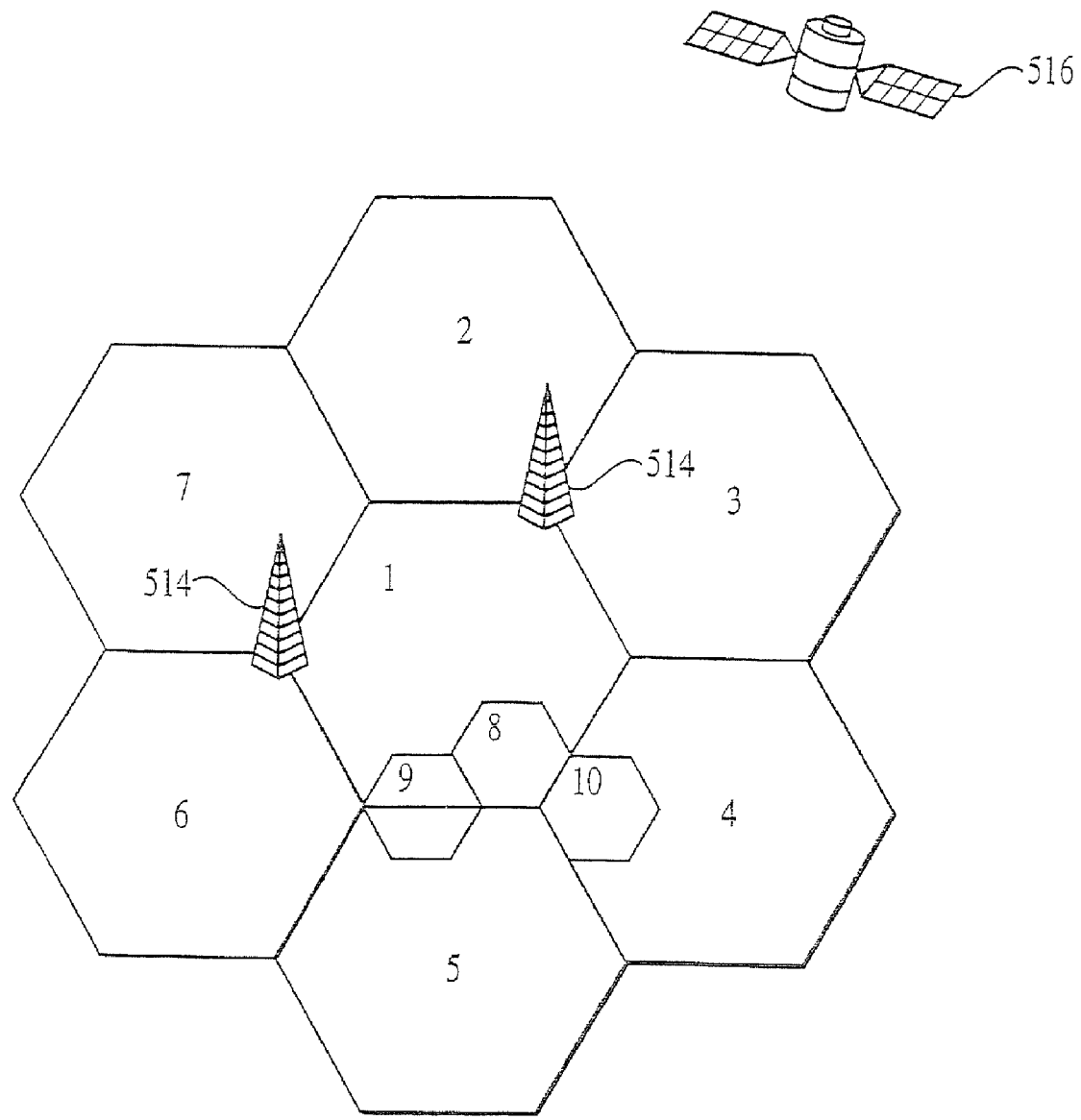
FIG. 10 shows an exemplary seven cell satellite spot beam pattern that can be used in connection with the present invention.

FIG. 10 shows a single satellite 516 providing a first set of cells 1-7 in the form of a seven cell pattern. A second set of terrestrial cells 8-10 is also shown, each generally comprising or operationally communicable with a BTS 514. FIG. 10 can use any of the embodiments discussed with regard to FIGS. 7a-7d. Multiple satellites and/or any number of cells and/or cell configurations may be used.

Suppose a subscriber terminal 512 (not shown) positioned within terrestrial cell 8 wishes to use a channel when all channels are currently being used by the satellite 516. If all channels are currently being used (see, e.g., FIGS. 6b-6g), the subscriber terminal 512 will preferably measure and select the satellite channel or channel that is busy with the weakest signal strength to be reused terrestrially by the subscriber terminal 512. Selecting the satellite channel with the weakest signal generally minimizes the interference between the satellite 516 and the subscriber terminal 512.

Generally, the channels associated with the spot beam most geographically distant from the subscriber terminal 512 (in, for example, terrestrial cell 8) have the weakest signal strength and thus will cause the least interference. Thus, with regard to terrestrial cell 8, the channels associated with cells 7 and 2 are the furthest distance (geographically), and will generally cause the least interference. Channels selected from cells 3 and 6 will generally cause more interference than those channels selected from cells 7 and 2, channels selected from cells 5 and 4 will generally cause more interference than channels selected from cells 3 and 6, and channels selected from cell 1 will generally cause the most interference. If there is an available channel that is not being used (by either the satellite or terrestrial components), the subscriber terminal 512 is preferably assigned an unused channel. Once the call is setup, handover will be performed if interference levels having, for example, a predetermined threshold are detected. The above process may alternatively or in addition be used for systems with overlapping satellite-satellite coverage and/or overlapping terrestrial-terrestrial coverage.

Figure 11:
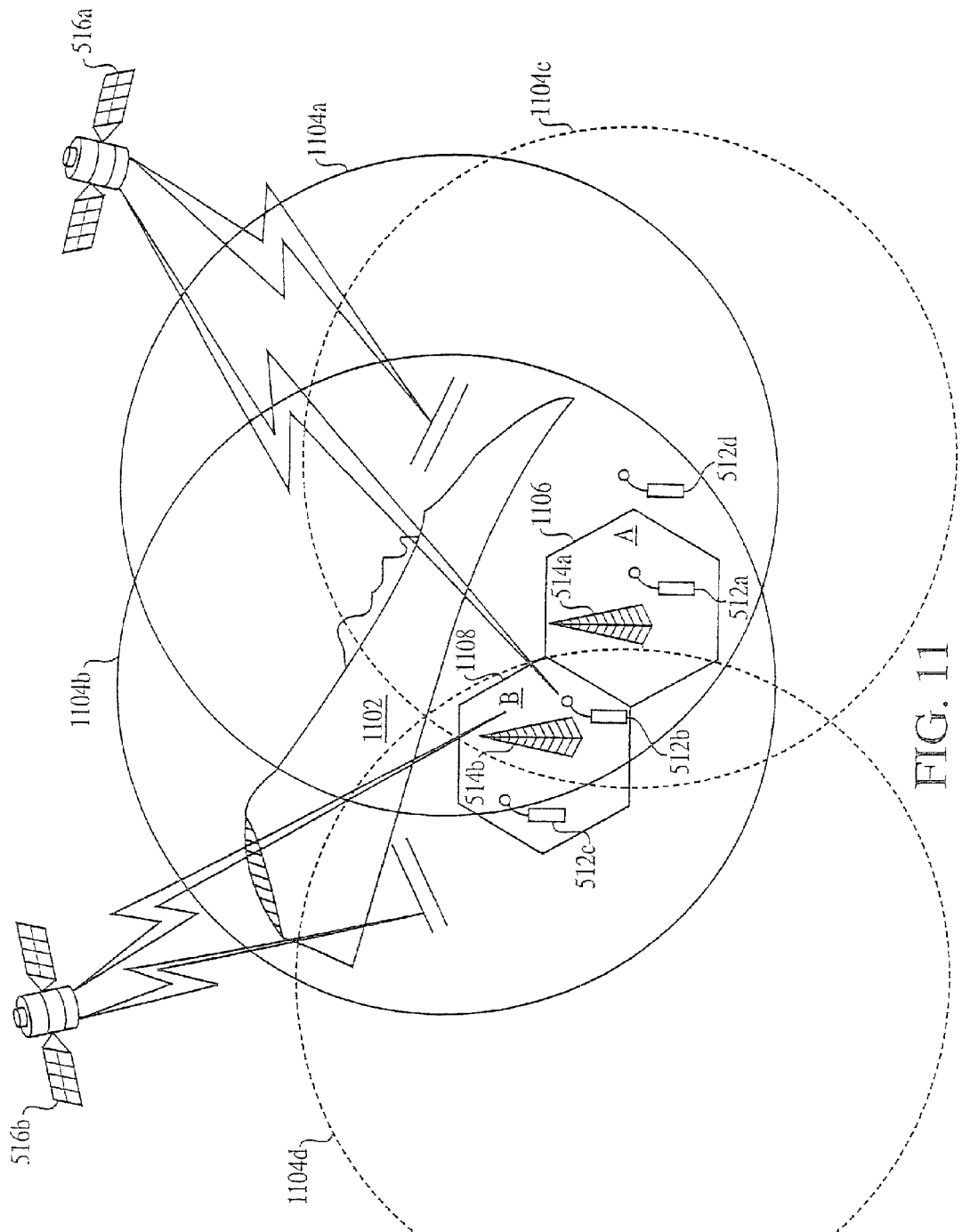
FIG. 11 is an exemplary schematic showing how terrain blockage can affect assignment of frequencies.

As shown in FIG. 11, the present invention can also be practiced with two or more satellites 516a, 516b, each having their own respective spot beam 1104a, 1104b. The (two or more) satellites 516a, 516b will generally have different assigned frequency bands and associated channels, as shown, for example, in FIG. 6c. Each spot beam 1104a, 1104b can further comprise, for example, two or more subareas or subsectors, each having their own frequency band or portion thereof associated therewith.

When possible, subscriber terminal 512a (512a, 512b, 512c, 512d can represent a single terminal in four locations, or four different subscriber terminals) preferably measures signal strength of the signaling and/or traffic channels associated with each satellite 516a, 516b, and with at least the BTS 514 of the terrestrial cell (if any) that the subscriber terminal is positioned in. The signaling channels are the control channels, and the traffic channels are where, for example, voice conversations take place. For example, when the subscriber terminal 512a is positioned in terrestrial cell 1106, it will measure the strength of signals from at least BTS 514a. However, when the subscriber terminal 512a is, for example, on a cell boundary between terrestrial cells 1106 and 1108, the subscriber terminal can optionally measure the signal strength from, for example, BTS 514a and BTS 514b, and optionally from other neighboring BTS(s) (not shown). It is preferred that subscriber terminals 512 continuously measure the signal strength of the satellite 516a, 516b and the BTSs 514.

In general, when a channel is not in use by any communication system covering a predetermined area, the subscriber terminals 512 will preferably and generally select for use the channel having the strongest signal strength or other criteria that indicates a preferred communication channel such as band, capacity, protocols, time of day, location, interference level, and the link. With regard to FIGS. 6b, 6c, 6f and 6g, any unused channel, however, can be selected to accommodate, for example, network loading considerations. This channel can be used to communicate with a subscriber terminal 512 either by the satellite component (e.g., 602, 602a, or 502b) or terrestrial component (e.g., 604, 604a, or 604b) of the system 500.

When all channels are in use, the subscriber terminal 512 will preferably select a channel (e.g., 615) currently being used by the satellite 516 having the weakest signal strength, and use that channel to communicate with a BTS 514 with which the subscriber terminal 512 has the strongest signal.

Figure 12A:
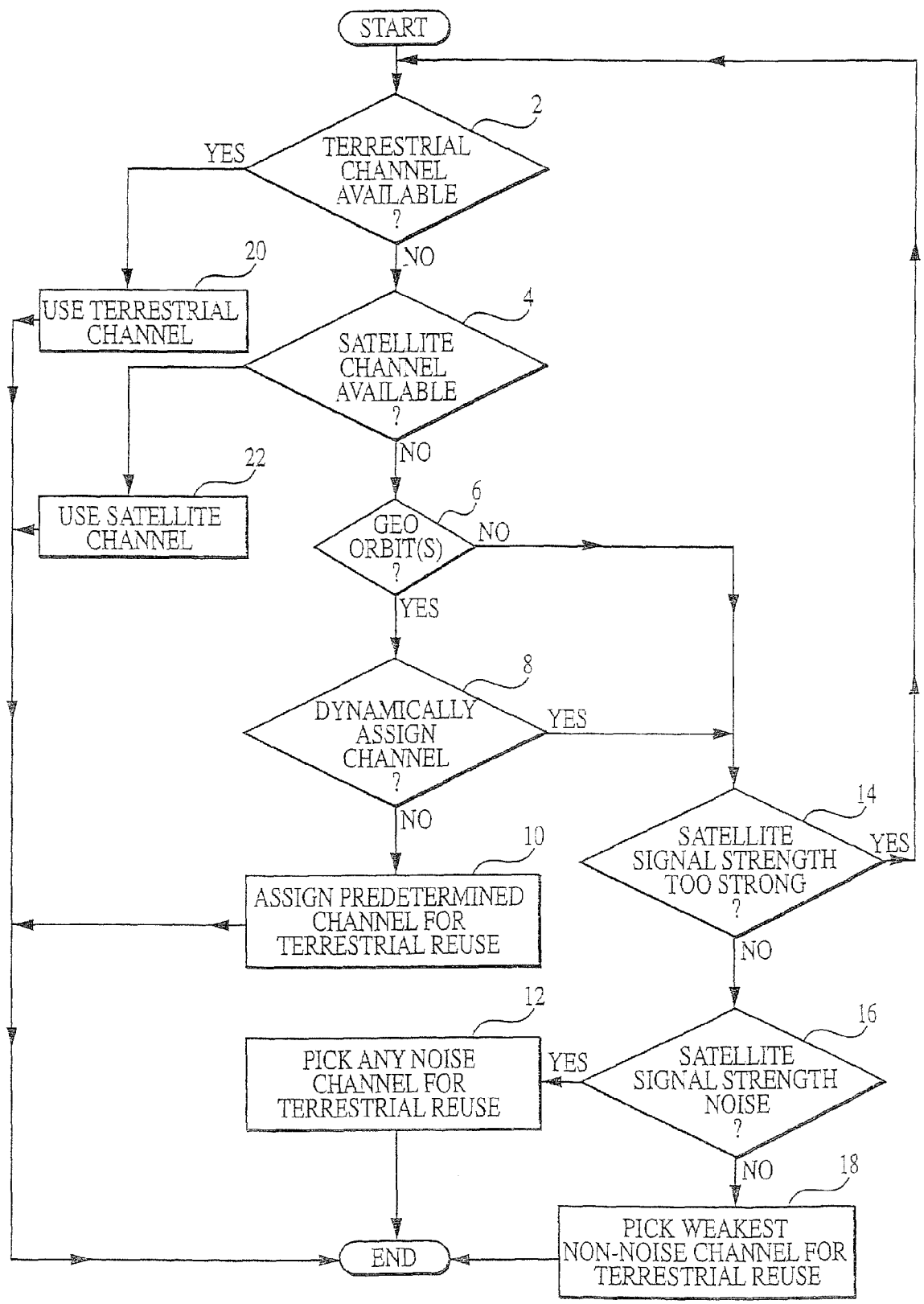
FIG. 12a shows an exemplary flow diagram of an overall system method, including assignment and reuse of channels based on signal strength, in accordance with the present invention.

FIG. 12a shows a first exemplary flow diagram of an overall system method, including assignment and reuse of channels based, for example, on signal strength, in accordance with the present invention. FIG. 12a assumes that there are separate satellite and terrestrial channels as shown, for example, in FIGS. 6d and 6e. At decision step 2 a determination is made whether a terrestrial channel is available. The determination can be made by a subscriber terminal 512, a RRM 720, 720a, 720b, a BTS 514, or a NOC 508, 508a, 508b. For example, as previously described herein, the subscriber can select a channel based on signal strength (and, for example, based on the channel having an acceptably low interference level and/or availability). Channel availability as determined by the RRM 720, 720a, 720 has been discussed with regard to FIGS. 7a-7d. Similarly, as previously described herein, in at least one embodiment of the present invention, the BTS 514, via the MSC 508 and the BSC 510, determines which channels are in use or not in use. NOCs(s) 508, 508a, 508b, can maintain cognizance of the availability of satellite and/or terrestrial resources and/or arrange for reconfiguration, assignment and/or reuse of frequencies to meet changed traffic patterns.

If it is determined that a terrestrial channel is available, then an available channel is used terrestrially at step 20, and the process ends. If a terrestrial channel is not available, a determination is made at decision step 4 if a satellite channel is available. If so, an available channel is used for satellite communication at step 22, and the process ends. If a satellite channel is not available, a determination is made whether the one or more satellites are in a geosynchronous orbit at decision step 6.

If a geosynchronous orbit is utilized then, at decision step 8, a determination is optionally made whether channels are dynamically assigned. If not, a predetermined satellite channel as determined by the system is reused terrestrially at step 10.

If a geosynchronous orbit is not utilized, or if a geosynchronous orbit with dynamically assigned channels is utilized, or if the determination regarding orbits is not made at all then, at decision step 14, a determination is made whether the signal strength of the received satellite channel(s) currently in use is too strong. If so, unacceptable interference would occur between the satellite channel and that channel when it is reused terrestrially, and the process begins again at decision step 2. If the signal strength of the received satellite channel(s) is acceptably weak so as to not cause unacceptable interference, a determination is made at decision step 16 whether the signal strength is considered noise. If so, at step 12, any noise channel can be selected for terrestrial reuse. If the satellite channel is not considered noise, then the non-noise satellite channel having the weakest signal strength is selected for terrestrial reuse.

Figure 12B:
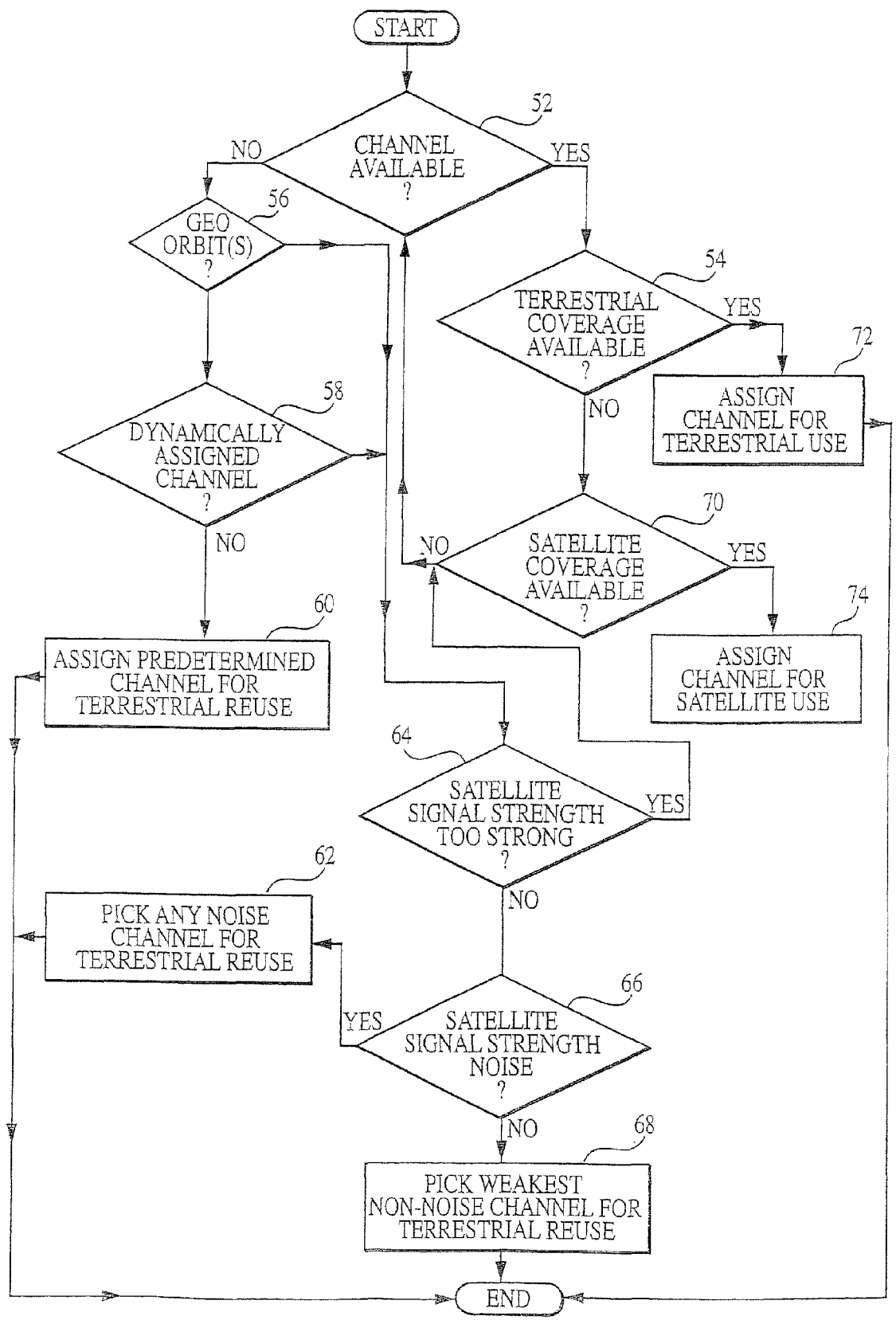
FIG. 12b shows an exemplary flow diagram of a second overall system method, including assignment and reuse of channels based on signal strength, in accordance with the present invention.

FIG. 12b shows a second exemplary flow diagram of an overall system method, including assignment and reuse of channels based on signal strength, in accordance with the present invention. FIG. 12b assumes that any channel can be used for satellite communication, terrestrial communication or, in the case of frequency reuse, simultaneous satellite and terrestrial communication. FIGS. 6f and 6g show exemplary frequency band embodiments that can be used with the method in accordance with FIG. 12b.

At decision step 52 a determination is made whether a channel is available (i.e., not currently in use). As previously discussed with regard to FIG. 12a, the determination can be made by a subscriber terminal 512, a RRM 720, 720a, 720b, a BTS 514, a MSC 508, or a NOC 508, 508a, 508b. For example, as previously described herein, the subscriber can select a channel based on signal strength (and availability). Channel availability as determined by the RRM 720, 720a, 720 has been discussed with regard to FIGS. 7a-7d. Similarly, as previously described herein, in at least one embodiment of the present invention, the BTS 514, via the MSC 508 and the BSC 510, determines which channels are in use or not in use. NOCs(s) 508, 508a, 508b, can maintain cognizance of the availability of satellite and/or terrestrial resources and/or arrange for reconfiguration, assignment and/or reuse of frequencies to meet changed traffic patterns.

If it is determined that a channel is available, a determination is made at decision step 54 whether terrestrial coverage is available and, if so, a channel is assigned for terrestrial use at step 72. If it is determined at decision step 4 that terrestrial coverage is not available, that at decision step 70, a determination is made whether satellite coverage is available. If so, a channel is assigned for satellite communication at step 74. If it is determined that satellite coverage is not available, then the process returns to decision step 52. If at decision step 52 a determination is made that a channel is not available, then steps 56-78 are executed, as described with regard to steps 6-18 of FIG. 12a. It should be understood that criteria other than signal strength can be used in assigning channels, as will be discussed, for example, with regard to FIG. 13.

Returning to FIG. 11, as discussed, when accessing (e.g., initiating communication with) a channel, the subscriber terminal 512a, if possible, determines the signal strength of the signaling channel(s) from the satellite(s) 516a, 516b, as well as the signaling channels of at least BTS 514a. In the case of subscriber terminal 512a, terrain blockage 1102, for example, can affect assignment of frequencies since subscriber terminal 512a can detect very little, if any, signal from satellite 516a. It should be understood that assignment and/or reuse of frequencies can also be affected by, for example, man made structures and/or naturally occurring phenomena such as foliage that can also partially or completely block or obstruct a line of sight between a subscriber terminal 512a and a satellite 516a, as well as by general signal attenuation.

When there is no direct line of site between subscriber terminal 512a and satellite 516a, little or no signal is "leaked" from the subscriber terminal 512a to the satellite 516a. At the same time, when there is coverage from terrestrial BTS 514a, the BTS 514a can reuse a channel being used by satellite 516a to communicate without interference, or substantially without interference, with subscriber terminal 512a. In such a case, interference between the satellite 516a and the subscriber terminal 512a is minimized since, when signal attenuation occurs in the channel from the subscriber terminal 512a to the satellite 516a, there also is a substantially equal attenuation of the signal from the satellite 516a to the subscriber terminal 512a. Therefore, if the subscriber terminal 512a detects a weak signal having, for example, a predetermined signal strength from a satellite 516a, there will also be a correspondingly weak signal from the subscriber terminal 512a to the satellite 516a. Thus, terrestrial reuse of a channel is preferred when the signal from the satellite 516a to the subscriber terminal 512a (and vice versa) is, for example, the weakest, or defined by, for example, a predetermined signal quality (e.g., RSSI and/or bit error rate).

In the embodiment shown in FIG. 7d, the RRM 720b, having determined the frequencies currently being used by the satellite component, can assign such channel for terrestrial reuse by a subscriber terminal 512. In general, it is preferred that the satellite having the channel with predetermined criteria such as the weakest signal strength vis-à-vis subscriber terminal 512a or other predetermined criteria is preferably selected for terrestrial reuse.

Alternatively, if the subscriber terminal 512a does not have coverage from a BTS 514, then terrestrial transmission cannot be utilized, and the subscriber terminal 512a preferably uses the satellite having the strongest signal (which is satellite 516b in this case).

Subscriber terminal 512b has a direct line of sight to both satellites 516a, 516b. Accordingly, the channel having the weakest signal strength vis-à-vis subscriber terminal 512b will preferably be selected for terrestrial reuse via, for example, BTS 514b. As shown, although subscriber terminal 512c has a direct line of sight to satellite 516a, the line of sight between subscriber terminal 512c and satellite 516b is blocked by terrain 1102. Accordingly, the signals received from satellite 516b, assuming they can be received, by subscriber terminal 512c, will be weaker than the signals received by subscriber terminal 512c from satellite 516a. Accordingly, the weakest channel from satellite 516b will preferably be selected for terrestrial reuse by subscriber terminal 512c.

With regard to subscriber terminal 512d, there is a line of sight to both satellites 516a, 516b. In this case, an available (i.e., unused) channel having the strongest signal strength from either satellite 516a, 516b is preferably selected for use since, as shown, subscriber terminal 512d is not within a terrestrial cell (e.g., 1106, 1108) and is thus not covered (or sufficiently covered) by a BTS 514 to enable terrestrial communication.

Referring to FIG. 11, the present invention is also applicable to a mobile satellite system (e.g., a Low Earth Orbit (LEO) system) or in which a given geographical area is covered on a dynamic basis by, for example, two or more satellites. For example, in a mobile satellite system, at one point in time the spot beams of satellites 516a, 516b could be 1104a, 1104b, respectively. At a subsequent (or previous) time, the satellite 516a, 516b, spot beams could cover an area as indicated by 1104c, 1104d, respectively.

In this scenario, a subscriber terminal 512 preferably recognizes, for example, the signaling channels associated with each respective spot beam 1104a, 1104b. In the case of overlapping coverage of spot beams within a given geographic area, the subscriber terminal 512 preferably makes measurements on multiple signaling channels coming from multiple satellites 516a, 516b. When all available channels are utilized or not available, subscriber terminal 512 preferably selects for reuse the channel with the weakest signal strength in that given area. It should be understood that although only two spot beams 1104a, 1104b (corresponding to satellites 516a, 516b, respectively) are shown, the subscriber terminal 512 preferably measures the strength of, for example, the signaling channels associated with any number of spot beams/satellites.

When a subscriber terminal 512 is on the border or under the influence, for example, of two or more spot beams 1104a, 1104b (or, e.g., the border of spot beams 1 and 7 in FIG. 10), the subscriber terminal 512 may have a tendency to transition back and forth between respective channels associated with the two spot beams 1104a, 1104b and/or between coverage areas of the terrestrial and satellite systems. In order to prevent such a back-and-forth transfer between the channels associated with the respective spot beams, the present invention advantageously utilizes hysteresis so that there is, for example, a predetermined threshold (e.g., 2 dB) difference in signal strength before allowing the subscriber terminal 512 to make such a transition.

The present invention also optionally utilizes negative hysteresis to, for example, balance the loading between the satellite and terrestrial components and/or respective portions thereof. For example, with regard to FIG. 10, consider the case when a channel is being reused terrestrially, and the channels of spot beam 7 are being used much more than the channels of spot beam 1. Even though the channels of spot beam 7 may have a weaker signal strength than the channels of spot beam 1, subscriber terminals 512 may be directed to terrestrially reuse channels from spot beam 1 rather than spot beam 7 to, for example, better balance network loading. It should be understood that negative hysteresis can also be applied to a single satellite when the satellite contains multiple frequency bands.

Negative hysteresis can also be used to balance loading between two or more satellites 516a, 516b. For example, with regard to FIG. 11, suppose satellite 516a has all or substantially all of its channels used, and satellite 516b has none or very few of its channels used. Then, even though the signal strength of channels from satellite 516a may be stronger, it may be desirable to assign a call to satellite 510b when, for example, RSSI is sufficient. Now, suppose channels from satellite 516b have a stronger signal strength (relative to one or more subscriber terminals 512), and that fewer of its channels are being utilized. In such a case, it may be desirable to terrestrially reuse channels from satellite 516b to, for example, balance network loading, even though the use of such channels may result in higher interference.

Figure 13:
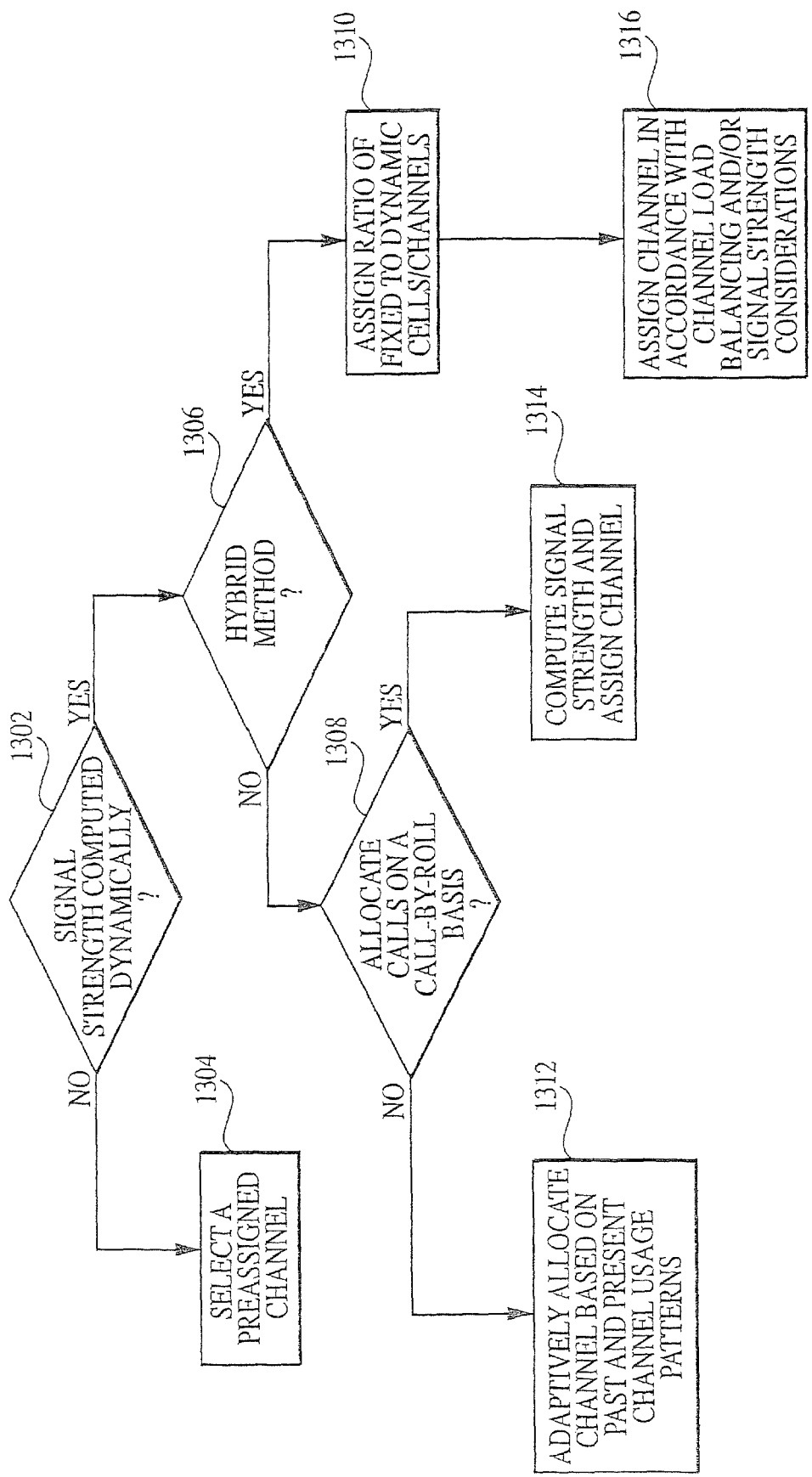
FIG. 13 is a high level flow diagram illustrating the static and dynamic channel assignment features of the present invention.

FIG. 13 is a high level flow diagram of illustrating the static and dynamic channel assignment features of the present invention. As discussed in *Channel Assignment Schemes for Cellular Mobile Telecommunication Systems: A Comprehensive Survey*, IEEE Personal Communications Magazine, June 1996, I. Katzela and M. Naghshineh, incorporated herein by reference, when channel assignment schemes are classified based on separating co-channels apart in space, three broad categories can be identified: fixed channel allocation schemes (FCA), dynamic channel allocation schemes (DCA), and hybrid channel allocation schemes (HCA). FCA schemes partition the given serving area into a number of cells and allocate the available channels to cells based on some channel reuse criterion. DCA schemes pool together all the available channels and allocate them dynamically to cells as the need arises. Consequently, DCA schemes are capable of adapting to changing traffic patterns. HCA schemes provide a number of fixed channels, and a number of channels that can be dynamically allocated.

If the satellite 516 has a geosynchronous orbit, the angle of arrival from all spot beams is almost the same. In such a case, as indicated by decision step 1302, the pool of channels can either be assigned to, for example, a sub area of a spot beam and/or a terrestrial cell ahead of time (i.e., fixed assignment), or assigned dynamically. In the case of a geosynchronous orbit, the signal strength measured by a subscriber terminal 512 using either a fixed or dynamic channel assignment scheme should be substantially the same, since the geographical location of the GSSs 504 are fixed and the angle of arrival from a single satellite 516 from different spot beams is substantially the same. Optionally, the GSS 504 can be used to collect measured signal strength reported by the subscriber terminals 512. Even in the case, for example, of a fast moving vehicle that is handing off, channel assignment can be done by a BSC 520 since, if the angle of arrival is fixed, then all the spot beams will behave substantially identically.

If it is determined at decision step 1302 that a FCA scheme is being used, then a preassigned channel is utilized at step 1304. The NOC 508, 508a, 508b will generally determine whether a hybrid method is utilized, although a BSC 510 in conjunction with a GSS 504 can also store such information. The present invention can utilize either a uniform allocation, in which the same number of channels are allocated to, for example, each cell or subcell, or a non-uniform allocation, in which different numbers of channels can be allocated to, for example, each cell or subcell.

If it is determined at decision step 1302 that channels are assigned dynamically, a determination is made at decision step 1306 whether a hybrid method is utilized. If a strictly dynamic scheme is being utilized then, a determination is made at decision step 1308 whether calls are allocated on a call-by-call basis. If so, a subscriber terminal 512 can compute the signal strength of available channels, and select the channel based on relative signal strength. If it is determined at decision step 1308 that channels will not be allocated on a call-by-call basis, channels may optionally be allocated based on past and present usage patterns. For example, consider a situation in which 60% of satellite channels are currently utilized and 40% of terrestrial channels are utilized. Without considering past usage patterns, it would be desirable to allocate the call to a terrestrial channel, since a higher percentage of terrestrial channels are available. However, if data stored at a MSC 508, for example, indicates that terrestrial channel usage in this cell it typically 80% (or 120%) and satellite channel usage is typically 40% (or 20%), the system 500 may assign the call to a satellite channel, even though it currently has a higher percentage of its channels being used since, based on past data, it is expected that traffic patterns will shortly return to their typical loads (e.g., 80% of terrestrial capacity and 40% of satellite capacity).

Further, the system 500 can control dynamic channel allocation associated with steps 1312 and 1314 in either a centralized or distributed manner. In a centralized DCA scheme, the MSC 508, for example, could maintain a centralized pool of channels (e.g., frequency bands) and allocate channels to calls based on, for example: the first available channel; to minimize blocking probability; and/or to maximize system utilization by maximizing channel reuse.

The system 500 could also utilize a distributed DCA scheme in which channels could be allocated based on locally available information available at, for example, each BTS 514. Some variations of distributed schemes include: a) allocating the first available channel; b) allocating the channel that minimizes adjacent channel interference; and/or c) allocating the first available channel that also meets some adjacent channel interference criterion.

If it is determined at decision step 1306 that a hybrid scheme will be utilized, the system preferably assigns a ratio of fixed and dynamic channels to, for example, each cell, subcell or area of coverage. The ratio of fixed to dynamic cells generally determines the performance of the system. Optimal ratio is likely to depend on a number of factors such as, for example, system traffic load and/or system characteristics. At step 1316, channels are preferably assigned in accordance with, for example, channel and system 500 load balancing and/or received signal strength considerations.

Figure 14:
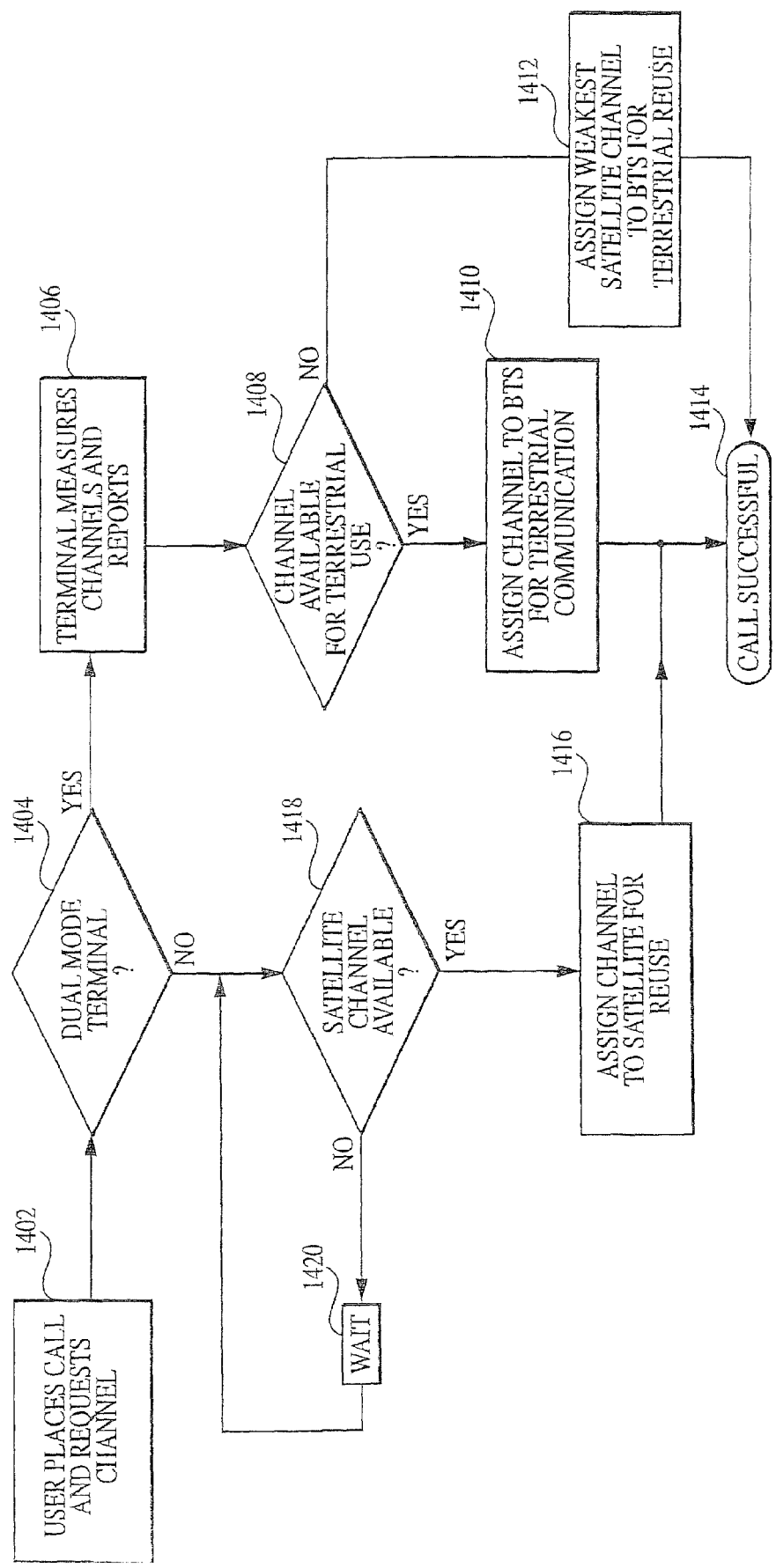
FIG. 14 shows an exemplary flow diagram of call initialization when terrestrial mode is preferred while using common or partially overlapping frequency bands as shown, for example, in FIGS. 6b, 6c, 6f and 6g.

FIG. 14 is an exemplary flow diagram of the call initialization process when the terrestrial mode is preferred and the satellite and terrestrial components share a common portion of a frequency band as shown, for example, in FIGS. 6b, 6c, 6f and 6g. A user places a call, for example, after acquiring a control channel, and depressing a send button on the mobile phone/subscriber terminal 512, and requests a channel at step 1402. At decision step 1404, a determination is made whether the subscriber terminal 512 is a dual mode (satellite-terrestrial) terminal. If the subscriber terminal 512 is dual mode, then signal strength measurements are made, for example at a BTS 514 and/or a GSS 504 of at least a portion of the available channels (if any) that can be used terrestrially at step 1406, preferably with one or more satellites 516 and one or more associated BTSs 514. If, as determined at decision step 1408, a channel is available for terrestrial use, a channel is assigned to the BTS 514 for terrestrial communication at step 1410 and the call is deemed successful at step 1414. If, as determined at decision step 1408, all terrestrial channels are currently being used, a channel currently being used by a satellite 516 is assigned to a BTS 514 for terrestrial reuse at step 1412, and the call is deemed successful at step 1414. It is preferred that the channel currently being used by a satellite 516 having the weakest signal strength be assigned to a BTS 514 for terrestrial reuse.

If, at decision step 1404, the subscriber terminal indicates that it is a single mode terminal (e.g., a satellite terminal), a determination is made by, for example, NOC 506, 606a, MSC 508, 508a, and/or RRM 720, 720a, at decision step 1418 whether a channel is available for satellite use. If so, a channel is assigned for satellite use at step 1416, and the call is deemed to be successfully established at step 1414. If, at decision step 1418, a determination is made that a channel is not available for satellite use, the subscriber terminal 512 and/or system 500 wait(s), preferably for a predetermined time, before determining whether a channel is available for satellite use at decision step 1418.

The method of FIG. 14 can be used not only for initial selection of frequencies as discussed above, but also for handoffs between channels when a subscriber terminal 512 travels, for example, from one area or portion thereof of satellite or terrestrial system coverage to another. As used herein, handoff refers to reassignment of a call to a different channel as a result of current channel degradation, and can be, for example, intra-cell/intra-satellite and/or inter-cell/inter-satellite. Channel degradation can occur, for example, as the subscriber terminal distance from the serving BTS increases or as a result of increase in co-channel interference. Handoff schemes are designed to prefer handoff calls to new calls when allocating channels so as to maintain an established connection (e.g., avoid dropping a call), and are preferably compared based, for example, on the probability of successful handoff calls and/or new call blocking.

Following are exemplary principles on which handoffs can be based: a) reserving some channels in each cell for handoff calls (i.e., Guard Channel Scheme); b) queuing up candidate calls for handoff (i.e., Handoff Queuing Scheme) with or without guard channels; and c) queuing up new calls instead of handoff calls.

Since channels are set aside for handoff, the guard channel scheme increases the probability of handoff calls. With a handoff queuing scheme, calls are queued for handoff when the received carrier power falls below a threshold. Queuing schemes can be, for example, first-in-first-out or priority queuing schemes. Priority can be based on, for example, how fast the threshold is being reached.

For example, with regard to FIG. 10, if a subscriber terminal 512 goes from cell 1 to, for example, cell 7, the subscriber terminal 512 will scan the channels associated with each cell, and preferably select first an open channel for terrestrial use, if one is available. If no channel(s) is available, then the subscriber terminal 512 takes signal strength measurements of the channels, and preferably selects the channel having the weakest signal strength (from the satellite 516 and relative to a subscriber terminal 512) for terrestrial use.

Figure 15:
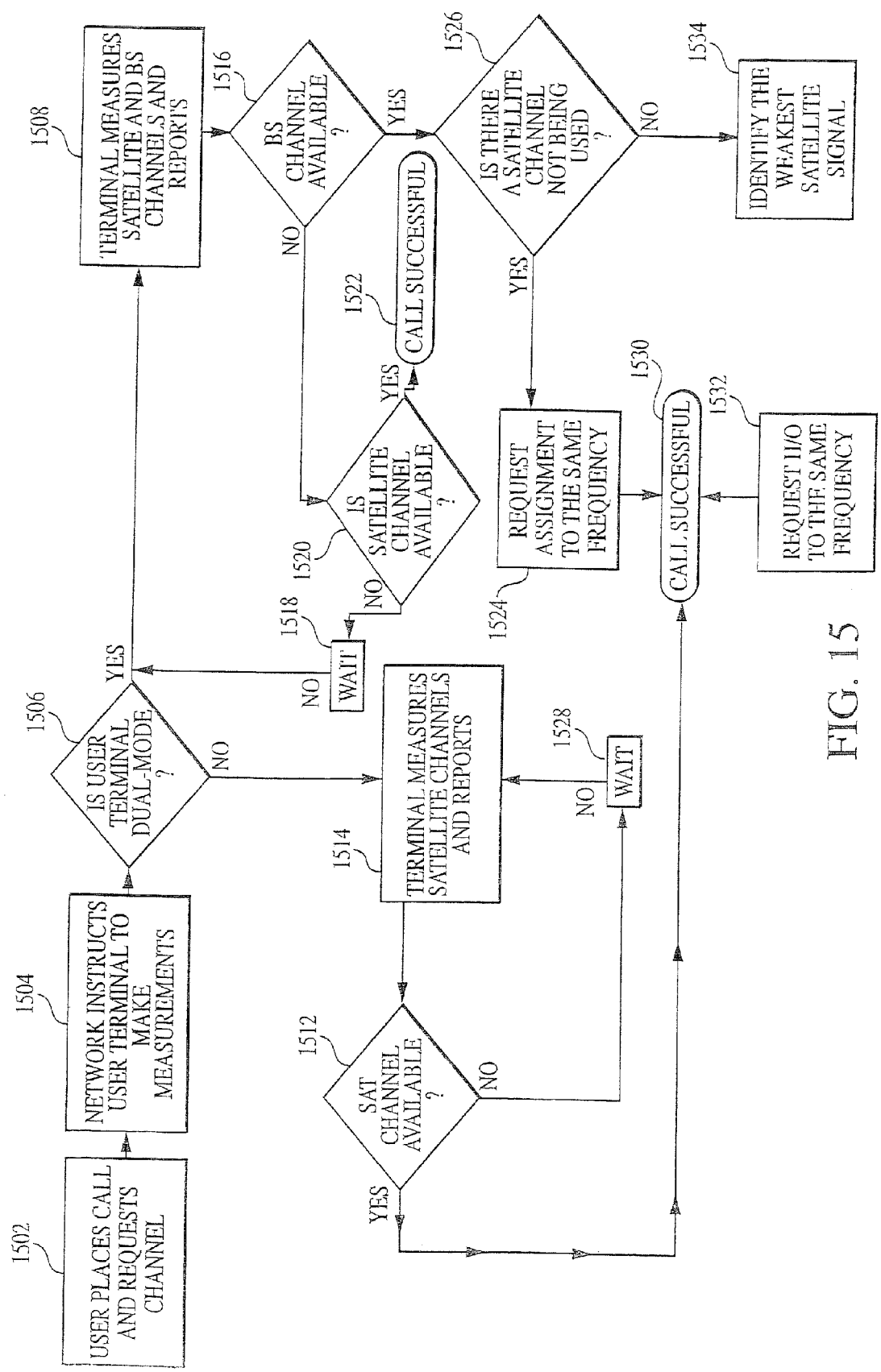
FIG. 15 shows an exemplary flow diagram of call initialization when terrestrial mode is preferred while using discrete satellite and terrestrial frequency bands as shown, for example, in FIGS. 6d and 6e.

FIG. 15 shows an exemplary flow diagram of call initialization when terrestrial mode is preferred and discrete satellite and terrestrial frequency bands are utilized as shown, for example, in FIGS. 6d and 6e. As shown in FIG. 15, at step 1502 the user places a call and requests a channel.

At step 1504 the subscriber terminal transmits to the system whether it is a single or dual mode (satellite-terrestrial) terminal. The subscriber terminal can transmit this information on, for example a signaling channel. For example, the subscriber terminal can send a control signal upon powering up the unit to, for example, a BTS 514 and/or satellite 516 indicating whether the subscriber terminal is single mode or a dual mode terminal.

At decision step 1506, a determination is made by, for example, the BTS 514 and/or BSC 510, based on the signal transmitted at step 1504, whether the subscriber terminal is a single mode or a dual mode terminal. If the subscriber terminal 512 is dual mode, then at step 1508 the system measures, for example, the signal strength of the satellite 516 and BTS 514 channels received by the subscriber terminal, and reports such measurements to, for example, a BSC 510 and/or a MSC 508, 508a, 508b. For example, in accordance with GSM technology, to initiate call setup, a subscriber terminal sends a signaling channel request to the system using a random access channel (RACH). The MSC 508, 508a, 508b, after considering signal strength measurements, informs the subscriber terminal via a BTS 514 of the allocated signaling channel using an access grant channel (AGCH). Then, the subscriber terminal sends the call origination request via a standalone dedicated control channel (SDCCH). The MSC 508, 508a, 508b, for example, then instructs the BSC 510 to allocate a traffic channel (TCH) for the call. Then, the subscriber terminal acknowledges the traffic channel assignment using, for example, a fast associated control channel (FACCH). Finally, both the subscriber terminal and the BTS 514 tune to the traffic channel.

At decision step 1516, a determination is made whether a BTS 514 channel (i.e., terrestrial channel) is available. If so, a determination is made at decision step 1526 whether a satellite channel is available. If so, a request is made to utilize the satellite channel terrestrially at step 1524, and the call is deemed successful at step 1530. If, at decision step 1526, it is determined by, for example, a MSC 508, 508a, 508b, that all satellite channels are being used, the weakest signal is identified at step 1534, a channel is assigned to the subscriber terminal 512 such that the subscriber terminal 512 reuses that satellite channel terrestrially, and the call is deemed successful at step 1530.

If, at decision step 1516, a determination is made by, for example, a MSC 508, 508a, 508b, that a BTS 514 channel is not available, a determination is made at decision step 1520 whether a satellite channel is available. If a satellite channel is available, the call is deemed successful at step 1522. If a satellite channel is not available, at step 1518 the subscriber terminal 512 and/or system 500 waits, preferably for a predetermined time, before taking additional measurements at step 1508.

If, at decision step 1506, the subscriber terminal 512 is determined to be a single mode (e.g., satellite only) terminal, the system measures, for example, the signal strength of the satellite 516 channels, and reports such measurements to, for example, the MSC 508, 508a, 508b. At decision step 1512, a determination is made whether a satellite channel is available. If a satellite channel is available, the call is deemed successful at step 1530. If a satellite channel is not available, at step 1528 the subscriber terminal 512 and/or system 500 waits, preferably for a predetermined time, before taking additional measurements at step 1514. As is the case with FIG. 14, the method described in FIG. 15 can be used both for initial selection of frequencies, as well as handoffs between channels when a subscriber terminal travels, for example, from one spot area or one terrestrial area to another.

Figure 16:
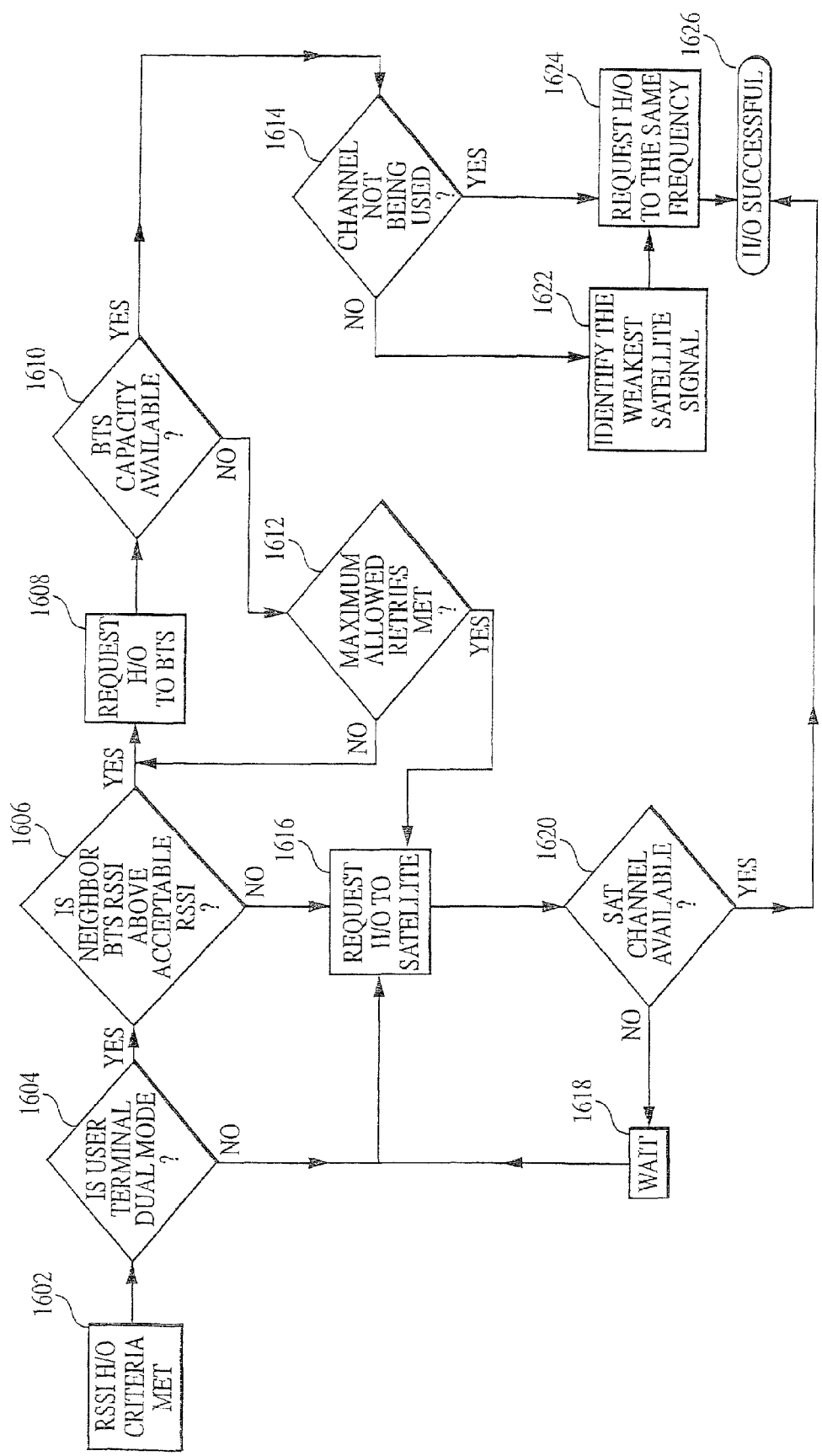
FIG. 16 shows an exemplary flow diagram of base station-to-base station or base station-to-satellite handoff while using common or partially overlapping frequency bands as shown, for example, in FIGS. 6b and 6c.

FIG. 16 shows an exemplary flow diagram of base station-to-base station or base station-to-satellite handoff when the satellite and terrestrial components share a common portion of a frequency band as shown, for example, in FIGS. 6b, 6c, 6f and 6g. At step 1602, the system 500 and/or subscriber terminal 512 verify that the RSSI or other signal strength indicator or criteria is satisfied. Before establishing a call, the RSSI, for example, should be high enough for the subscriber terminal 512 to establish calls. As previously discussed, the RSSI is a relative measure of received signal strength for a particular subscriber terminal 512, and is typically measured in db/m (decibels/milliwatt).

At decision step 1604, a determination is made whether the subscriber terminal 512 is a single mode or a dual mode terminal. The subscriber terminal can transmit this information on, for example, a signaling channel. For example, the subscriber terminal can send a control signal upon powering up the unit to, for example, a BTS 514 and/or satellite 516 indicating whether the subscriber terminal is single mode or a dual mode terminal.

If it is determined at decision step 1604 that the subscriber terminal is dual mode then, at decision step 1606, a determination is made by, for example, a BSC 510 whether a neighboring BTS 514 provides, for example, an acceptable RSSI. Other criteria such as, for example, network loading and/or balancing considerations, may also be used. If so, a request to handoff to the neighboring BTS 514 is made at step 1608. At decision step 1610, a determination is made whether the BTS 514 has capacity available. If so, a determination is made at decision step 1614 whether there is an available channel (not being used by the satellite). If so, a request to handoff to the available channel is made at step 1624, and the handoff is deemed successful at step 1626.

If, at decision step 1614, a determination is made that all channels are being utilized, the weakest satellite signal is preferably identified at step 1622. At step 1624, a request is made to reuse the weakest satellite signal, and the handoff is deemed successful at step 1526. If, at decision step 1610, it is determined that there is no BTS 514 capacity available, one or more subsequent requests are preferably made at step 1608, as determined by decision step 1612.

If, at decision step 1606, a determination is made by the BSC 510 and/or MSC 508, 508b that the neighboring BTS 514 does not have, for example, an acceptable RSSI and/or does not, for example, satisfy other handoff criteria (e.g., network loading), or if, at decision step 1612 the maximum number of allowed handoff requests has been made, a request to handoff to a satellite is made at step 1616. At decision step 1620, a determination is made by, for example, MSC 508, 508a whether a channel is available and, if so, the handoff is deemed successful at step 1626. If, at decision step 1620, a determination is made that a channel is not available, then the subscriber terminal 512 and/or system 500 waits at step 1618, preferably for a predetermined time prior to requesting another handoff at step 1616.

If, at decision step 1604, a determination is made that the subscriber terminal 512 is single mode (e.g., satellite only), then a satellite handoff request is made at step 1616, after which decision step 1620 is executed as discussed above.

Figure 17:
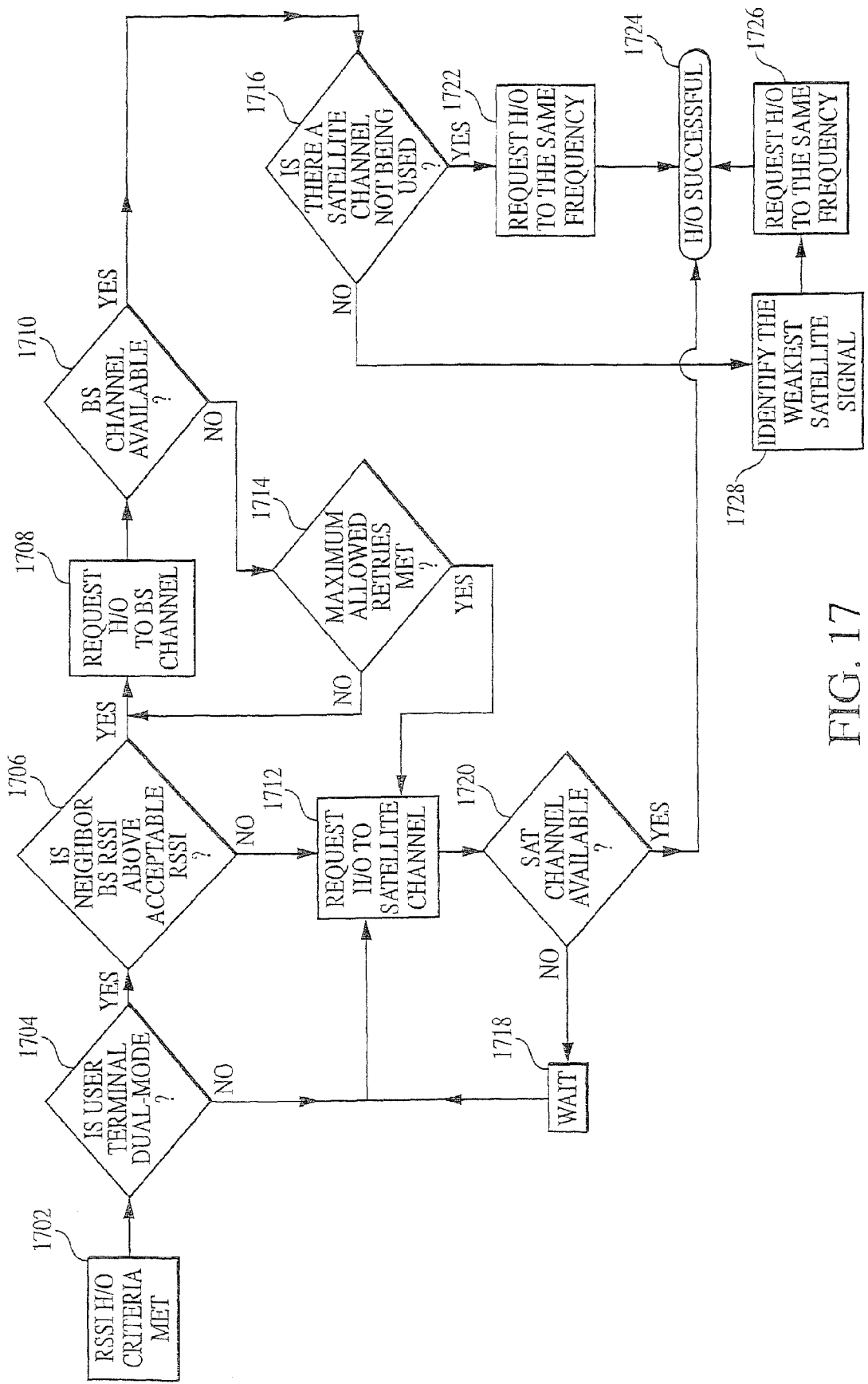
FIG. 17 shows an exemplary flow diagram of base station-to-base station or base station-to-satellite handoff while using discrete satellite and terrestrial frequency bands as shown, for example, in FIGS. 6d and 6e.

FIG. 17 shows an exemplary flow diagram of base station-to-base station or base station-to-satellite handoff while using discrete satellite and terrestrial frequency bands as shown, for example, in FIGS. 6d and 6e. At step 1702, the system 500 and/or subscriber terminal 512 verify that the RSSI and/or other signal strength indicators or criteria are satisfied.

At decision step 1704, a determination is made whether the subscriber terminal 512 is dual mode. The subscriber terminal can transmit this information on, for example a signaling channel. For example, the subscriber terminal can send a control signal upon powering up the unit to, for example, a BTS 514 and/or satellite 516 indicating whether the subscriber terminal is single mode or a dual mode terminal.

If it is determined at decision step 1704 that the subscriber terminal is dual mode then, at decision step 1706, a determination is made by, for example, a BSC 510 and/or MSC 508, 508b whether a neighboring BTS 514 provides an acceptable RSSI. If so, a request to handoff to the neighboring BTS 514 is made at step 1708. At decision step 1710, a determination is made by, for example, a BSC 510 and/or MSC 508, 508b whether there is a BTS 514 channel available. If so, a determination is made at decision step 1716 by, for example, MSC 508, 508a whether there is an available satellite channel. If it is determined that a satellite channel is available, a request to handoff to the satellite channel frequency is made at step 1722, and at step 1724 the handoff is deemed successful.

If, at decision step 1716, a determination is made by, for example, MSC 508, 508a that all satellite channels are being utilized, the weakest satellite signal vis-à-vis the subscriber terminal is preferably identified at step 1728. At step 1726, a request is made by, for example, MSC 508, 508a to reuse the weakest satellite signal, and the handoff is deemed successful at step 1724. If, at decision step 1710, it is determined that a BTS 514 channel is not available, one or more subsequent requests are preferably made at step 1708, as determined by decision step 1714.

If, at decision step 1706, a determination is made by, for example, BSC 510 that the neighboring BTS 514 does not have an acceptable RSSI, or if, as determined at decision step 1714, the maximum number of handoff attempts has been made, a request to handoff to a satellite channel is made at step 1712. At decision step 1720, a determination is made by, for example, MSC 508, 508a whether a satellite channel is available and, if so, the handoff is deemed successful at step 1724. If, at decision step 1720, a determination is made by, for example, MSC 508, 508a that a satellite channel is not available, then the subscriber terminal 512 and/or system 500 wait(s) at step 1718, preferably for a predetermined time, prior to requesting another handoff at step 1712.

If, at decision step 1704, it is determined that the subscriber terminal 512 is a single mode (e.g., satellite only) terminal, a request to handoff to a satellite channel is made at step 1712, after which decision step 1720 is executed, as discussed above.

The present invention also contemplates variations of the method disclosed in FIG. 17. For example, although FIG. 17 describes a process of first using terrestrial mode communications, and subsequently using satellite mode communications upon exhausting terrestrial channels, FIG. 17 could also have first preferred satellite mode communications, and subsequently use terrestrial mode communication upon exhausting satellite channels.

Figure 18:
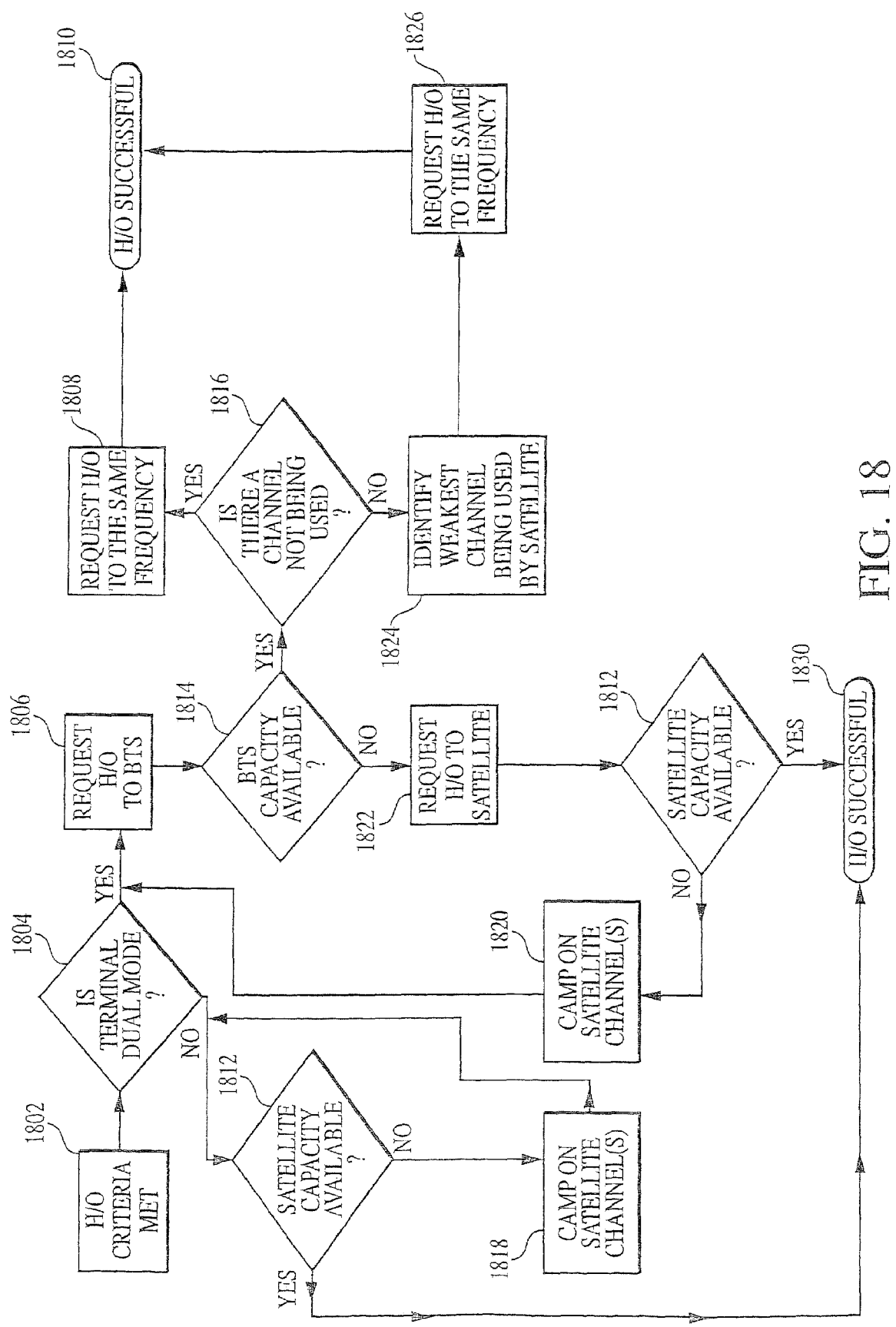
FIG. 18 shows an exemplary method of satellite-to-base station or satellite-to-satellite handoff while using common or partially overlapping frequency bands as shown, for example, in FIGS. 6b and 6c.

FIG. 18 shows an exemplary method of satellite-to-base station or satellite-to-satellite handoff when the satellite and terrestrial components share a common portion of a frequency band as shown, for example, in FIGS. 6b, 6c, 6f and 6g. Upon determining that handoff criteria (e.g., RSSI) is satisfied at step 1802, a determination is made at decision step 1804 whether the subscriber terminal 512 is dual mode. The subscriber terminal can transmit this information on, for example a signaling channel. For example, the subscriber terminal can send a control signal upon powering up the unit to, for example, a BTS 514 and/or satellite 516 indicating whether the subscriber terminal is single mode or a dual mode terminal.

If it is determined at decision step 1804 that the subscriber terminal is dual mode, a request to handoff to a BTS 514 is made at step 1806. At decision step 1814, a determination is made whether the BTS 514 has capacity available and, if so, whether there is an available channel at decision step 1816. If so, a request to handoff to an available channel is made by, for example, MSC 508, 508b at step 1808, and the handoff is deemed successful at step 1610.

If, at decision step 1816, a determination is made by, for example, MSC 508, 508a, 508b that all channels are being utilized, the weakest satellite signal is preferably identified at step 1824. At step 1826, a request by, for example, MSC 508, 508a, 508b, is made to reuse the weakest satellite signal, and the handoff is deemed to be successful at step 1810. If, at decision step 1814, it is determined by, for example, BSC 510 that there is no available BTS 514 capacity, a request to handoff to a satellite is made at step 1822. At decision step 1828, a determination is made by, for example, MSC 508, 508a whether satellite capacity is available and, if capacity is available, the handoff is deemed successful at step 1830. If, at decision step 1828, a determination is made by, for example, MSC 508, 508a that no satellite capacity is available, then at step 1820 the subscriber terminal 512 and/or system 500 camps on one or more of the channels that can be used with a satellite 516, preferably for a predetermined time, prior to requesting another handoff at step 1806.

If a determination is made, as previously described, at decision step 1804 that the subscriber terminal 512 is single mode (e.g., a satellite terminal) then, at decision step 1812, a determination is made by, for example, MSC 508, 508a whether there is satellite capacity available. If satellite capacity is available, the call is deemed successful at step 1830. If, at decision step 1812 it is determined by, for example, MSC 508, 508a that satellite capacity is not available, then at step 1818, the subscriber terminal 512 and/or system 500 camps on one or more of the satellite channels at step 1818, preferably for a predetermined time, prior to again determining whether satellite capacity is available at decision step 1812.

Figure 19:
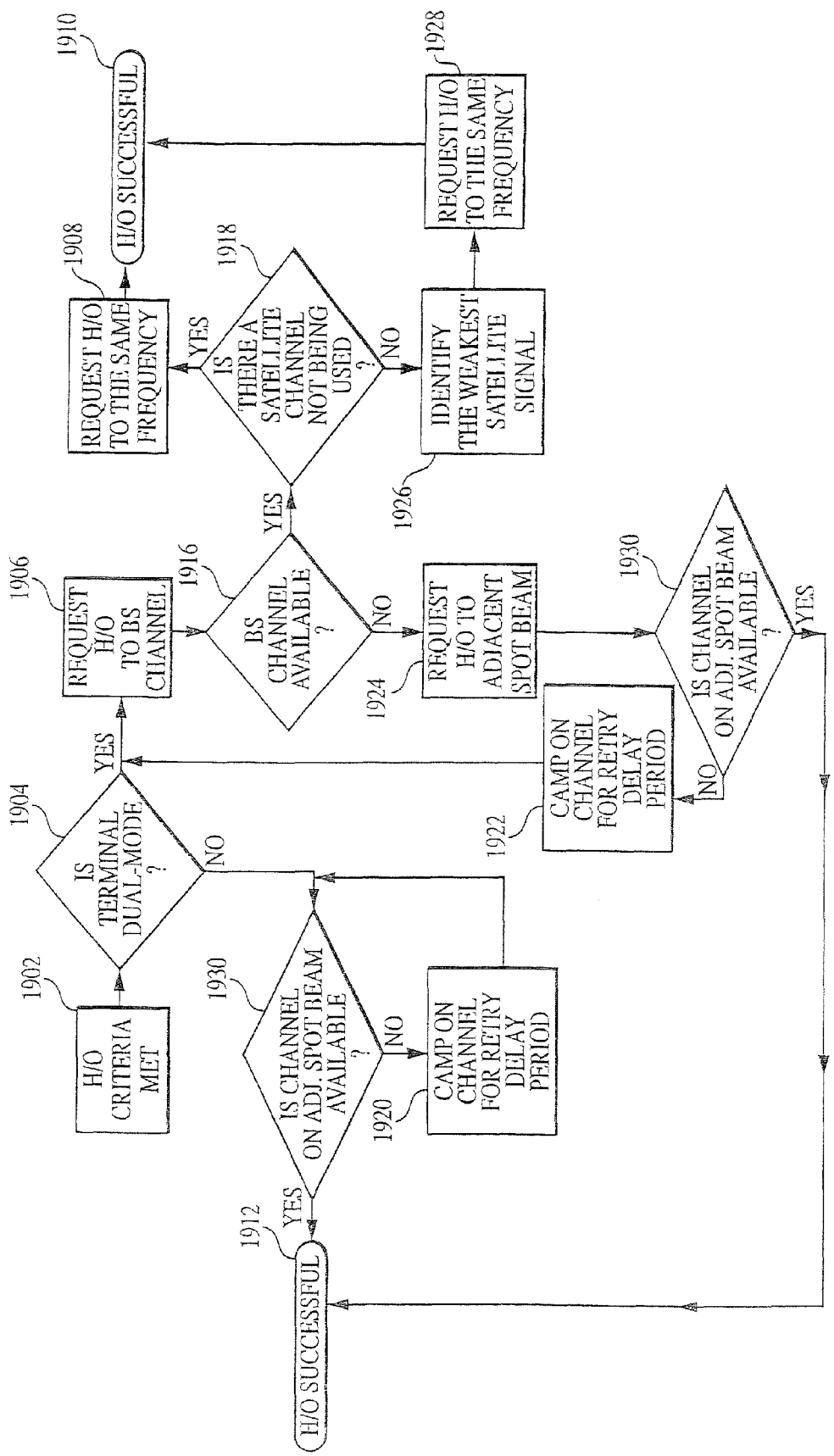
FIG. 19 shows an exemplary method of satellite-to-base station or satellite-to-satellite handoff while using discrete satellite and terrestrial frequency bands as shown, for example, in FIGS. 6d and 6e.

FIG. 19 shows an exemplary method of satellite-to-base station or satellite-to-satellite handoff while using discrete satellite and terrestrial frequency bands as shown, for example, in FIGS. 6d and 6e. Upon determining that handoff criteria (e.g., RSSI) is satisfied at step 1902, a determination is made at decision step 1904 whether the subscriber terminal 512 is dual mode. The subscriber terminal can transmit this information on, for example, a signaling channel. For example, the subscriber terminal can send a control signal upon powering up the unit to, for example, a BTS 514 and/or satellite 516 indicating whether the subscriber terminal is single mode or a dual mode terminal.

If it is determined at step 1902 that the subscriber terminal is dual mode then, a request to handoff to a BTS 514 channel is made at step 1906. At decision step 1916, a determination is made by, for example, BSC 510 whether there is a BTS 514 channel available. If so, a determination is made at decision step 1918 by, for example, MSC 508, 508a, whether there is a satellite channel not being used. If it is determined that a satellite channel is available, a request to handoff to that satellite channel is made at step 1908, and at step 1510 the handoff is deemed successful.

If, at decision step 1918, a determination is made by, for example, MSC 508, 508a that all satellite channels are being utilized, the weakest satellite signal is preferably identified at step 1926. At step 1928, the MSC 508, 508a reuses the satellite channel having the weakest signal, and the handoff is deemed successful at step 1910. If, at decision step 1916, it is determined by, for example, BSC 510 that a BTS 514 channel is not available, a request is made to handoff to, for example, an adjacent spot beam or satellite at step 1924. For example, with regard to FIG. 11, if subscriber terminal 512b requests a handoff to satellite 516a and satellite 516a does not have any available channels, subscriber terminal 512b can subsequently request a handoff using satellite 516b. If, at decision step 1930 a determination is made that an adjacent satellite (or spot beam) has an available channel, the call is deemed successful at step 1912. If, at decision step 1930 a determination is made that an adjacent satellite (or spot beam) does not have an available channel then, at step 1922, the subscriber terminal 512 camps on the current channel, preferably for a predetermined time before returning to step 1906.

If, at decision step 1904 it is determined, as previously discussed, that the subscriber terminal 512 is a single mode (e.g., satellite only) terminal then, at decision step 1914, if a determination is made that a channel from an adjacent spot beam or satellite is available, the call is deemed successful at step 1912. If it is determined at decision step 1914 that a channel from an adjacent spot beam or satellite is not available, then the subscriber terminal 512 or system 500 camps on the desired channel, preferably for a predetermined time, after which decision step 1914 is repeated.

Figure 20A:
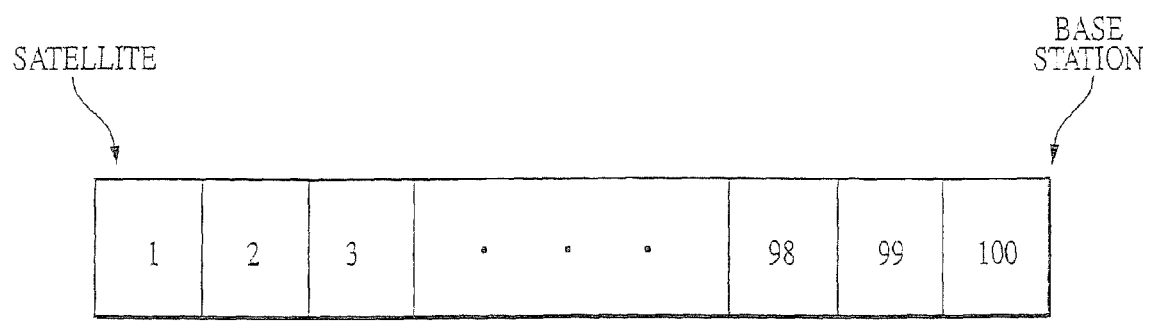
FIGS. 20a and 20b, taken together, show an exemplary method of inverse assignment of the channels.

As shown in FIG. 20a, the present invention advantageously and optionally implements an inverse assignment of the channels. That is, in at least one embodiment of the present invention, channels are assigned to the satellite component from one end of the frequency spectrum, and channels are assigned to the terrestrial component from the other end so that maximized spacing of channels is used. FIG. 20a collectively represents the respective downlink 602 and uplink 604 frequency bands of, for example, FIG. 6b. For example, with regard to 602, 604 of FIG. 6a, assume that the channels are arranged from 1, 2, 3, 4 . . . 98, 99, 100, from lower to higher frequency. The BTSs 514, for example, could be assigned channels 100, 99, 98, etc. from higher to lower frequencies, and the satellites can be assigned channels 1, 2, 3, etc. from lower to higher frequencies. We have discovered that this scheme advantageously reduces the chances of reuse. When no channels remain for either satellite or terrestrial use then, as previously discussed, the channel(s) having the weakest signal strength is preferably reused terrestrially.

Figure 20B:
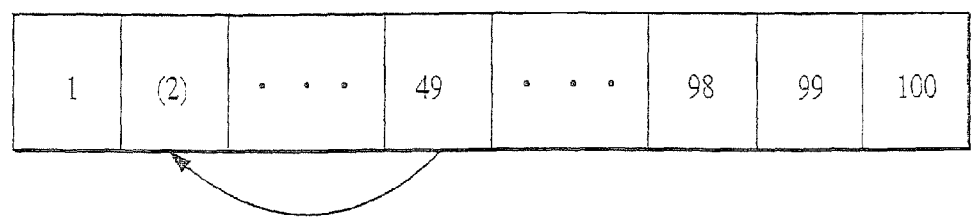

When there is a predetermined frequency closeness (e.g., a BTS 514 is using channels 52 to 100, and a satellite 516 is using channels 1 to 49), the present invention also enables transitioning channels to avoid interference and/or reuse. For example, channel 49 may be handed off, for example, to channel 2, assuming channel 2 is available (as indicated by (2) in FIG. 20b). Similarly, BTS 514 channels may also be similarly handed off.

Accordingly, in this additional feature of inverse-frequency assignment, the MSC 508, 508a, 508b, for example, actively monitors the active channels in ends of the systems (satellite/terrestrial, satellite/satellite, terrestrial/terrestrial, etc.) and proactively and/or dynamically re-assigns channels to maximize spacing between the systems.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention. While the foregoing invention has been described in detail by way of illustration and example of preferred embodiments, numerous modifications, substitutions, and alterations are possible without departing from the scope of the invention as described herein.

For example, one embodiment of the invention focused on reusing or assigning terrestrial frequencies based on the status of or signal strength of the satellite frequency. The present invention is also applicable in the reverse. In addition, the present invention is applicable to a plurality of satellite systems and/or a plurality terrestrial systems having similar operational characteristics as described herein. The present invention is equally applicable to voice and/or data networks.

The invention claimed is:

1. A communications system comprising a ground based system that is associated with a space based system that comprises at least one satellite, each satellite transmitting and/or receiving waveforms using a first portion of a predetermined frequency band that is authorized for the provision of space based communications; the ground based system comprising at least one base station, each base station transmitting and/or receiving waveforms utilizing a second portion of the predetermined frequency band; wherein the ground based system is configured to provide communications to subscriber terminals using a radio resource manager that is not used by the space based system and/or a mobile switching center that is not used by the space based system,
wherein there is no frequency overlap between the first portion and the second portion, so that frequencies used by the space based system are mutually exclusive to frequencies used by the ground based system.

2. The system according to claim 1, wherein the predetermined frequency band comprises a space based system uplink portion, a space based system downlink portion, and a ground based system portion.

3. The system according to claim 1, wherein first and second cells of the space based system use mutually exclusive portions of the first portion of the predetermined frequency band.

4. The system according to claim 1, wherein a subscriber terminal is configured to preferentially communicate with the at least one base station.

5. The system according to claim 4, wherein the subscriber terminal comprises a first vocoder having a first data rate and a second vocoder having a second data rate.

6. The system according to claim 5, wherein the radio resource manager assigns and/or activates the first vocoder and/or the second vocoder in response to predetermined criteria.

7. The system according to claim 6, wherein the predetermined criteria comprise at least one of capacity demand, voice quality and received signal level.

8. The system according to claim 6, wherein the radio resource manager further assigns and/or activates a different vocoder to a voice communications circuit in response to the predetermined criteria.

9. The system according to claim 8, wherein the predetermined criteria comprises capacity demand, voice quality, signal strength, and/or received signal level having changed substantially since assignment or activation of the at least one of the first vocoder and the second vocoder.

10. The system according to claim 4, wherein the subscriber terminal communicates with the at least one base station by transmitting at frequencies that are authorized to provide uplink communications of the space based system, and/or receiving at frequencies that are authorized to provide downlink communications of the space based system.

11. The system according to claim 4, wherein the subscriber terminal communicates with the at least one base station by transmitting at frequencies that are authorized to provide downlink communications of the space based system, and/or receiving at frequencies that are authorized to provide uplink communications of the space based system.

12. The system according to claim 4, wherein the subscriber terminal communicates with the at least one base station by transmitting at frequencies that are authorized to provide uplink communications of the space based system, and/or receiving at frequencies that are authorized to provide uplink communications of the space based system.

13. The system according to claim 4, wherein the subscriber terminal communicates with the at least one base station by transmitting at frequencies that are authorized to provide downlink communications of the space based system, and/or receiving at frequencies that are authorized to provide downlink communications of the space based system.

14. The system according to claim 1, wherein a satellite of the at least one satellite communicates with subscriber terminals using a first air interface and a base station of the at least one base station communicates with subscriber terminals using a second air interface.

15. The system according to claim 14, wherein the first air interface comprises channels that are separated by frequency and/or time and the second air interface comprises channels that are separated by frequency and/or time.

16. The system according to claim 15, wherein the first and/or second air interface comprises a Time Division Multiple Access (TDMA) protocol.

17. The system according to claim 14, wherein the first air interface comprises channels that are separated by frequency and/or code and the second air interface comprises channels that are separated by frequency and/or code.

18. The system according to claim 17, wherein the first and/or second air interface comprises a Code Division Multiple Access (CDMA) protocol.

19. The system according to claim 14, wherein the first air interface comprises channels that are separated by frequency and/or time and the second air interface comprises channels that are separated by frequency and/or code.

20. The system according to claim 19, wherein the first air interface comprises a Time Division Multiple Access (TDMA) protocol and the second air interface comprises a Code Division Multiple Access (CDMA) protocol.

21. The system according to claim 4, wherein the subscriber terminal comprises at least one variable rate vocoder.

22. The system according to claim 14, wherein the first air interface comprises channels that are separated by frequency and/or code and the second air interface comprises channels that are separated by frequency and/or time.

23. The system according to claim 22, wherein the first air interface comprises a Code Division Multiple Access (CDMA) protocol and the second air interface comprises a Time Division Multiple Access (TDMA) protocol.

24. The system according to claim 6, wherein the radio resource manager monitors inband interference, received signal quality and/or received signal strength and avoids using channels containing interference exceeding a predetermined threshold.

25. The system according to claim 4, wherein the subscriber terminal is configured to communicate with the space based system and with the ground based system.

26. The system according to claim 1, wherein the subscriber terminals are configured to communicate with the space based system and with the ground based system.

27. The system according to claim 24, wherein the radio resource manager executes utilization of a different communications channel when a quality measure of an existing communications channel has fallen below a predetermined level.

28. The system according to claim 1, wherein the ground based system is further configured to provide communications to the subscriber terminals using a network operations center that is not used by the space based system.

29. The system according to claim 28, wherein the network operations center utilizes past system traffic patterns to administer reconfiguration, assignment and/or use of frequencies.

30. The system according to claim 28, wherein the network operations center utilizes at least one of hysteresis and negative hysteresis to administer reconfiguration, assignment and/or use of frequencies.

31. The system according to claim 1, wherein the space based system is configured to communicate with subscriber terminals that are not capable of communicating with the ground based system and with subscriber terminals that are capable of communicating with the ground based system.

32. A method of providing ground based communications for at least one subscriber terminal that communicates with a space based system by transmitting and/or receiving waveforms using a first portion of a predetermined frequency band, wherein the space based system comprises at least one satellite and the predetermined frequency band is authorized for the provision of space based communications; the method of providing ground based communications comprising communicating between a ground based system and the at least one subscriber terminal by transmitting and/or receiving waveforms utilizing a second portion of the predetermined frequency band, wherein the ground based system comprises at least one base station; the ground based system providing communications to the at least one subscriber terminal using a radio resource manager that is not used by the space based system and/or a mobile switching center that is not used by the space based system,
wherein there is no frequency overlap between the first portion and the second portion, so that frequencies used by the space based system are mutually exclusive to frequencies used by the ground based system.

33. The method according to claim 32, wherein the predetermined frequency band comprises a space based system uplink portion, a space based system downlink portion, and a ground based system portion.

34. The method according to claim 32, wherein first and second cells of the space based system use mutually exclusive portions of the first portion of the predetermined frequency band.

35. The method according to claim 32, wherein a subscriber terminal is configured to preferentially communicate with the at least one base station.

36. The method according to claim 35, wherein the subscriber terminal comprises a first vocoder having a first data rate and a second vocoder having a second data rate.

37. The method according to claim 36, further comprising assigning and/or activating of the first vocoder and/or the second vocoder in response to predetermined criteria by the radio resource manager.

38. The method according to claim 37, wherein the predetermined criteria comprises at least one of capacity demand, voice quality, and received signal level.

39. The method according to claim 37, wherein the radio resource manager further assigns and/or activates a different vocoder to a voice communications circuit in response to the predetermined criteria.

40. The method according to claim 39, wherein the predetermined criteria comprises capacity demand, voice quality, signal strength, and/or received signal level having changed substantially since assignment or activation of the at least one of the first vocoder and the second vocoder.

41. The method according to claim 35, wherein the subscriber terminal communicates with the at least one base station by transmitting at frequencies that are authorized to provide uplink communications of the space based system, and/or receiving at frequencies that are authorized to provide downlink communications of the space based system.

42. The method according to claim 35, wherein the subscriber terminal communicates with the at least one base station by transmitting at frequencies that are authorized to provide downlink communications of the space based system, and/or receiving at frequencies that are authorized to provide uplink communications of the space based system.

43. The method according to claim 35, wherein the subscriber terminal communicates with the at least one base station by transmitting at frequencies that are authorized to provide uplink communications of the space based system, and/or receiving at frequencies that are authorized to provide uplink communications of the space based system.

44. The method according to claim 35, wherein the subscriber terminal communicates with the at least one base station by transmitting at frequencies that are authorized to provide downlink communications of the space based system, and/or receiving at frequencies that are authorized to provide downlink communications of the space based system.

45. The method according to claim 32, wherein a satellite of the at least one satellite communicates with subscriber terminals using a first air interface and a base station of the at least one base station communicates with subscriber terminals using a second air interface.

46. The method according to claim 45, wherein the first air interface comprises channels that arc separated by frequency and/or time and the second air interface comprises channels that arc separated by frequency and/or time.

47. The method according to claim 46, wherein the first and/or second air interface comprises a Time Division Multiple Access (TDMA) protocol.

48. The method according to claim 45, wherein the first air interface comprises channels that are separated by frequency and/or code and the second air interface comprises channels that are separated by frequency and/or code.

49. The method according to claim 48, wherein the first and/or second air interface comprises a Code Division Multiple Access (CDMA) protocol.

50. The method according to claim 45, wherein the first air interface comprises channels that are separated by frequency and/or time and the second air interface comprises channels that are separated by frequency and/or code.

51. The method according to claim 50, wherein the first air interface comprises a Time Division Multiple Access (TDMA) protocol and the second air interface comprises a Code Division Multiple Access (CDMA) protocol.

52. The method according to claim 35, wherein the subscriber terminal comprises at least one variable rate vocoder.

53. The method according to claim 45, wherein the first air interface comprises channels that are separated by frequency and/or code and the second air interface comprises channels that are separated by frequency and/or time.

54. The method according to claim 53, wherein the first air interface comprises a Code Division Multiple Access (CDMA) protocol and the second air interface comprises a Time Division Multiple Access (TDMA) protocol.

55. The method according to claim 37, wherein the radio resource manager monitors in-band interference, received signal quality and/or received signal strength and avoids using channels containing interference exceeding a predetermined threshold.

56. The method according to claim 35, wherein the subscriber terminal is configured to communicate with the space based system and with the ground based system.

57. The method according to claim 32, wherein the subscriber terminals are configured to communicate with the space based system and with the ground based system.

58. The method according to claim 55, wherein the radio resource manager executes utilization of a different communications channel when a quality measure of an existing communications channel has fallen below a predetermined level.

59. The method according to claim 32, wherein the ground based system further provides communications to the at least one subscriber terminal using a network operations center that is not used by the space based system.

60. The method according to claim 59, wherein the network operations center utilizes past system traffic patterns to administer reconfiguration, assignment and/or use of frequencies.

61. The method according to claim 59, wherein the network operations center utilizes at least one of hysteresis and negative hysteresis to administer reconfiguration, assignment and/or use of frequencies.

62. The method according to claim 32, wherein the space based system is configured to communicate with subscriber terminals that are not capable of communicating with the ground based system and with subscriber terminals that are capable of communicating with the ground based system.

* * * * *

UNITED STATES PATENT AND TRADEMARK OFFICE
CERTIFICATE OF CORRECTION

PATENT NO. : 8,369,775 B2
APPLICATION NO. : 12/549548
DATED : February 5, 2013
INVENTOR(S) : Karabinis et al.

Page 1 of 1

Figure 1:
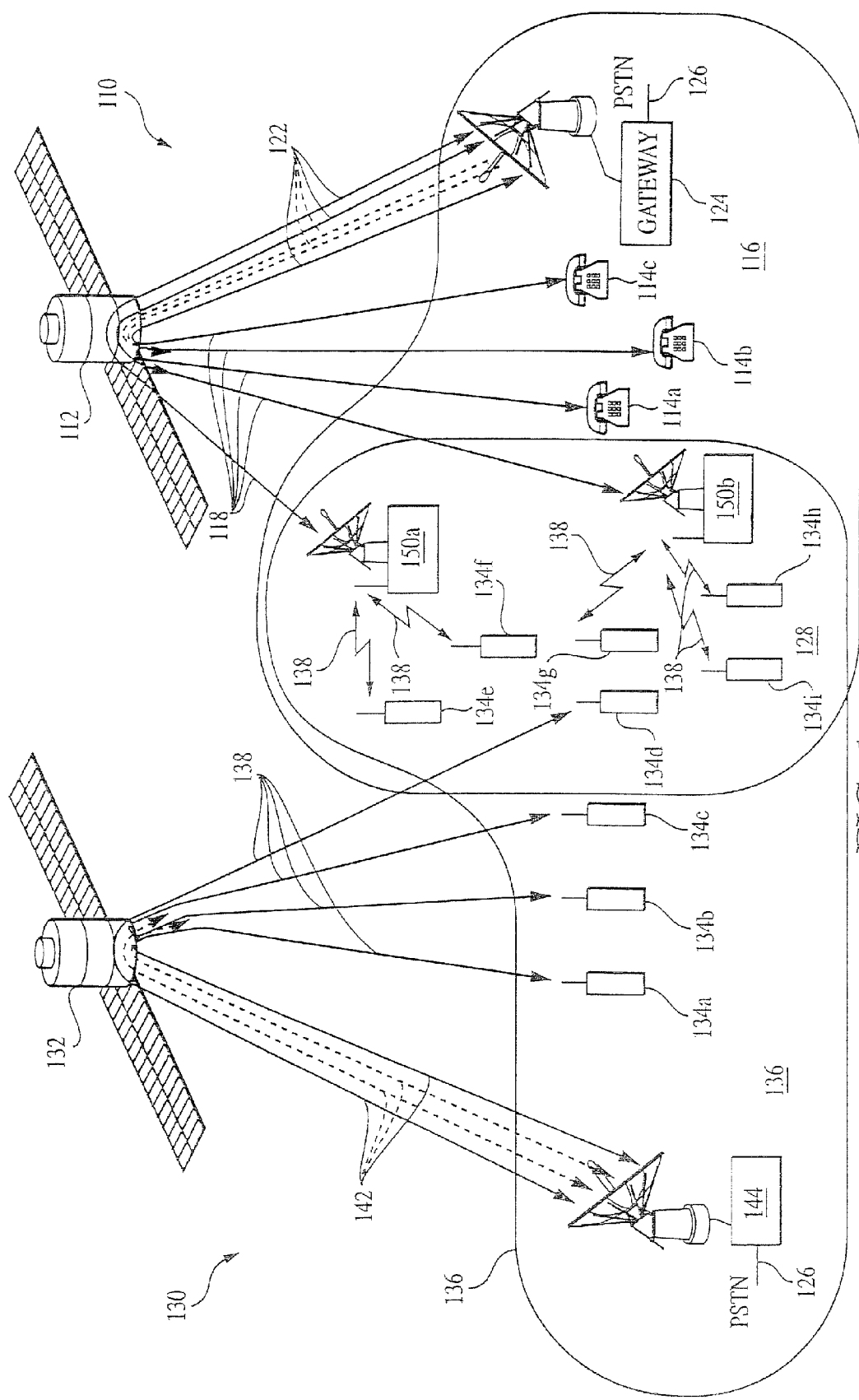
FIG. 1 is a prior art diagram of a satellite radiotelephone system.
Figure 2A:
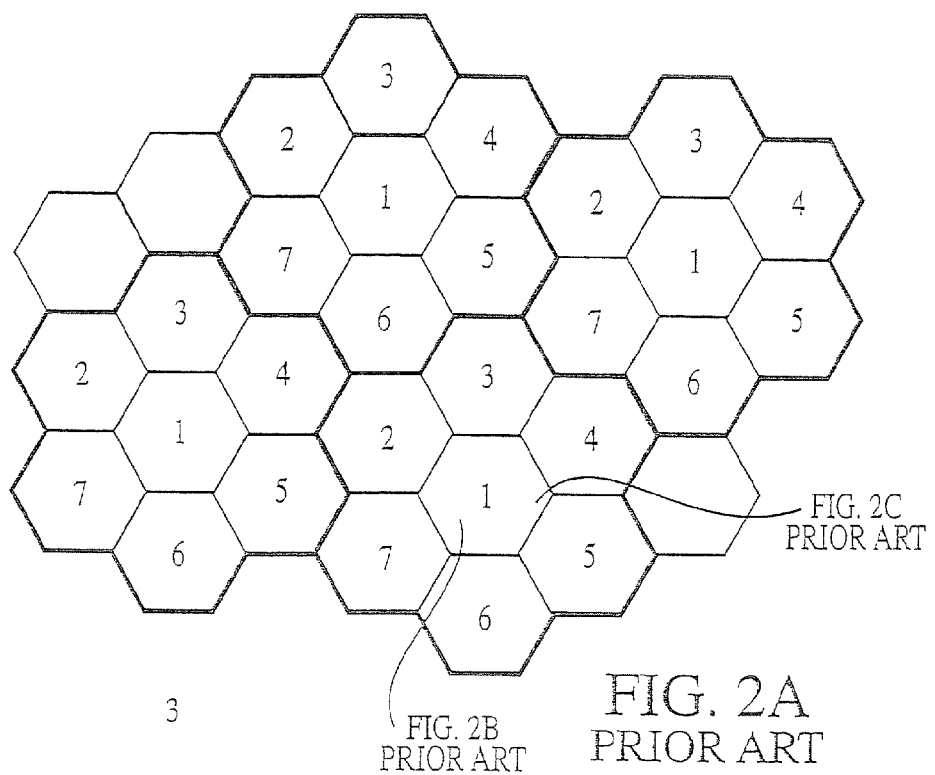
FIGS. 2A, 2D and 2C are prior art schematic diagrams of frequency reuse in the satellite radiotelephone system shown in FIG. 1.
Figure 2B:
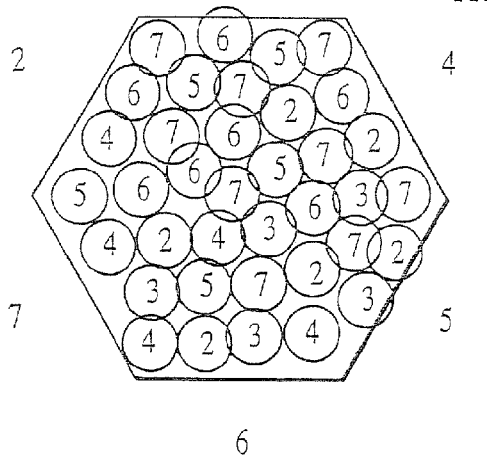
Figure 2C:
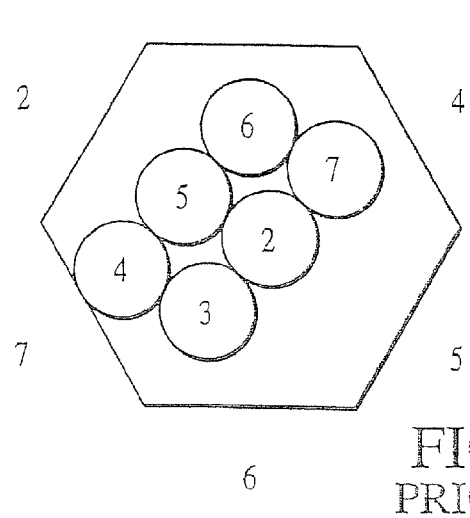
Figure 3:
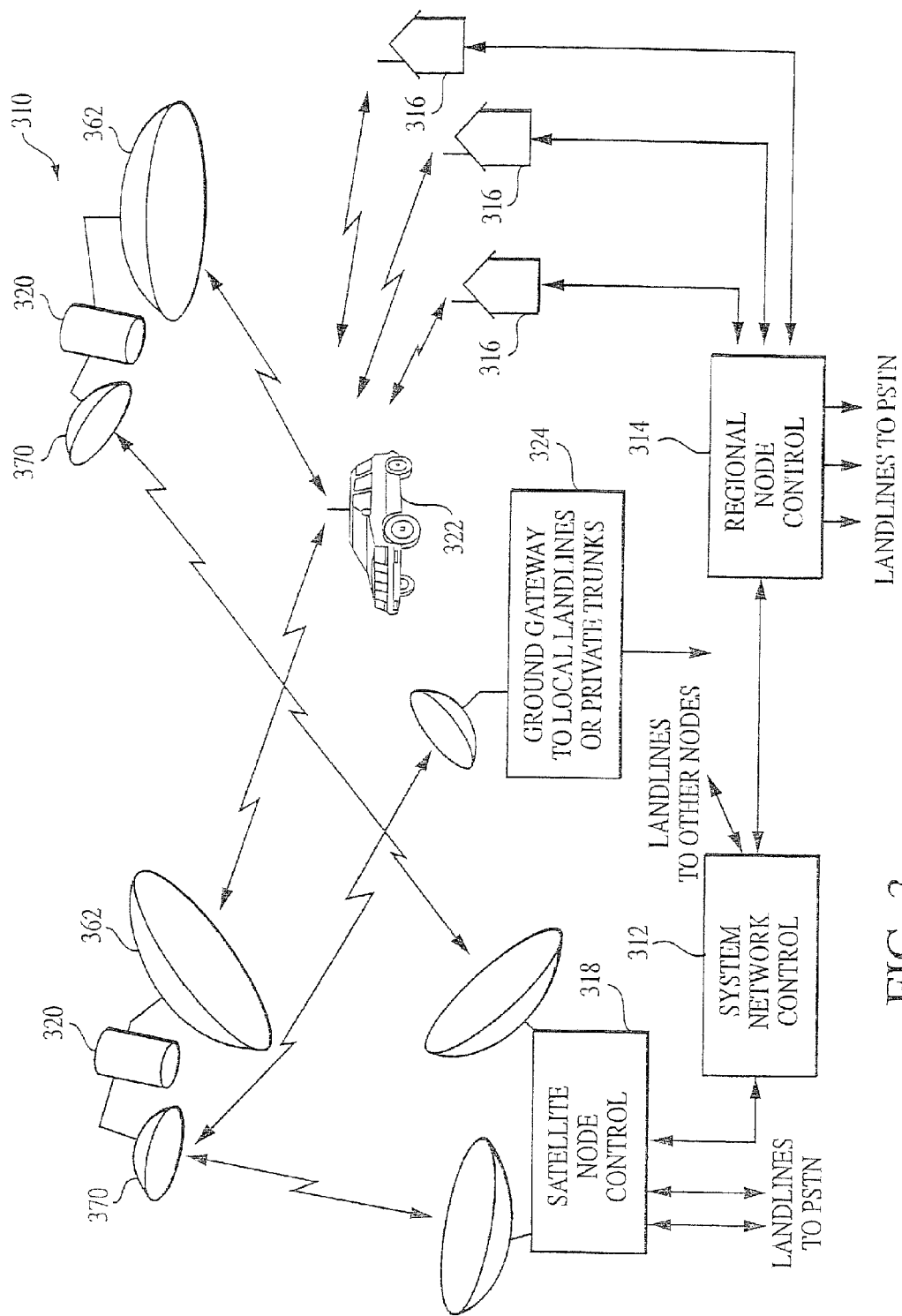
FIG. 3 is a diagram showing an overview of the principal elements of a prior art communications system.
Figure 4:
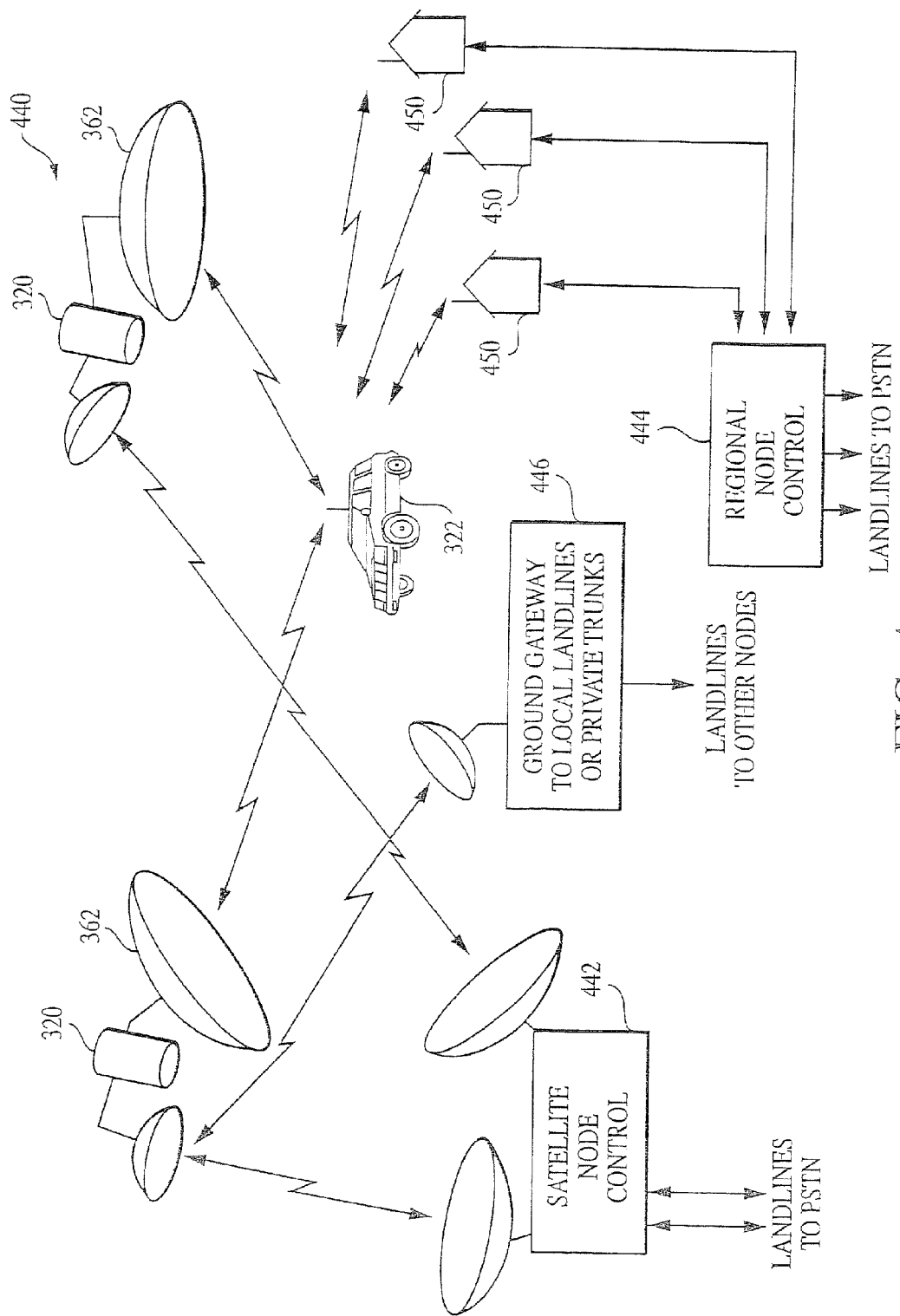
FIG. 4 is an overview block diagram of another embodiment of the prior art communications system shown in FIG. 3.

It is certified that error appears in the above-identified patent and that said Letters Patent is hereby corrected as shown below:

In the Specification:

Column 23, Line 21: Please correct "FIGS. 2A, 2D and 2C are"
to read -- FIGS. 2A, 2B and 2C are --

Column 44, Line 67: Please correct "at step 1610."
to read -- at step 1810. --

Signed and Sealed this
Thirteenth Day of May, 2014

Michelle K. Lee
*Deputy Director of the United States Patent and Trademark Office*